US008820937B2

(12) United States Patent
Osterman et al.

(10) Patent No.: US 8,820,937 B2
(45) Date of Patent: Sep. 2, 2014

(54) OPTICAL POLARIZATION STATE MODULATOR ASSEMBLY FOR USE IN STEREOSCOPIC THREE-DIMENSIONAL IMAGE PROJECTION SYSTEM

(75) Inventors: Jesper Osterman, Falun (SE); Terry J. Scheffer, Hilo, HI (US)

(73) Assignee: LC-TEC Displays AB, Borlange (SE)

( * ) Notice: Subject to any disclaimer, the term of this patent is extended or adjusted under 35 U.S.C. 154(b) by 0 days.

(21) Appl. No.: 13/403,766

(22) Filed: Feb. 23, 2012

(65) Prior Publication Data

US 2012/0147280 A1 Jun. 14, 2012

Related U.S. Application Data

(63) Continuation-in-part of application No. 13/073,764, filed on Mar. 28, 2011, now Pat. No. 8,184,215, which is a continuation-in-part of application No. 12/858,349, filed on Aug. 17, 2010, now Pat. No. 8,023,052.

(60) Provisional application No. 61/536,457, filed on Sep. 19, 2011.

(51) Int. Cl.
*G03B 21/14* (2006.01)

(52) U.S. Cl.
USPC ......... 353/20; 353/7; 353/8; 353/30; 353/31; 353/99; 349/8; 349/96; 349/98

(58) Field of Classification Search
USPC ......... 353/7, 8, 20, 30, 31, 32, 33, 84, 94, 98, 353/99; 349/5, 7–9, 15, 46, 96, 98; 348/744–747, E13.004, E13.019, 348/E13.022, E13.033, E13.037, E13.038, 348/E13.04, E13.044, E13.058; 359/462, 359/465
See application file for complete search history.

(56) References Cited

U.S. PATENT DOCUMENTS 3,857,629 A 12/1974 Freiser
3,881,808 A 5/1975 Gurtler et al.
(Continued)

FOREIGN PATENT DOCUMENTS

CH 532 261 7/1974
GB 1372868 11/1974
(Continued)

OTHER PUBLICATIONS

Philip J. Bos, Liquid-Crystal Shutter Systems for Time-Multiplexed Stereoscopic Displays, *Stereo Computer Graphics and Other True 3D Technologies*, Edited by David F. McAllister, pp. 90-118, 1993 Princeton University Press.
(Continued)

*Primary Examiner* — Sultan Chowdhury
(74) *Attorney, Agent, or Firm* — Stoel Rives LLP

(57) ABSTRACT

An optical polarization state modulator assembly for use in a stereoscopic three-dimensional image projection system includes a spatial light modulator, a light source emitting multiple wavelength components of light for incidence on the spatial light modulator, and a projection lens. A polarization converter system cooperates with the spatial light modulator to produce in alternating sequence polarized light carrying first and second perspective view images of a scene in different ones of first and second subframes. A polarization modulator, in response to first and second drive signals, imparts to, respectively, the image-carrying polarized light a first output polarization state during the first subframe and to the image-carrying polarized light a second output polarization state during the second subframe. The image-carrying polarized light in the first and second output polarization states propagates through the projection lens for transmission to an observer.

17 Claims, 33 Drawing Sheets

(56) References Cited

U.S. PATENT DOCUMENTS

| | | | |
|---|---|---|---|
| 4,039,254 A | 8/1977 | Harsch | |
| 4,563,059 A | 1/1986 | Clark et al. | |
| 4,582,396 A | 4/1986 | Bos et al. | |
| 4,635,051 A | 1/1987 | Bos | |
| 4,719,507 A | 1/1988 | Bos | |
| 4,792,850 A | 12/1988 | Lipton et al. | |
| 5,187,603 A | 2/1993 | Bos | |
| 5,821,989 A * | 10/1998 | Lazzaro et al. | 348/56 |
| 5,825,441 A | 10/1998 | Hörnell et al. | |
| 5,973,759 A * | 10/1999 | Itoh et al. | 349/5 |
| 6,028,656 A | 2/2000 | Buhrer et al. | |
| 6,943,852 B2 * | 9/2005 | Divelbiss et al. | 349/13 |
| 7,477,206 B2 | 1/2009 | Cowan et al. | |
| 7,528,906 B2 | 5/2009 | Robinson et al. | |
| 7,532,272 B2 | 5/2009 | Woodgate et al. | |
| 7,798,648 B2 * | 9/2010 | Ijzerman et al. | 353/7 |
| 8,023,052 B1 | 9/2011 | Osterman et al. | |
| 8,164,620 B2 * | 4/2012 | Hsu et al. | 348/51 |
| 2002/0015007 A1 * | 2/2002 | Perlin et al. | 345/6 |
| 2006/0291053 A1 | 12/2006 | Robinson et al. | |
| 2007/0153234 A1 * | 7/2007 | Salters et al. | 353/8 |
| 2008/0211736 A1 * | 9/2008 | Taira et al. | 345/6 |
| 2008/0252800 A1 | 10/2008 | Tan et al. | |
| 2008/0284921 A1 | 11/2008 | Hirata et al. | |
| 2009/0096991 A1 | 4/2009 | Chien et al. | |
| 2009/0096995 A1 * | 4/2009 | Malfait | 353/31 |
| 2009/0128780 A1 * | 5/2009 | Schuck et al. | 353/20 |
| 2009/0296046 A1 * | 12/2009 | Nishida et al. | 353/20 |
| 2010/0225751 A1 * | 9/2010 | Nemeth | 348/58 |

FOREIGN PATENT DOCUMENTS

| | | |
|---|---|---|
| KR | 10-0941398 B1 | 2/2010 |
| WO | WO0232149 A2 | 4/2002 |

OTHER PUBLICATIONS

Thomas J. Haven, A liquid-crystal video stereoscope with high extinction ratios, a 28% transmission state, and one-hundred-microsecond switching, SPIE vol. 761 *True 3D Imaging Techniques and Display Technologies,* 1987, pp. 23-26.

May 30, 2013 International Search Report and Written Opinion for International Application No. PCT/US2013/026948.

\* cited by examiner

OPTICAL POLARIZATION STATE MODULATOR ASSEMBLY FOR USE IN STEREOSCOPIC THREE-DIMENSIONAL IMAGE PROJECTION SYSTEM

RELATED APPLICATIONS

This application claims benefit of U.S. Provisional Patent Application No. 61/536,457, filed Sep. 19, 2011, and is a continuation-in-part of U.S. patent application Ser. No. 13/073,764, filed Mar. 28, 2011, which is a continuation-in-part of U.S. patent application Ser. No. 12/858,349, filed Aug. 17, 2010, and now U.S. Pat. No. 8,023,052.

COPYRIGHT NOTICE

© 2012 LC-TEC Displays AB. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to a high-speed, liquid crystal polarization modulator for time-multiplexed stereoscopic three-dimensional (3D) applications that use passive glasses.

BACKGROUND INFORMATION

Polarization modulators find applications in such diverse areas as fiber optics communication, welding goggles, and time-multiplexed stereoscopic 3D displays. Liquid crystal cells are particularly well suited for modulating the states of polarization of light passing through them because the liquid crystal material itself is birefringent and the optic axis direction of this birefringent material can be controlled with an applied voltage. For some applications, a polarization modulator is used as a polarization switch, which switches light from one polarization state to another. To achieve the highest performance in time-multiplexed stereoscopic 3D applications, it is desirable to switch between two orthogonally related polarization states, such as between right-handed circularly polarized light and left-handed circularly polarized light or between vertically polarized light and horizontally polarized light.

There are two basic technologies used for time-multiplexed stereoscopic 3D systems, in which the left eye and right eye images are presented frame sequentially by an imaging device. One of the basic technologies entails use of active viewing glasses worn by an observer. Each eyepiece of the active glasses is equipped with a lens assembly comprising a polarization switch positioned between two polarizing films. The active glasses and imaging device operate in synchronism, and each lens assembly alternately passes to and blocks from its associated observer's eye images sequentially presented during alternate subframes of substantially equal duration so that the right eye images and the left eye images reach, respectively, the observer's right eye and the observer's left eye. The other basic technology entails use of passive viewing glasses worn by an observer and placement of a polarizer and a polarization switch in front of the imaging device. The polarization switch and imaging device operate in synchronism so that left eye images and right eye images propagate through a transmission medium while in different polarization states imparted by the polarization switch. Each eyepiece of the passive glasses is equipped with a lens comprising a polarizing film oriented to analyze the states of polarization of incident light carrying the left and right eye images to alternately block and pass them so that the right eye images and the left eye images reach, respectively, the observer's right eye and the observer's left eye. The present disclosure relates to the stereoscopic 3D applications that use passive viewing glasses.

One of the first polarization modulators using liquid crystals was the twisted nematic (TN) cell. The TN cell, taught by Helfrich and Schadt in Swiss Patent No. CH532261, consists of liquid crystal material of positive dielectric anisotropy sandwiched between two substrate plates having optically transparent electrodes whose surfaces have been processed to orient at right angles the directors of liquid crystal material contacting one surface relative to the orientation of the directors of liquid crystal material contacting the other surface. In the absence of an applied voltage, the liquid crystal directors inside the liquid crystal device uniformly twist 90° from the inside surface of the bottom substrate to the inside surface of the top substrate. This has the effect of rotating linearly polarized incoming light by 90° through a "waveguiding" principle. Upon application of a voltage to the liquid crystal device, the liquid crystal directors align perpendicular to the substrate, with the result that the twisted liquid crystal director structure disappears and with it the ability to rotate the linearly polarized incoming light. Thus, the TN cell can be considered as a polarization switch that rotates the direction of linearly polarized light by 90° when no voltage is applied and does not rotate the linearly polarized light when a sufficiently high voltage is applied. A problem with using a TN device as a polarization switch is that the transition from a high voltage optical state to a low voltage optical state is too slow for many applications because the restoring torque on the liquid crystal directors comes only from elastic forces propagating from the fixed boundary alignment established by the directors contacting the processed inner surfaces of the electrodes. This is referred to as an unpowered transition. The transition from a low voltage optical state to high voltage optical state, on the other hand, can be very fast because the torque on the molecules now comes from the coupling of the applied electric field with the induced dipole moment of the liquid crystal material. This is a powered transition. Even with low viscosity, high birefringence liquid crystal materials and the liquid crystal display device technology now available, the high voltage optical state to low voltage optical state transition is still on the order of 2 ms to 3 ms, which is too slow for use in modern time-multiplexed stereoscopic 3D applications, in which complete left or right eye images might be available for only 4 ms or less.

Freiser in U.S. Pat. No. 3,857,629 describes a TN polarization switch in which switching from low to high voltage optical states and from high to low voltage optical states are both powered transitions and thus both can be very fast. This switching scheme uses a special "two-frequency" liquid crystal mixture, the dielectric anisotropy of which changes sign from positive to negative for increasing drive frequencies. Applying a DC or a low frequency AC voltage powers the TN device on, and applying a high frequency AC voltage powers the TN device back off. There are, however, several problems associated with the two frequency technology. First, this scheme is incapable of switching uniformly over a large area because of formation of domains or patches in the liquid crystal device. Second, the crossover frequency, i.e., the frequency at which the dielectric anisotropy of the liquid crystal changes sign, is very temperature dependent and as a consequence limits the temperature range in which the device can successfully operate. Third, the high frequency drive signal feeding into the capacitive load of the liquid crystal device requires significant power, which precludes using this system in battery operated, portable devices such as active stereoscopic 3D glasses.

Bos in U.S. Pat. No. 4,566,758 describes a liquid crystal-based polarization switch operating in an electro-optical mode. The liquid crystal device described by Bos has become known as the pi-cell. The pi-cell polarization switch can rotate the polarization direction of linearly polarized light by 90°, but its operation is based on a switchable half-wave retarder rather than the 90° "waveguiding" principle of the TN display. This pi-cell mode switches faster than does the TN mode because the internal liquid crystal material flow associated with switching of the pi-cell does not introduce a slowing "optical bounce." Nevertheless, the high voltage optical state to low voltage optical state transition is still an unpowered transition, with a response time of about 1 ms using present materials and device technology. Even a 1 ms response can introduce image crosstalk, loss of brightness, and other artifacts in modern time-multiplexed stereoscopic 3D applications.

Clark and Lagerwall in U.S. Pat. No. 4,563,059 describe a liquid crystal polarization switch based on ferroelectric liquid crystal materials, which belong to a different liquid crystal class from that of nematic liquid crystal materials described above. The class of ferroelectric liquid crystals differs from the class of nematic liquid crystals in that the ferroelectric liquid crystal molecules arrange themselves in layers. A ferroelectric polarization switch can very rapidly switch back and forth between two polarization states because both optical state transitions are powered transitions. However, there are many drawbacks of ferroelectric polarization modulators. First, the liquid crystal device is required to have a very thin cell gap, on the order of 1 which makes it difficult to manufacture ferroelectric liquid crystal devices with high yield. Second, the alignment of the ferroelectric layers is very sensitive to shock and pressure variations, which sensitivity rules out many applications that entail manipulation, such as use in active stereoscopic 3D glasses worn by an observer. Third, variations in temperature can also cause alignment disruptions, especially if the temperature is temporarily raised above the smectic transition temperature.

Other polarization switches use two liquid crystal devices arranged in optical series. Bos in U.S. Pat. No. 4,635,051 describes a light gate system comprising first and second variable optical retarders, in which the projections of their optic axes on the light communicating surfaces of the variable retarders are orthogonal and which are placed between crossed polarizers. The variable retarders are driven such that, during a first ON or transmissive time interval, the first variable retarder receives a high voltage while the second variable retarder receives zero volts and, during a second OFF or blocked time interval, both first and second variable retarders receive high voltages. The result is that the light gate turns ON to a transmissive state very quickly at the beginning of the first time interval and turns OFF to a blocked state very quickly at the beginning of the second time interval. The second time interval is followed by a third time interval of indefinite duration during which both variable retarders receive zero volts and relax to their unpowered states. The light gate is in the blocked state during the third time interval. This relaxation is comparatively slow during the third time interval because it is unpowered and must be completed before the light gate can be reactivated. This scheme is unsuitable for time-multiplexed stereoscopic 3D applications, which operate with two time intervals (left and right image subframes) of substantially equal durations.

Bos in U.S. Pat. No. 4,719,507 describes a time-multiplexed stereoscopic imaging system embodiment comprising a linear polarizer and first and second liquid crystal variable optical retarders whose optic axes are perpendicular to each other. The variable retarders are separately switched such that, during a first image frame, the first variable retarder is in a zero retardation state and the second variable retarder is in a quarter-wave retardation state resulting in right circularly polarized light and, during a second image frame, the first variable retarder is in a quarter-wave retardation state and the second variable retarder is in a zero retardation state resulting in left circularly polarized light. At no time does the second variable retarder compensate the change the first variable retarder makes to the input polarization state of incident light. During switching, one variable retarder is powered on while the other variable retarder is simultaneously powered off and vice versa. A disadvantage of this scheme is that both transitions incorporate the comparatively slow unpowered transition, which can introduce image crosstalk, loss of brightness, and other artifacts in modern time-multiplexed stereoscopic 3D applications.

Cowan et. al. in U.S. Pat. No. 7,477,206, describe a polarization switch, which in a manner similar to that of the above-described U.S. Pat. No. 4,719,507, uses two liquid crystal variable optical retarders that are capable of switching between zero and a quarter-wave retardation and are driven in a push-pull manner. The same disadvantages of the polarization switch described in U.S. Pat. No. 4,719,507 also apply here.

Robinson and Sharp in U.S. Pat. No. 7,528,906 describe several embodiments of polarization switches that use two half-wave pi-cells optically associated in series. One embodiment uses two pi-cells constructed for surface contacting director alignment by rubbing on the surfaces of the optically transparent electrodes in a parallel direction. The two pi-cells are oriented such that the rub directions of the two pi-cells make about a 43° angle with each other. Other embodiments use two pi-cells with their rub directions parallel to each other and constructed with one or more intervening passive retardation films. In all cases, when incident light in an input polarization state propagates through the first and second pi-cells, the second pi-cell does not compensate a change that the first liquid crystal retarder makes to the input polarization state. Both liquid crystal devices are simultaneously driven with the same waveforms, resulting in a very fast optical response when both liquid crystal devices are switched from a low voltage optical state to a high voltage optical state because they are powered transitions, but the simultaneous transitions from high to low voltage optical states are unpowered transitions and are therefore comparatively slow, reducing switching performance for time multiplexing stereoscopic 3D applications.

Hornell and Palmer in U.S. Pat. No. 5,825,441 describe a liquid crystal welding glass structure that includes two TN devices and an intervening polarizing film. At least one of the TN devices has a twist angle of less than 90°. Because of the intervening polarizer, the state of polarization of light entering the second TN device is constant, regardless of the change the first TN device makes to the input polarization state of incident light, so no compensation is involved. This arrangement gives superior performance in welding applications, in which extremely high optical density over wide viewing angles is required, but would not be suitable for time multiplexing stereoscopic 3D applications because of the slow optical response of the unpowered transitions.

SUMMARY OF THE DISCLOSURE

An optical polarization state modulator for time-multiplexed stereoscopic three-dimensional image viewing by an observer does not exhibit the foregoing disadvantages. The polarization state modulator receives in alternating sequence light in an input polarization state and carrying first and second perspective view images of a scene in different ones of first and second subframes that include updated image portions.

Preferred embodiments of the polarization state modulator comprise first and second liquid crystal devices combined in optical series so that polarized light propagating through them can undergo a change in polarization state in response to voltages applied to the first and second liquid crystal devices. The first and second liquid crystal devices have respective first and second sets of directors and are constructed and oriented to cause, in response to removal of applied equal voltages, the directors in the first and second sets to cooperatively relax and thereby dynamically offset the polarization state changes so that multiple wavelengths of the incident light propagating through and exiting the combination of first and second liquid crystal devices are in the input polarization state.

Drive circuitry delivers first and second drive signals to the respective first and second liquid crystal devices. The first and second drive signals include lower magnitude levels that establish lower magnitude director field states for the first and second liquid crystal devices. The first and second drive signals include pulses having lower-to-higher magnitude level powered transitions that establish higher magnitude director field states for the first and second liquid crystal devices. The first and second drive signals cooperate during one of the first and second subframes to cause, in the first and second liquid crystal devices, formation of the higher magnitude director field states from which the directors relax during the updated image portion of the one subframe such that the directors in the first and second sets offset the polarization state changes. The directors offsetting the polarization state changes impart to the image-carrying polarized light propagating through the combination of first and second liquid crystal devices a first output polarization state that is the input polarization state. The first and second drive signals cooperate during the other of the first and second subframes to cause, in different ones of the first and second liquid crystal devices, formation of the lower and higher magnitude director field states during the updated image portion of the other subframe such that the directors in the first and second sets do not offset the polarization state changes. The directors not offsetting polarization state changes impart to the image-carrying polarized light propagating through the combination of first and second liquid crystal devices a second output polarization state that is different from the first output polarization state.

A useful property of two compensating liquid crystal devices is that, if the same voltage is applied to both of them, one liquid crystal device compensates a change that the other liquid crystal device makes to the input polarization state, regardless of the applied voltage level. Moreover, if the applied voltage is changed from one level to another and the liquid crystal material in the liquid crystal devices relaxes to the new voltage level, polarization state compensation will take place throughout the duration of the relaxation. This is referred to as dynamic compensation. Thus, if a voltage is applied to both liquid crystal devices and then removed, they will continue to compensate throughout the relaxation process with no change in the polarization state of the light passing through the combination. The slow, unpowered transition of the liquid crystal devices does not, therefore, manifest itself as a change in polarization state. The disclosed drive scheme takes advantage of this latter property, which enables fast-switching polarization modulator operation because the two liquid crystal devices are allowed to reset to the lower voltage polarization state by the slower, unpowered transition without any optical change.

The optical polarization state modulator can be incorporated in stereoscopic 3D systems that are configured for use with passive or active viewing glasses.

With respect to a system using passive viewing glasses, an image source and an input polarizer are in optical association with each other. The image source produces the first and second perspective view images in alternating sequence, and the light in an input polarization state and carrying the first and second perspective view images exits the input polarizer for incidence on a light entrance surface of the optical polarization state modulator. A passive decoder includes first and second viewing devices that are separated from a light exit surface of the optical polarization state modulator by a transmission medium and are configured to receive the image-carrying polarized light in the first and second output polarization states during different ones of the first and second subframes. The first viewing device comprises a first polarizer having a first transmission polarization axis that is oriented to transmit light of the first output polarization state and block light of the second output polarization state. The second viewing device comprises a second polarizer having a second transmission polarization axis that is oriented to transmit light of the second output polarization state and block light of the first output polarization state. Such passive viewing glasses present to the observer the first and second perspective view images during different ones of the first and second subframes.

Additional aspects and advantages will be apparent from the following detailed description of preferred embodiments, which proceeds with reference to the accompanying drawings.

DETAILED DESCRIPTION OF PREFERRED EMBODIMENTS

Preferred embodiments are based on first and second liquid crystal devices that are arranged in optical series and through which incident light in an input polarization state propagates. The second liquid crystal device compensates a change that the first liquid crystal device makes to the input polarization state to exhibit a property of not changing the state of polarization of all wavelengths of normally incident light passing through the first and second liquid crystal devices. Compensation, as used herein for first and second liquid crystal devices arranged in optical series and through which polarized light propagates, means that, in whatever manner the first liquid crystal device changes the input polarization state of light entering the first liquid crystal device, the second liquid crystal device reverses or offsets this change with the result that the output polarization state of light exiting the second liquid crystal device is the same as the input polarization state. To be compensating, the first and second liquid crystal devices meet the following conditions: (1) the liquid crystal devices have the same cell gaps; (2) the liquid crystal devices are filled with the same liquid crystal material unless chiral dopants are added, in which case the dopants have equal but opposite chirality; (3) there is no polarization-altering optical element such as a retardation plate or polarizer positioned between the two liquid crystal devices; and (4) the director field in one of the two liquid crystal devices is a 90° rotated mirror image of the director field in the other liquid crystal device. For this last condition to be met, either the two liquid crystal devices have the same voltages applied to them or the same applied voltages undergo change to other same applied voltages and the liquid crystal director fields in the two liquid crystal devices dynamically relax to a new corresponding equilibrium condition. If different voltages are applied to them, the two liquid crystal devices will not compensate.

Figure 1:
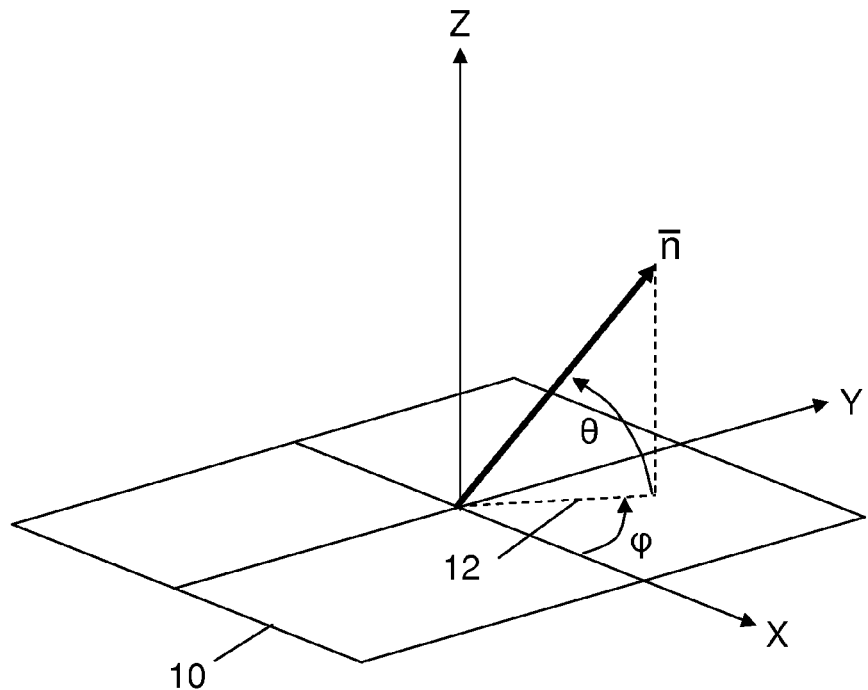
FIG. 1 defines the tilt angle $\theta$ and the azimuthal angle $\phi$ of a liquid crystal director n inside a layer of liquid crystal material.
Figure 2:
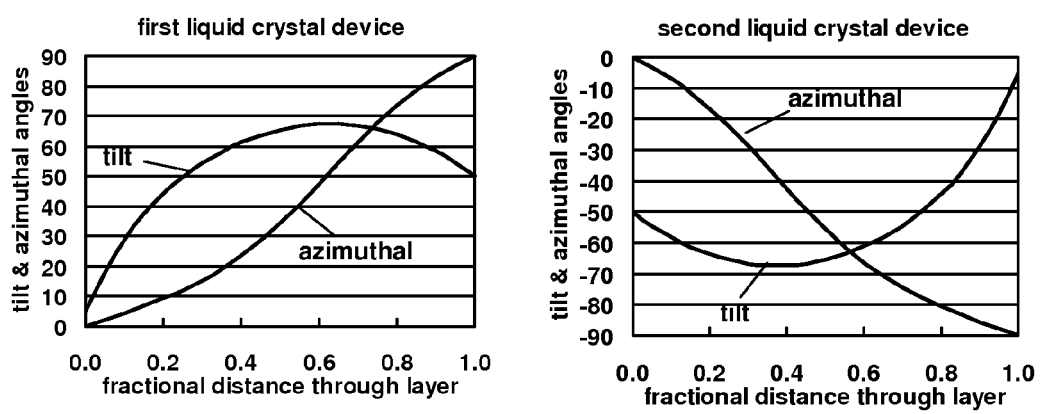
FIG. 2 shows the tilt and azimuthal profiles of first and second liquid crystal devices through which incident light in an input polarization state propagates and in which the second liquid crystal device compensates a change that the first liquid crystal device makes to the input polarization state.

The liquid crystal director field describes the orientation of the local optic axis of the liquid crystal molecules as it varies throughout the liquid crystal device. The director field in a liquid crystal display is characterized by a set of directors whose orientation can continuously change throughout the device. FIG. 1 shows that the orientation of the director, or local optic axis, represented by a unit vector, n, can be represented by a tilt angle θ, which is the angle the director makes with a plane 10 parallel to one of the substrates between which the liquid crystal material is contained, and an azimuthal angle φ, which is the angle a projection 12 of the director n onto plane 10 makes with the X-axis. FIG. 2 is two graphs presenting an example of the tilt and azimuthal angle profiles of a first liquid crystal device (left-side graph) and a second liquid crystal device (right-side graph) showing how the tilt and azimuthal angles change at various locations throughout the thickness dimension (Z-axis) of the liquid crystal device. These profiles define the director field state of each device. The orientation of the director at any location z along the Z-axis in the first liquid crystal device can be represented by tilt angle $\theta_1(z)$ and azimuthal angle $\phi_1(z)$, and the orientation of the director at any location in the second liquid crystal device can be represented by tilt angle $\theta_2(z)$ and azimuthal angle $\phi_2(z)$.

A mathematical description of condition (4) for polarization state compensation, i.e., the director field in the second liquid crystal device is a 90° rotated mirror image of the director field in the first liquid crystal device, can be expressed by the two equations:

$$\theta_2(z) = -\theta_1(d-z)$$

$$\phi_2(z) = \phi_1(d-z) - 90°,$$

where d is the cell gap for the two liquid crystal devices and z=0 at the liquid crystal device entrance surfaces and z=d at the liquid crystal device exit surfaces. For purposes of illustration, the above equations are obeyed for the example of FIG. 2, which shows the tilt angle and azimuthal angle profiles for the first and second liquid crystal devices.

Figure 3A:
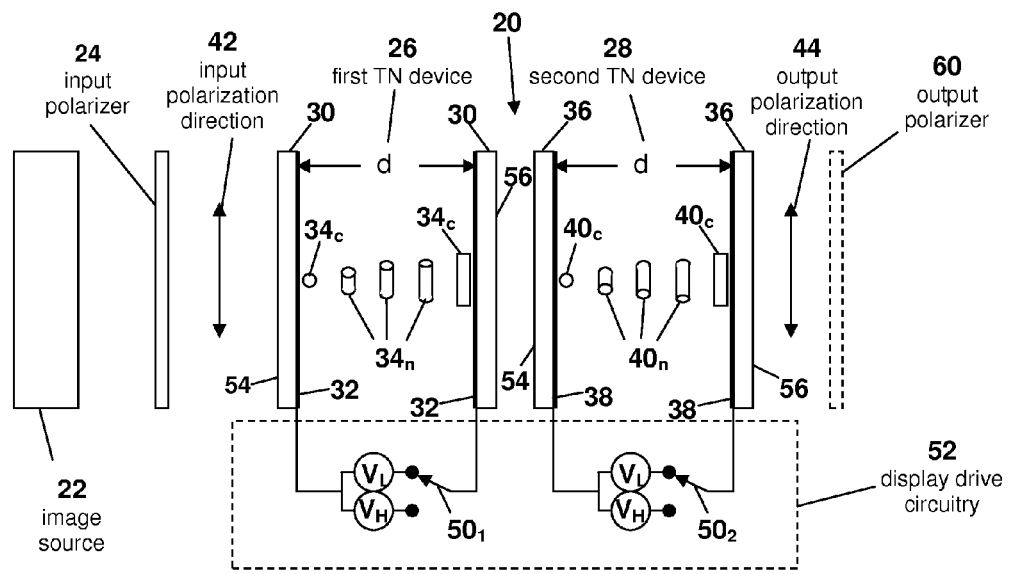
FIGS. 3A, 3B, 3C, and 3D show the effect on the output polarization imparted by various drive voltages applied to first and second 90° TN liquid crystal devices installed in a first preferred embodiment, which is a polarization modulator that can be incorporated in a stereoscopic 3D system using passive or active viewing glasses.

FIGS. 3A, 3B, 3C, and 3D show a first preferred embodiment, which is a polarization modulator 20 for stereoscopic 3D viewing used in conjunction with passive or active viewing glasses and an image source 22 producing first (left eye) perspective view images and second (right eye) perspective view images of a scene during alternate subframes of substantially equal duration. FIG. 3A shows an input polarizer 24 at the left, followed by a first TN device 26 and a second TN device 28 combined in optical series and of conventional 90° TN type. First TN device 26 is constructed with liquid crystal material contained between glass substrate plates 30 having inner surfaces on which optically transparent electrode layers 32 are formed. The liquid crystal material includes electrode surface-contacting directors $34_c$ and electrode surface-noncontacting directors $34_n$. Second TN device 28 is constructed with liquid crystal material contained between glass substrate plates 36 having inner surfaces on which optically transparent electrode layers 38 are formed. The liquid crystal material includes electrode surface-contacting directors $40_c$ and electrode surface-noncontacting directors $40_n$. Input polarizer 24 imparts a vertical input polarization state or direction 42 to light propagating from image source 22 and carrying the left and right eye perspective view images.

FIG. 3A shows the same low voltage magnitude drive signals, $V_L$, applied to both TN devices 26 and 28, as schematically indicated by respective switches $50_1$ and $50_2$ in display drive circuitry 52. Drive signal $V_L$ is below the TN threshold voltage or even zero. At this voltage, surface-noncontacting directors $34_n$ and $40_n$ within the respective TN devices 26 and 28 uniformly rotate 90° in the Z-axis direction from an entrance surface 54 to an exit surface 56, with the rotational sense being left-handed in TN device 26 and right-handed in TN device 28. Each of TN devices 26 and 28 can be considered to rotate by 90° in a "waveguiding" process vertical input polarization direction 42 (0°) of the incident light propagating from image source 22, with TN device 26 rotating the vertical input polarization direction 42 +90° in a left-handed sense and TN device 28 reversing this rotation by rotating it −90° in the opposite, right-handed sense back to the direction of the original vertical input polarization direction 42 of 0°. The combined TN devices 26 and 28 compensate such that the state of polarization of the incident light remains unchanged after it passes through them, leaving an output polarization state or direction 44 that is the same as input polarization direction 42.

Figure 3B:
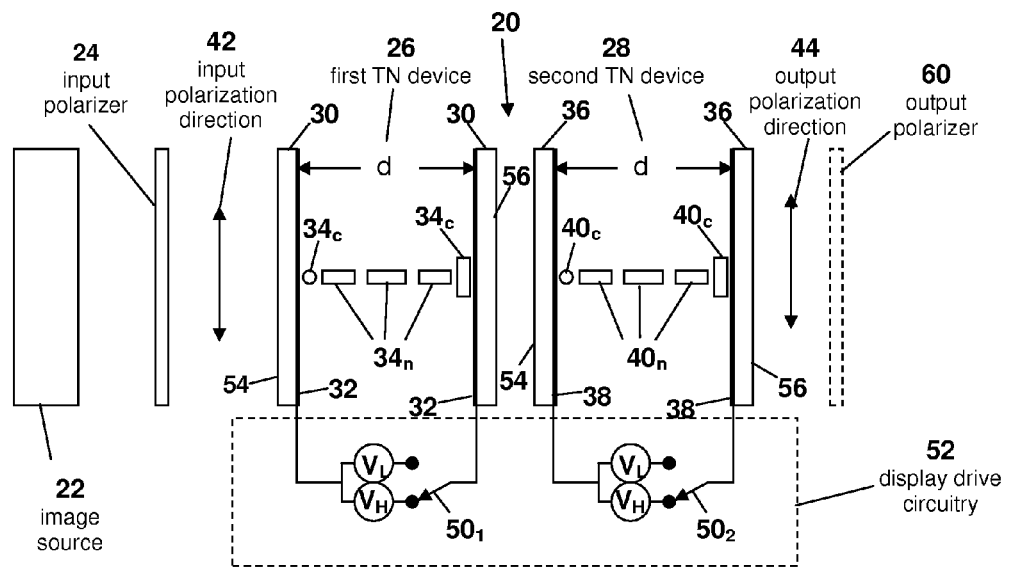

FIG. 3B shows the same high voltage magnitude drive signals, $V_H$, applied to TN devices 26 and 28, which align surface-noncontacting directors $34_n$ and $40_n$ nearly perpendicular to the liquid crystal device boundaries defined by electrode layers 32 and 38, respectively, except for thin layers of directors $34_c$ and $40_c$. Again, the combined TN devices 26 and 28 compensate at this voltage.

Figure 3C:
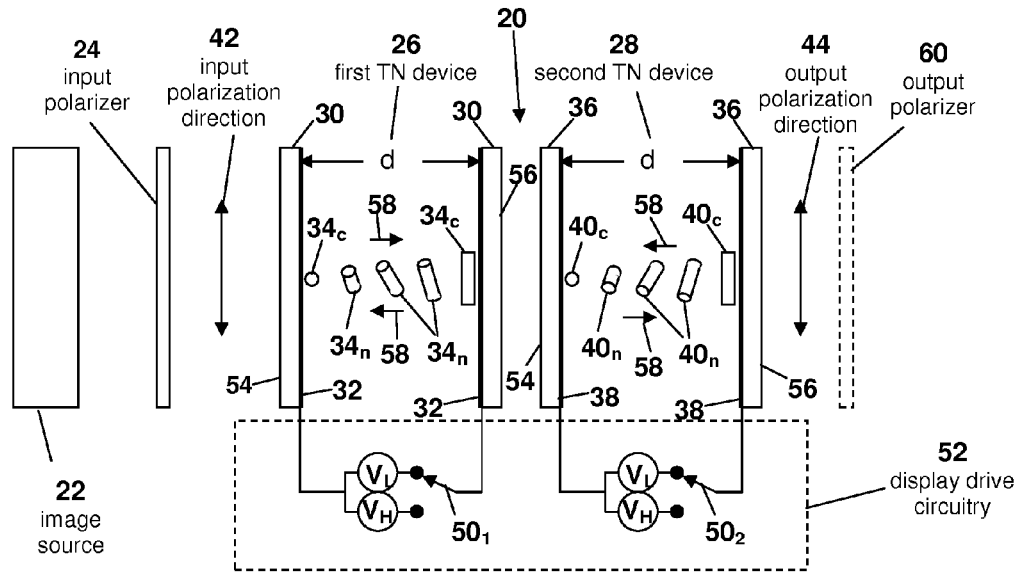

FIG. 3C shows a snapshot of the director orientation a short time after drive signals $V_H$ are removed from TN devices 26 and 28 and replaced by drive signals $V_L$, schematically indicated by the respective switch positions $50_1$ and $50_2$ in display drive circuitry 52. Small arrows 58 in the middle of each of TN devices 26 and 28 indicate that their respective surface-noncontacting directors $34_n$ and $40_n$ are in the process of relaxing back to the twisted state. Dynamic compensation takes place in this case.

Figure 3D:
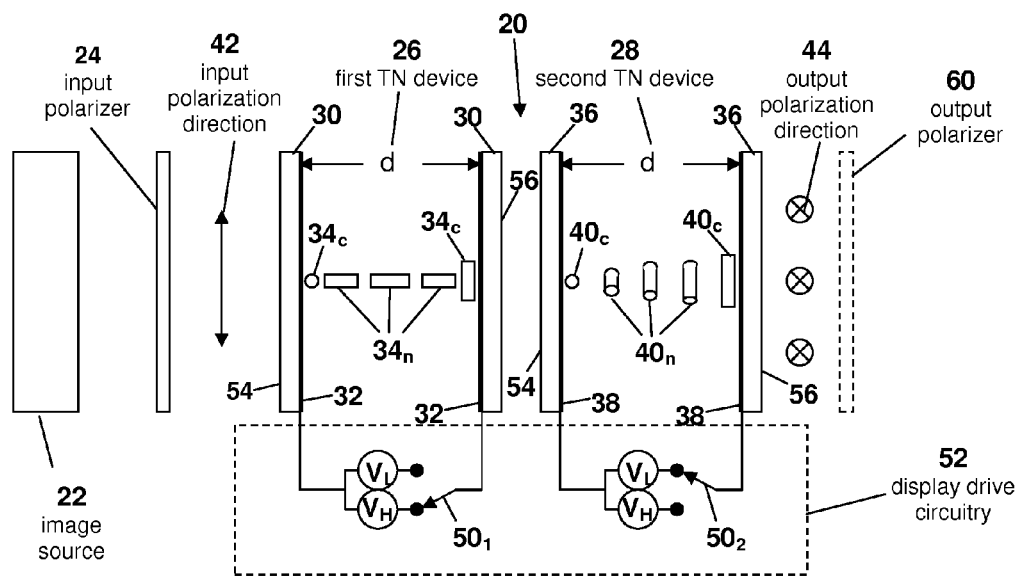

FIG. 3D shows the case in which TN device 26 is turned on with high voltage magnitude drive signal $V_H$ and TN device 28 remains at $V_L$. The combination of TN devices 26 and 28 no longer achieves compensation because the drive signals applied to TN devices 26 and 28 are different. First TN device 26 leaves the state of polarization unchanged, while second TN device 28 rotates the state of polarization by −90°. The combination of TN liquid crystal devices 26 and 28 therefore rotates the state of polarization by −90° from input polarization direction 42 to a horizontal output polarization direction 44.

Figure 4:
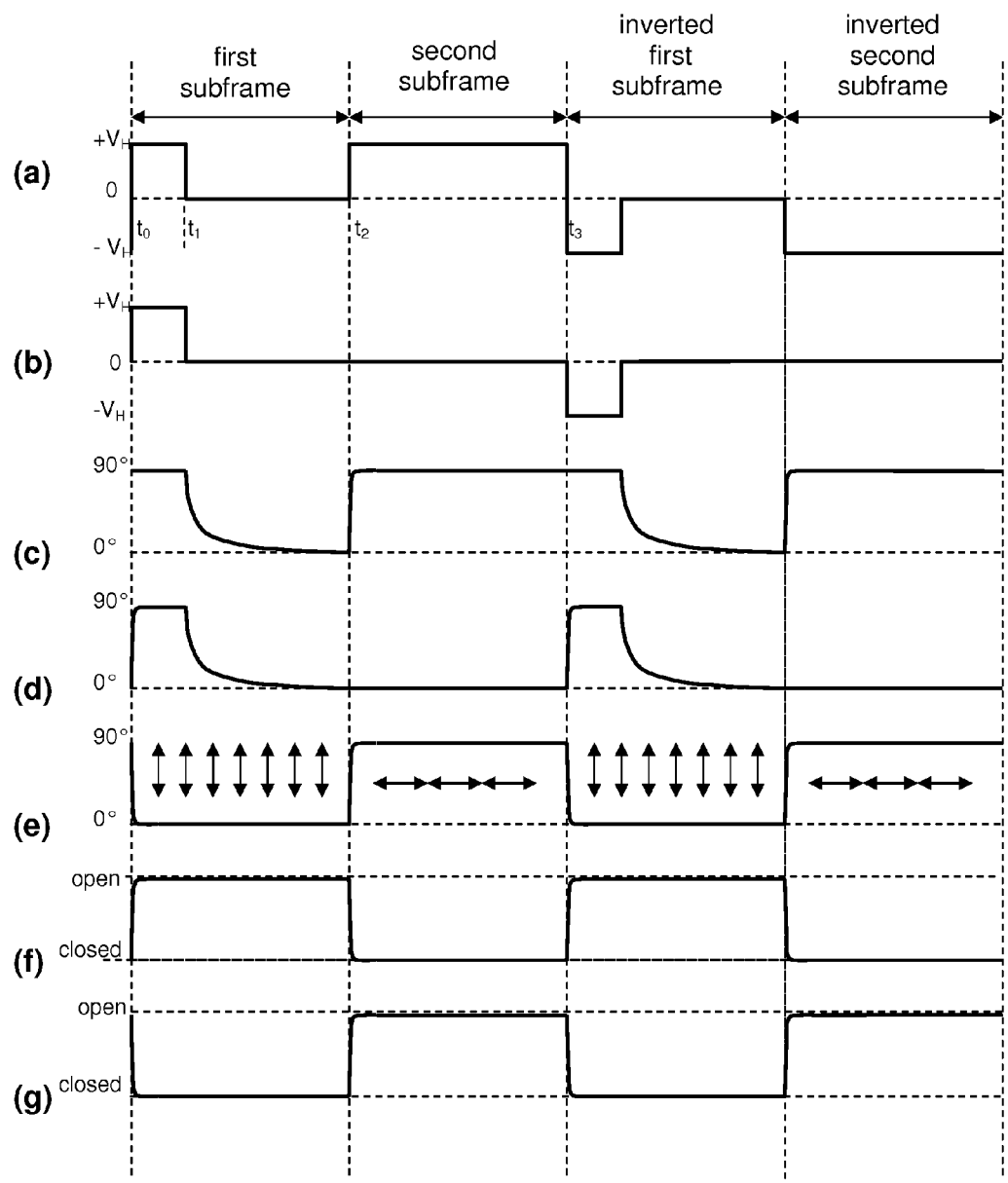
FIG. 4 illustrates for the first preferred embodiment of FIGS. 3A, 3B, 3C, and 3D a drive method that uses frame inversion for DC balancing and achieves rapid switching between two polarization states.

FIG. 4 illustrates for the first preferred embodiment an electronic drive scheme that results in fast, powered switching between two polarization states. FIG. 4, line (a) shows the drive signal applied to first TN device 26, and FIG. 4, line (b) shows the drive signal applied to second TN device 28.

At the beginning of a first subframe, t=$t_0$, a high voltage level +$V_H$ starting from −$V_H$ is applied to first TN device 26 and a high voltage level +$V_H$ starting from zero is applied to second TN device 28. The voltages +$V_H$ and −$V_H$ are of equal magnitudes, and the nematic liquid crystal material responds to them equally because it is not sensitive to polarity. Drive voltages of equal magnitudes but opposite signs are used to achieve net DC balancing to preserve the long-term stability of the liquid crystal material. The magnitude of $V_H$ is typically 25 volts, but it could be higher or lower depending on the desired switching speed and the threshold voltage of the liquid crystal material. First TN device 26 is already at the high voltage magnitude level $V_H$, and the transition from 0 to +$V_H$ in second TN device 28 is a powered transition, so compensation is rapidly achieved and the resulting polarization direction remains vertical at 0° as shown in FIG. 4, line (e) for this time period. FIG. 4, lines (c) and (d) indicate that the midlayer tilt angles of the directors in the middle of first and second TN devices 26 and 28 are nearly 90° at this voltage (see also FIG. 3B). At t=$t_1$, $V_L$, where $V_L$=0 in this case, is simultaneously applied to both of TN devices 26 and 28, and $t_1$ is chosen sufficiently early within the first subframe period that the liquid crystal material substantially relaxes to its equilibrium state before the end of the first subframe at t=$t_2$. This relaxation is indicated in FIG. 4, lines (c) and (d) by the decay of the midlayer tilt angles during this time period (see also FIG. 3C). TN devices 26 and 28 compensate throughout the first subframe, at first static compensation and later dynamic compensation while TN devices 26 and 28 relax in tandem. Even though relaxation is taking place, the optical effect of the unpowered, slow transitions from +$V_H$ to zero in both TN devices 26 and 28 at t=$t_1$ remains "hidden" (i.e., optically invisible to an observer) and the output polarization remains vertically polarized at 0° during the entire first subframe as indicated by FIG. 4, line (e). At the end of the first subframe, TN devices 26 and 28 are in the low voltage state indicated by FIG. 3A.

At the beginning of the second subframe, t=$t_2$, TN device 26 is turned on again with a high voltage level +$V_H$ while TN device 28 remains at the low voltage level $V_L$, as indicated on FIG. 4, lines (a) and (b) (see also FIG. 3D), and these drive voltages remain until the end of the second subframe at t=$t_3$. Switching first TN device 26 from zero to +$V_H$ at t=$t_2$ is a powered transition and is thus very fast. During the second subframe, TN devices 26 and 28 no longer compensate and the combination now acts like a 90° polarization rotator, as indicated in FIG. 4, line (e), with first TN device 26 having no effect on the input polarization while second TN device 28 performs the polarization direction rotation.

The next subframe, beginning at t=$t_3$, is an inverted first subframe in which the applied drive signal voltages have the same magnitudes but opposite signs to preserve DC balancing. In the same way, the following subframe is an inverted second subframe. The drive signal waveform repeats after the last subframe shown in FIG. 4. The portions of the curves in FIG. 4, lines (c), (d), and (e) in the voltage inverted subframes are the same as those of the first and second subframes, respectively, since the nematic liquid crystal is insensitive to polarity. This process of polarization switching can continue indefinitely, with the liquid crystal device combination passing vertically polarized light at 0° during the odd numbered subframes and horizontally polarized light at 90° during the even numbered subframes.

FIG. 4, lines (f) and (g) show the output optical transparency that would be seen by an observer wearing passive glasses or a passive decoder including a first viewing device, e.g., a vertically oriented analyzing polarizer in the left eyepiece lens, and a second viewing device, e.g., a horizontally oriented analyzing polarizer in the right eyepiece lens. Output polarizer 60 shown in FIGS. 3A, 3B, 3C, and 3D represents one of the two analyzing polarizers of the passive decoder. With this configuration, the left eyepiece lens would be open during odd numbered subframes and closed during even numbered subframes, and the right eyepiece lens would be open during the even numbered subframes and closed during the odd numbered subframes. This embodiment would be suitable for observers separated at some distance from the polarization switch, which may be affixed to imaging source 22, and the polarization coded left eye and right eye images transmitted through air, as would be the case in a movie theater. Stereoscopic 3D viewing would take place when imaging source 22 displays left eye images during the odd numbered subframes and right eye images during the even numbered subframes. The optical transitions shown by FIG. 4, lines (f) and (g) are very fast because they are powered transitions. The slower, unpowered transitions, which are used to reset the liquid crystal devices, remain hidden and never manifest themselves optically.

The system described in the first preferred embodiment switches linearly polarized light by 90° between vertically polarized and horizontally polarized directions. Rotating input polarizer 24 and TN devices 26 and 28 by 45° would result in polarization modulator 20 switching linearly polarized light between +45° and −45°, which would also work for a passive glasses system as long as the polarizer in the lens of each eyepiece is also rotated by 45°.

The polarization rotator of the first preferred embodiment could also be made to switch between right- and left-handed circularly polarized light by placing a quarter-wave plate at the output of the combined TN devices 26 and 28, with a principal axis oriented at 45° to the direction of linear polarization of light propagating from exit surface 56 of second TN device 28. In this case, the lenses of the passive glasses would also be provided with quarter-wave retarder films laminated in front of the polarizing films. The quarter-wave films could be of either the multi-film achromatic type or the simpler, single-film chromatic type.

Figure 5:
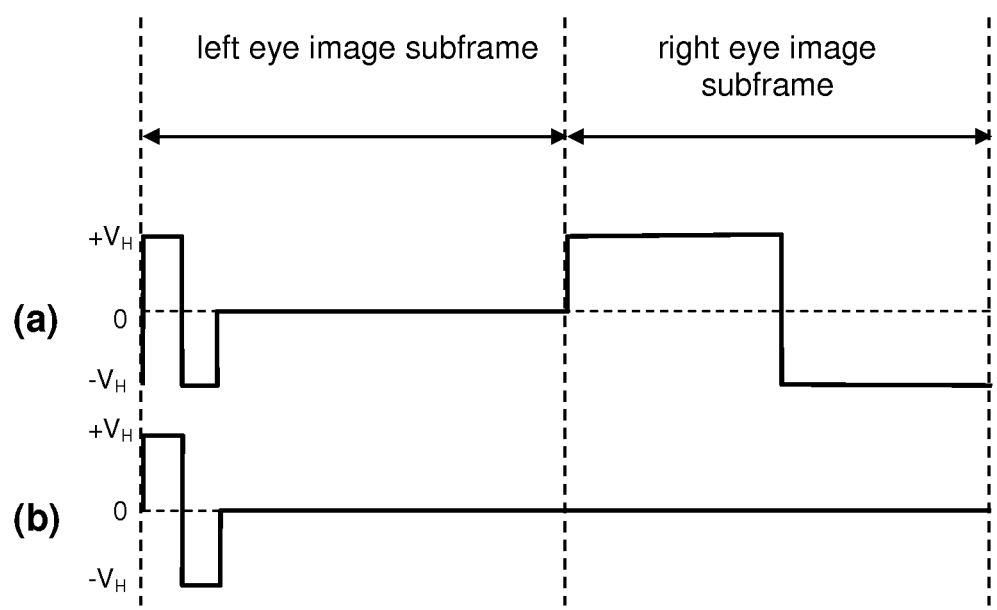
FIG. 5 illustrates for the first preferred embodiment of FIGS. 3A, 3B, 3C, and 3D a first alternative drive method that uses bipolar pulses to achieve DC balancing within each subframe.

Skilled persons will recognize that there is considerable freedom regarding the sequence of inverting the polarities of the voltages applied to first and second TN devices 26 and 28 of the first preferred embodiment to maintain DC balance. For example, instead of unipolar drive signal pulses of amplitudes +$V_H$ and −$V_H$ within the individual subframes, as shown in FIG. 4, lines (a) and (b), the pulses could also be bipolar types of amplitudes +$V_H$ and −$V_H$, which would then automatically DC balance on a subframe-by-subframe basis, as shown in FIG. 5. Furthermore, the drive signal waveforms applied to either one or both of first and second TN devices 26 and 28 could have their polarities reversed from those shown in FIG. 4, lines (a) and (b) without departing from the operating principle described. The drive signal waveforms applied to first and second TN devices 26 and 28 could also be interchanged.

Figure 6:
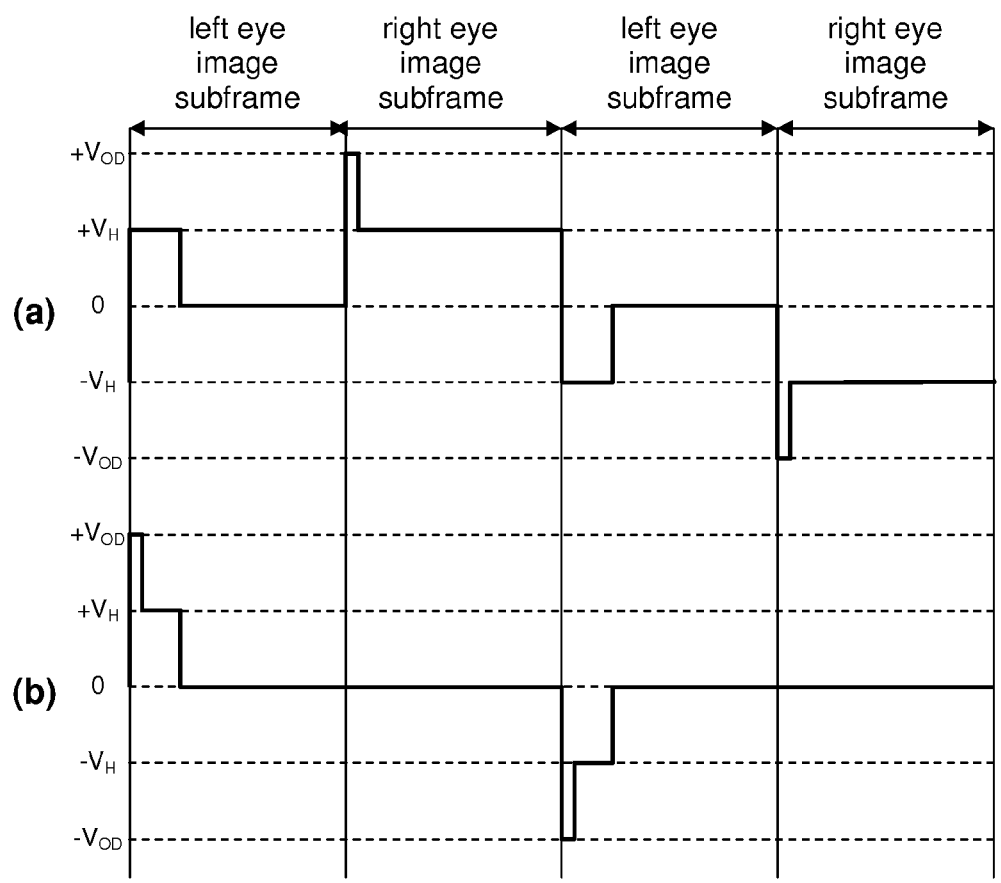
FIG. 6 illustrates for the first preferred embodiment of FIGS. 3A, 3B, 3C, and 3D a second alternative drive method that uses overdrive pulses to increase the switching speed.

The turn-on time from 0 to $V_H$ of the drive scheme of FIG. 4 can be made faster by application of a short overdrive pulse of magnitude $V_{OD}$ before the pulse of magnitude $V_H$ is applied, where $|V_{OD}|>|V_H|$. The amplitude and width of the overdrive pulse is chosen so that when the director field within the liquid crystal material reaches the state corresponding to the steady state $V_H$ voltage, the $V_{OD}$ pulse is turned off and the $V_H$ pulse is applied. This is illustrated in FIG. 6, lines (a) and (b) and is to be compared with FIG. 4, lines (a) and (b). With this overdrive scheme, it is possible to decrease the magnitude of $V_H$ and still have fast response times. This use of an overdrive pulse can significantly reduce power consumption, which is an important factor in battery-operated devices such as in some active 3D glasses.

Besides the TN mode, other liquid crystal electro-optic modes can also be used to perform polarization state compensation. A second preferred embodiment uses two electrically controlled birefringence (ECB) liquid crystal devices. ECB liquid crystal devices are of two types, those that use liquid crystal material with positive dielectric anisotropy and those that use liquid crystal material with negative dielectric anisotropy. This later type is also referred to as vertically aligned (VA) or vertically aligned nematic (VAN) modes. Both positive and negative types are suitable for polarization modulators when used according to the present disclosure.

Figure 7A:
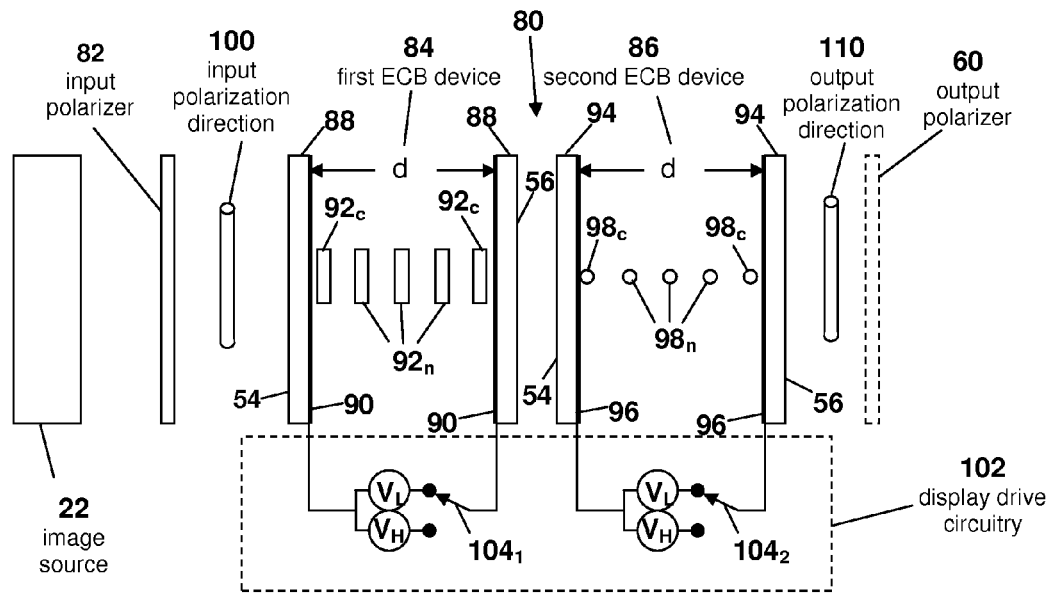
FIGS. 7A, 7B, 7C, and 7D show the effect on the output polarization imparted by various drive voltages applied to first and second positive ECB liquid crystal devices in a second preferred embodiment, which is a polarization modulator that can be incorporated in a stereoscopic 3D system using passive or active viewing glasses.

FIGS. 7A, 7B, 7C, and 7D show an example of a polarization modulator 80 using two positive ECB mode liquid crystal devices. FIG. 7A shows an input polarizer 82 at the left, followed by a first ECB liquid crystal device 84 and a second ECB liquid crystal device 86 combined in optical series. First ECB device 84 is constructed with liquid crystal material contained between glass substrate plates 88 having inner surfaces on which optically transparent electrode layers 90 are formed. The liquid crystal material includes electrode surface-contacting directors $92_c$ and electrode surface-noncontacting directors $92_n$. Second ECB device 86 is constructed with liquid crystal material contained between glass substrate plates 94 having inner surfaces on which optically transparent electrode layers 96 are formed. The liquid crystal material includes electrode surface-contacting directors $98_c$ and electrode surface-noncontacting directors $98_n$. The two ECB liquid crystal devices 84 and 86 satisfy the conditions for compensation as discussed earlier. Light propagating from image source 22 exits polarizer 82 in an input polarization direction 100, which is shown by a tilted cylinder indicating that the direction of polarization makes a +45° angle with the plane of the figure.

FIG. 7A shows a drive signal low voltage magnitude level, $V_L$, applied to both ECB devices 84 and 86 from display drive circuitry 102. Drive signal level $V_L$ is below the ECB threshold voltage or even zero. At this voltage, directors $92_c$ and $92_n$ in first ECB device 84 lie in the plane of the figure and parallel to substrate plates 88, and directors $98_c$ and $98_n$ in second ECB device 86 lie in a plane perpendicular to the figure and parallel to substrate plates 94. This is shown by cylinders $92_c$ and $92_n$ representing the local directors viewed side-on in first ECB device 84 and cylinders $98_c$ and $98_n$ viewed end-on in second ECB device 86. Small pretilt angles of surface-contacting directors $92_c$ and $98_c$ relative to the inner surfaces of the respective substrate plates 88 and 94 are not shown. Within each ECB device 84 and 86, the local directors are parallel to one another. At the applied drive signal level $V_L$, both ECB devices 84 and 86 are characterized by an in-plane retardation $\Gamma_0$, which is the same for each of them. In FIG. 7A, the two ECB devices 84 and 86 compensate, and the state of polarization of the incident light remains unchanged after passing through the combination of them.

Figure 7B:
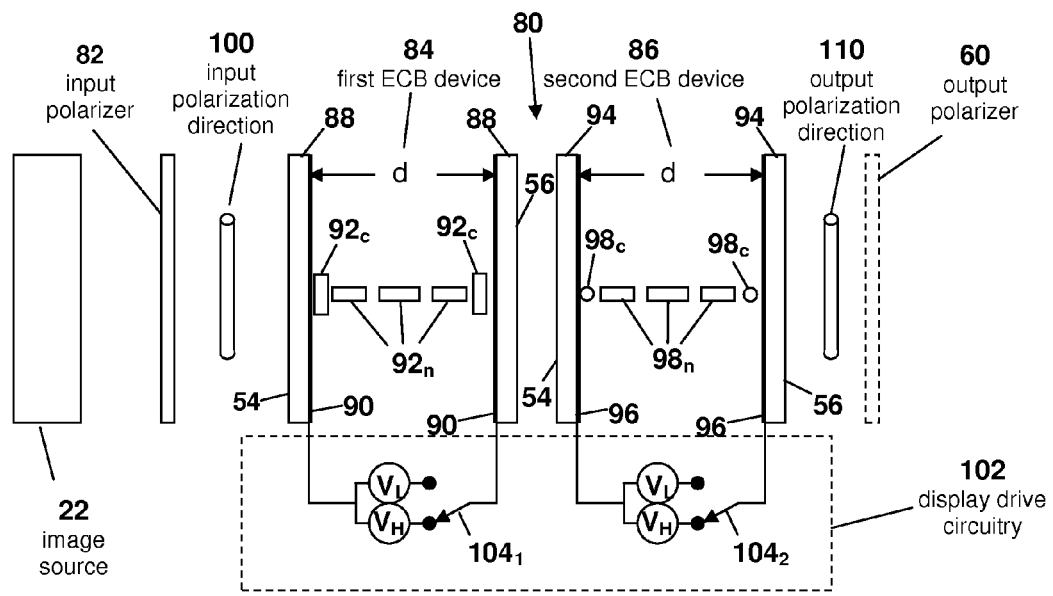

FIG. 7B shows the same drive signal high voltage magnitude level, $V_H$, applied to both first ECB device 84 and second ECB device 86 and thereby aligns directors $92_n$ and $98_n$ nearly perpendicular to the liquid crystal device boundaries defined by electrode layers 90 and 96, respectively, but not thin surface layers of directors $92_c$ and $98_c$. Because of the thin surface layers of directors $92_c$ and $98_c$, there is a small residual in-plane retardation $\Gamma_R$ associated with each of ECB devices 84 and 86; but since the slow axes of $\Gamma_R$ for ECB devices 84 and 86 are orthogonally aligned, they still compensate.

Figure 7C:
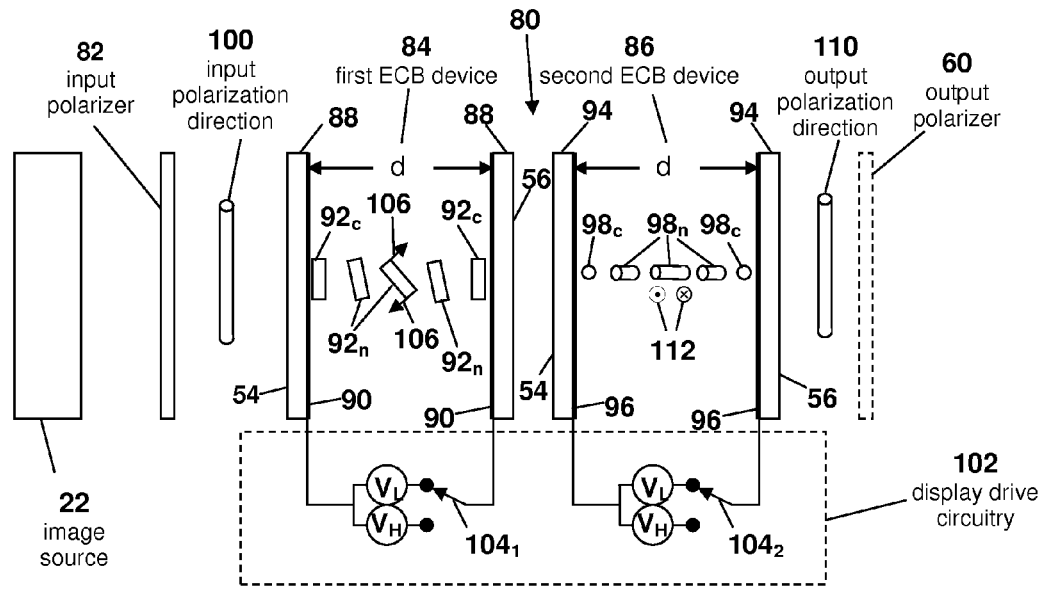

FIG. 7C shows a snapshot in time of the director orientation a short time after drive signal level $V_H$ is removed from ECB devices 84 and 86 and replaced by drive signal level $V_L$, schematically indicated by the switch positions of respective switches $104_1$ and $104_2$ in display drive circuitry 102. Small arrows 106 shown on the center director of surface-noncontacting directors $92_n$ in first ECB device 84 indicate that the center director is in the process of rotating back to the parallel state indicated by FIG. 7A. The same rotation takes place in second ECB device 86 as indicated by arrows 112 pointing into and out of the plane of the figure symbolized by ⊗ and ⊙, respectively. Surface-noncontacting directors $92_n$ relax in first ECB device 84 by rotating in the plane of the figure, and surface noncontacting directors $98_n$ relax in second ECB device 86 by rotating about axes perpendicular to directors $92_n$ and lying in the plane of the figure. Dynamic compensation takes place in this case.

Figure 7D:
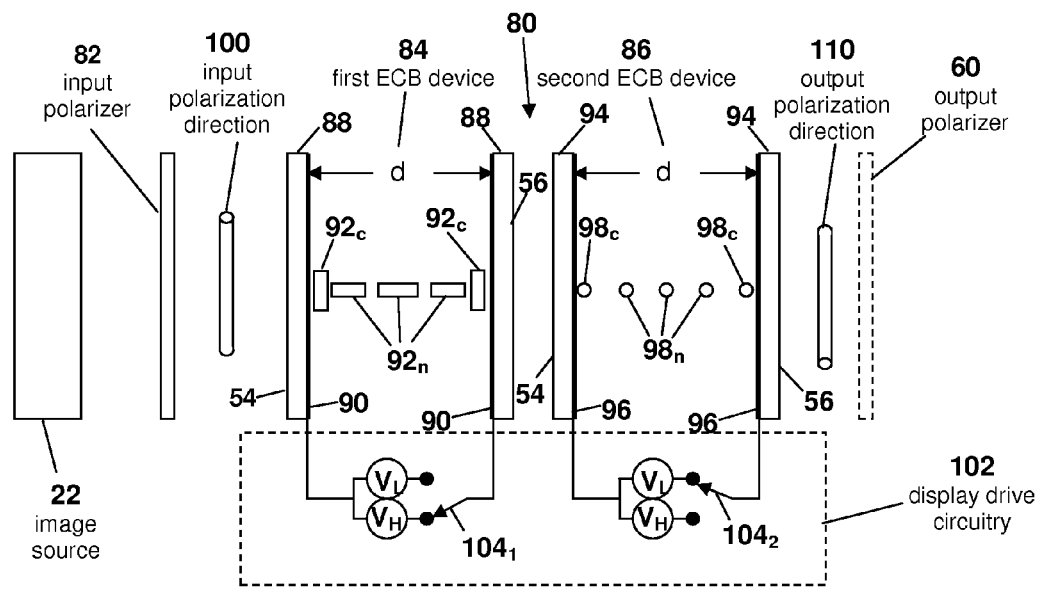

FIG. 7D shows the case in which first ECB device 84 is turned on with a drive signal high voltage magnitude level $V_H$ and ECB device 86 remains at $V_L$. The combination of ECB devices 84 and 86 no longer compensates because the drive signals applied to ECB devices 84 and 86 are different. First ECB device 84 introduces a residual in-plane retardation of $\Gamma_R$, and second ECB device 86 introduces an in-plane retardation of $\Gamma_0$, thereby resulting in an overall retardation of $\Gamma_0-\Gamma_R$ since the slow axes of the residual and in-plane retardations make a 90° angle with each other. A polarization rotation of 90° for polarization modulator 80 is obtained with $\Gamma_0-\Gamma_R=\lambda/2$, where $\lambda$ is the design wavelength of light as indicated by output polarization direction 110.

The second preferred embodiment using two ECB devices 84 and 86 constructed with a nematic liquid crystal mixture having positive dielectric anisotropy has been realized experimentally. Each of the ECB devices was made using indium tin oxide (ITO) coated glass substrates, and liquid crystal director alignment was provided with rubbed polyimide such that, when the two substrates were assembled, the rub directions on the top and bottom substrates were anti-parallel to each other. The pretilt angle of the surface-contacting directors was about 4°, and a cell gap, d, of 2.5 μm was provided using spacers in the seal material. The ECB liquid crystal devices were filled with the nematic liquid crystal mixture MLC-7030 available from Merck KGaA, Darmstadt, Germany. The MLC-7030 mixture has a birefringence of 0.1102.

Figure 8A:
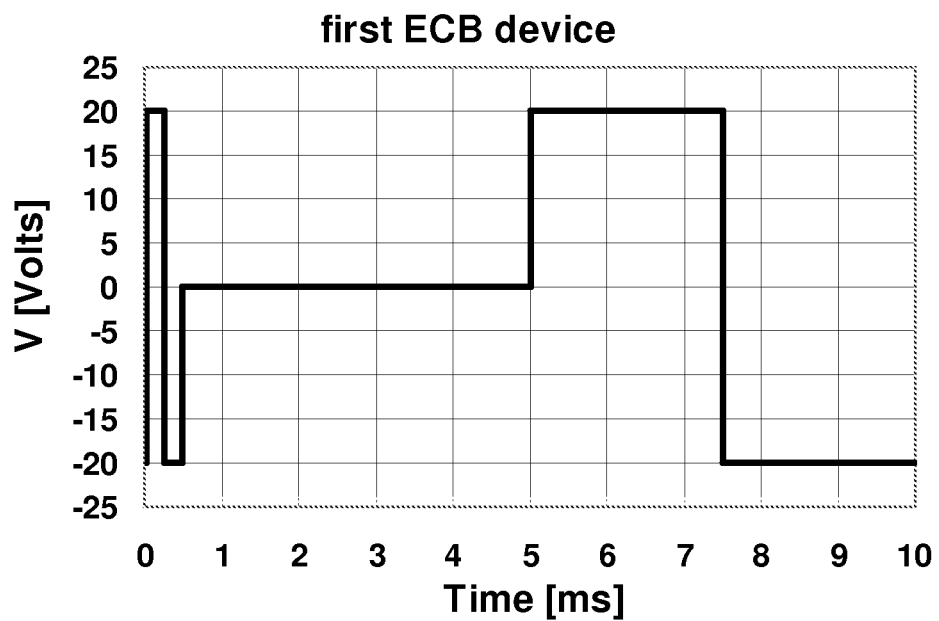
FIGS. 8A, 8B, 8C, and 8D show, for the second embodiment of FIGS. 7A, 7B, 7C, and 7D, measured drive waveforms and optical switching response of a light shutter using two positive ECB liquid crystal devices.
Figure 8B:
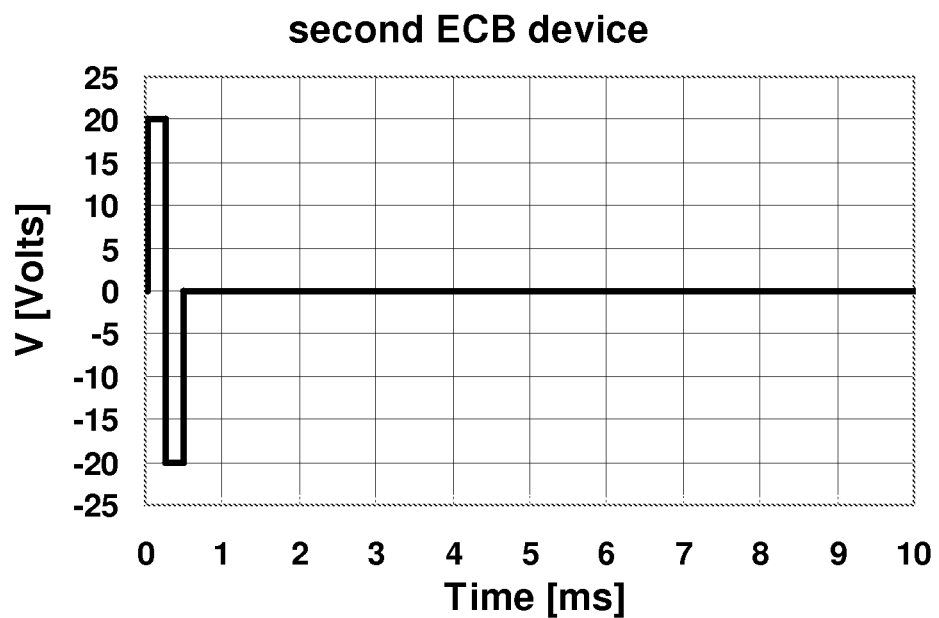
Figure 8C:
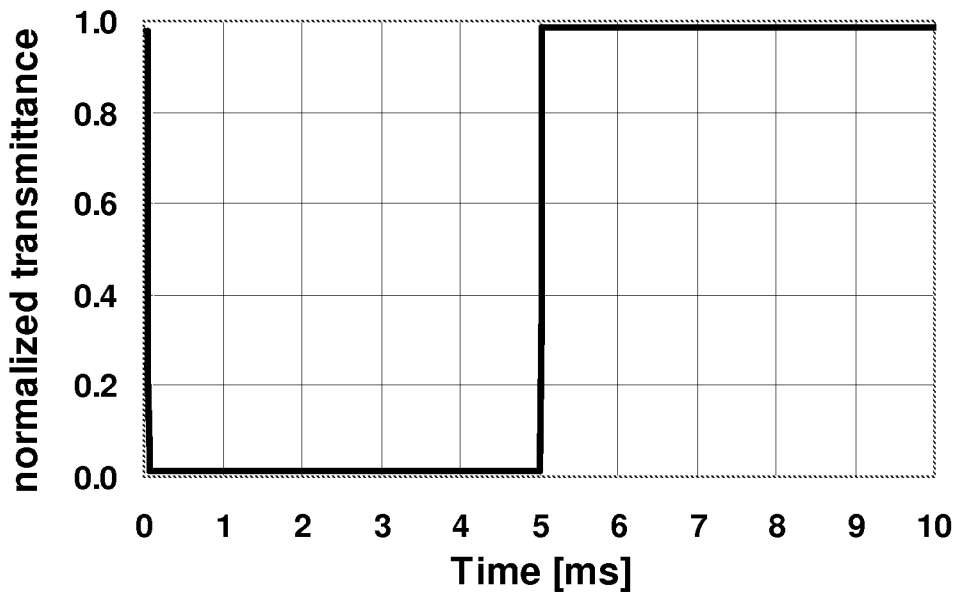
Figure 8D:
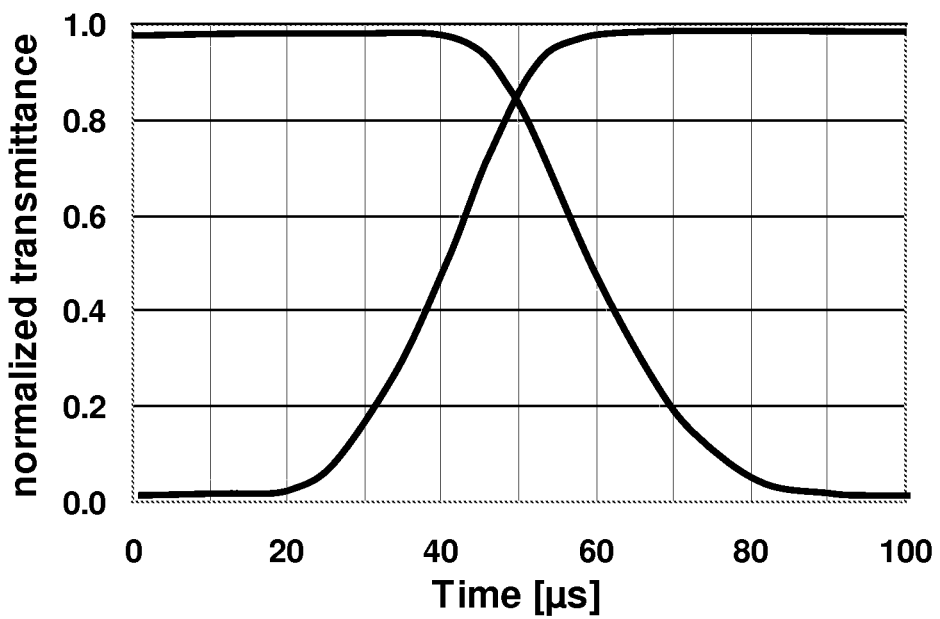

FIGS. 8A and 8B show the drive signal waveforms applied to first and second ECB devices 84 and 86. In this case, the subframe period was 5.0 ms, corresponding to a frequency of 200 Hz. Bipolar drive signal pulses were chosen in this case to provide DC balancing within each subframe as discussed earlier. A 0.25 ms-wide +20 volt pulse followed by a 0.25 ms-wide −20 volt pulse was applied to both ECB devices 84 and 86 at the beginning of the first subframe. After these pulses, both ECB devices 84 and 86 received 0 volts for the remainder of the 5 ms subframe. At the beginning of the second subframe, first ECB device 84 received a 2.5 ms-wide +20 volt pulse followed by a 2.5 ms-wide −20 volt pulse, while second ECB device 86 was maintained at 0 volts. FIG. 8C shows the measured optical response when polarization modulator 80 was placed between orthogonally aligned polarizers with the alignment direction of first ECB device 84 making a 45° angle with input polarization direction 100. Measurements were taken at 25° C. Both turn-off and turn on times were sub-millisecond, and there was no optical manifestation of the dynamic compensation that took place during the period between 0.5 ms and 5 ms, which means that the decay of the director fields in ECB devices 84 and 86 very precisely tracked each other. FIG. 8D is an expanded version of FIG. 8C near the transitions, showing the optical shutter having about a 60 μs turn-on time and about an 80 μs turn-off time. These response times are sufficiently short to permit operation at switching frequencies as high as 480 Hz.

A third preferred embodiment is a polarization state modulator that uses two pi-cells rather than two ECB liquid crystal devices. Like the ECB device, the pi-cell is a liquid crystal device having an in-plane retardation that is controlled with a voltage. The pi-cell has a similar construction to that of the positive ECB liquid crystal device, except the polyimide rub directions of the assembled substrate plates are in a parallel direction rather than in an anti-parallel direction. The director field inside the pi-cell is, however, quite different from that of the positive ECB liquid crystal device in that the surface-noncontacting directors in the middle of the liquid crystal layer are perpendicular to the liquid crystal device boundaries for both the high voltage and low voltage drive signal states and in that most of the switching takes place near the boundaries of the liquid crystal device.

Figure 9A:
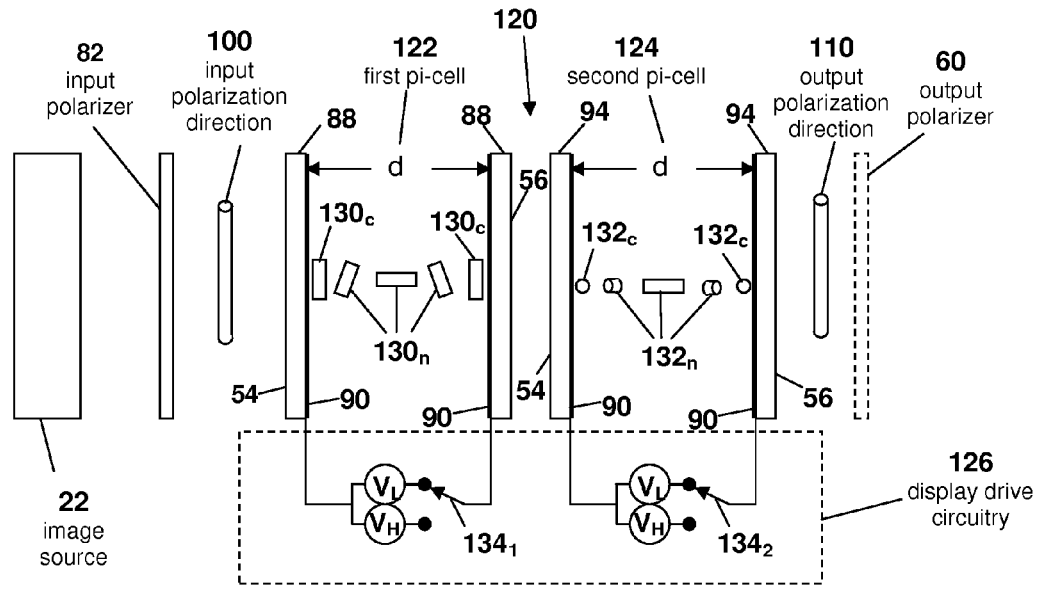
FIGS. 9A, 9B, 9C, and 9D show the effect on the output polarization imparted by various drive voltages applied to first and second liquid crystal pi-cells in a third preferred embodiment, which is a polarization modulator that can be incorporated in a stereoscopic 3D system using passive or active viewing glasses.

FIGS. 9A, 9B, 9C, and 9D show an example of a polarization modulator 120 using two pi-cells. FIG. 9A shows input polarizer 82 at the left followed by a first pi-cell 122 and a second pi-cell 124 combined in optical series. ECB devices 84 and 86 of FIGS. 7A, 7B, 7C, and 7D exhibit surface-contacting director parallel alignment, and pi-cells 122 and 124 exhibit surface-contacting director anti-parallel alignment; otherwise, these liquid crystal devices are similar and their corresponding components are identified by the same reference numerals. Pi-cells 122 and 124 are arranged so that the projections of their optic axes on the light communicating surfaces (i.e., entrance surface 54 and exit surface 56) of pi-cells 122 and 124 are orthogonally related. The two pi-cells 122 and 124 satisfy the conditions for compensation as discussed earlier. Light propagating from image source 22 exits polarizer 82 in input polarization direction 100, which is shown by a tilted cylinder indicating that the direction of polarization makes a +45° angle with the plane of the figure.

FIG. 9A shows a drive signal low voltage magnitude level, $V_L$, applied to pi-cells 122 and 124 from display drive circuitry 126. Drive signal level $V_L$ is often referred to as a bias voltage, which is used to prevent the internal director field structure of the pi-cell from transforming to an unwanted splay state structure. For this reason, drive signal level $V_L$ is generally not zero. At the applied drive signal level $V_L$, surface-noncontacting directors $130_n$ in first pi-cell 122 lie in the plane of the figure and surface-noncontacting directors $132_n$ in second pi-cell 124 lie in a plane perpendicular to the plane of the figure and substrate plates 94. At the applied drive signal level $V_L$, both pi-cells 122 and 124 are characterized by an in-plane retardation $\Gamma_0$, which is the same for each of them. In FIG. 9A, the two pi-cells 122 and 124 compensate, and the state of polarization of the incident light remains unchanged after passing through the combination of them.

Figure 9B:
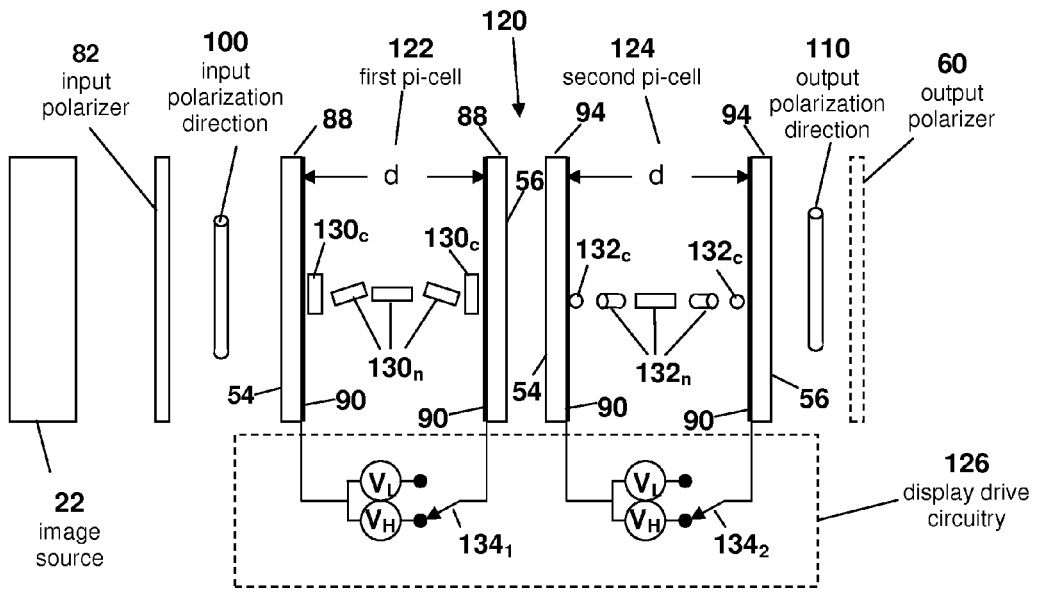

FIG. 9B shows the same drive signal high voltage magnitude level, $V_H$, applied to both first pi-cell 122 and second pi-cell 124 and thereby aligns directors $130_n$ and $132_n$ near the liquid crystal device boundaries to be more perpendicular to substrate plates 88 and 94, respectively. Because of the thin surface layers of directors $130_c$ and $132_c$, there is a small residual in-plane retardation $\Gamma_R$ associated with each of pi-cells 122 and 124; but since the slow axes of $\Gamma_R$ for pi-cells 122 and 124 are orthogonally aligned, they still compensate.

Figure 9C:
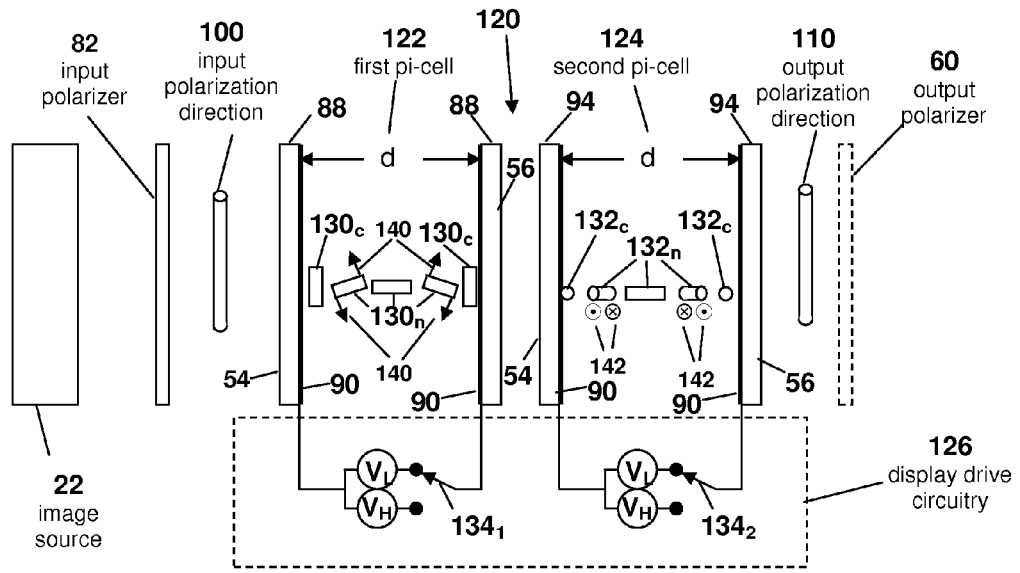

FIG. 9C shows a snapshot in time of the director orientation a short time after drive signal level $V_H$ is removed from pi-cells 122 and 124 and replaced by drive signal level $V_L$, schematically indicated by the switch positions of respective switches $134_1$ and $134_2$ in drive circuitry 126. Small arrows 140 shown on surface-noncontacting directors $130_n$ in first pi-cell 122 indicate that they are in the process of rotating back to the drive signal level $V_L$ state indicated by FIG. 9A. The same rotation takes place in second pi-cell 124 as indicated by arrows 142 pointing into and out of the plane of the figure symbolized by ⊗ and ⊙, respectively. Surface-noncontacting directors $130_n$ relax in first pi-cell 122 by rotating in the plane of the figure, and surface-noncontacting directors $132_n$ relax in second pi-cell 124 by rotating about axes perpendicular to directors $132_n$ and lying in the plane of the figure. Dynamic compensation takes place in this case.

Figure 9D:
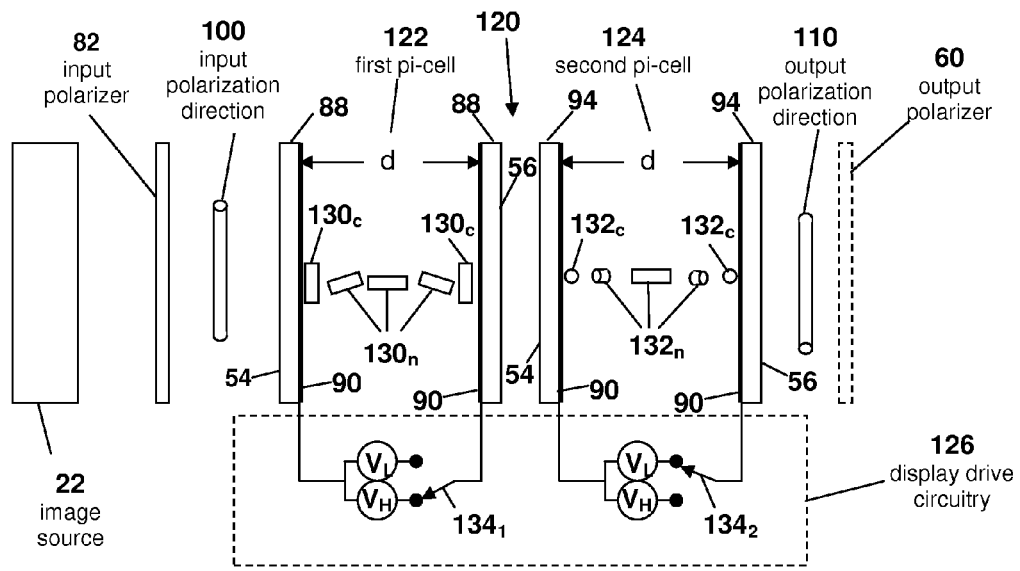

FIG. 9D shows the case in which first pi-cell 122 is turned on with a drive signal high voltage magnitude level $V_H$ and second pi-cell 124 remains at $V_L$. The combination of pi-cells 122 and 124 no longer compensates because the drive signals applied to pi-cells 122 and 124 are different. First pi-cell 122 introduces a residual in-plane retardation of $\Gamma_R$, and second pi-cell 124 introduces an in-plane retardation of $\Gamma_0$, thereby resulting in an overall retardation of $\Gamma_0 - \Gamma_R$ since the slow axes of the two in-plane retardations make a 90° angle with each other. A polarization rotation of 90° for polarization modulator 120 is obtained with $\Gamma_0 - \Gamma_R = \lambda/2$, where $\lambda$ is the design wavelength of light as indicated by output polarization direction 110.

Figure 10:
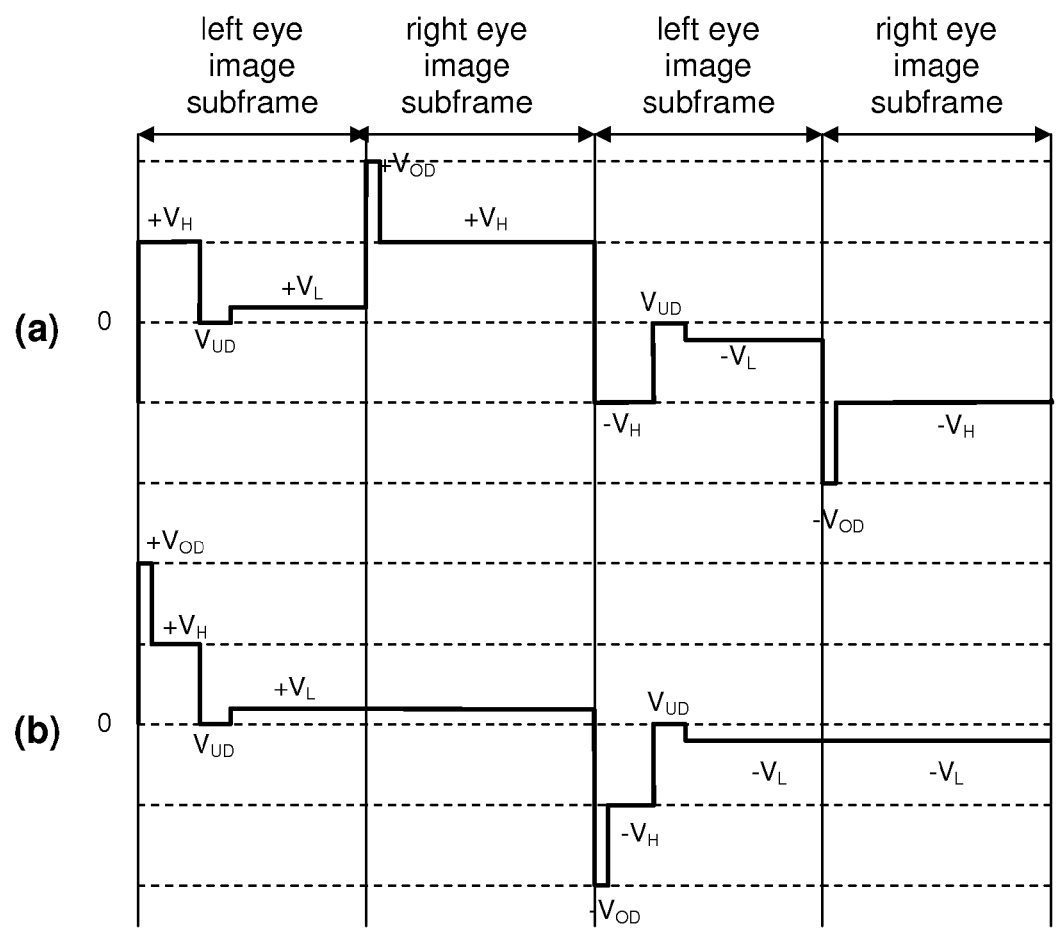
FIG. 10 illustrates a drive method using a combination of overdrive and underdrive pulses to increase the switching speed.

The voltage level $V_L$ for the pi-cell cannot be set to zero because of splay state appearance, and this slows the $V_H$ to $V_L$ drive signal level transition that would be faster if the pi-cell could be switched to a voltage magnitude less than $V_L$, ideally even zero. However, it is possible to speed up the transition by switching to a voltage that is less than $V_L$, if it is only for a short time. This is known as the underdrive technique. The underdrive voltage is $V_{UD}$ where $V_{UD} < V_L$. The underdrive technique can also be combined with the overdrive technique shown in FIG. 6 to obtain faster rise and fall times. FIG. 10 shows the combination of overdrive and underdrive with $V_{UD} = 0$. FIG. 10, line (a) shows the drive signal waveform applied to first pi-cell 122, and FIG. 10, line (b) shows the drive signal waveform applied to second pi-cell 124.

Figure 11A:
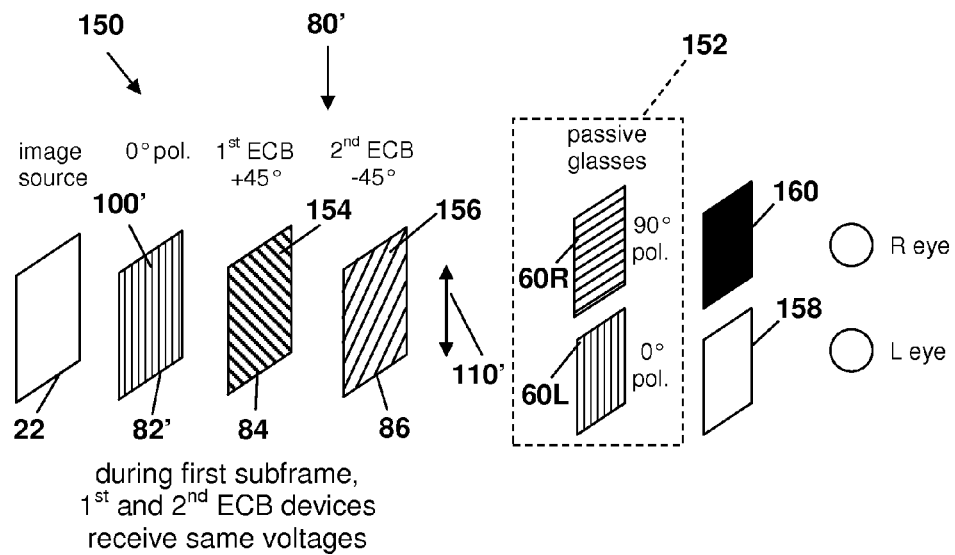
FIGS. 11A and 11B show a passive stereoscopic 3D viewing system constructed with the polarization modulator of FIGS. 7A, 7B, 7C, and 7D.
Figure 11B:
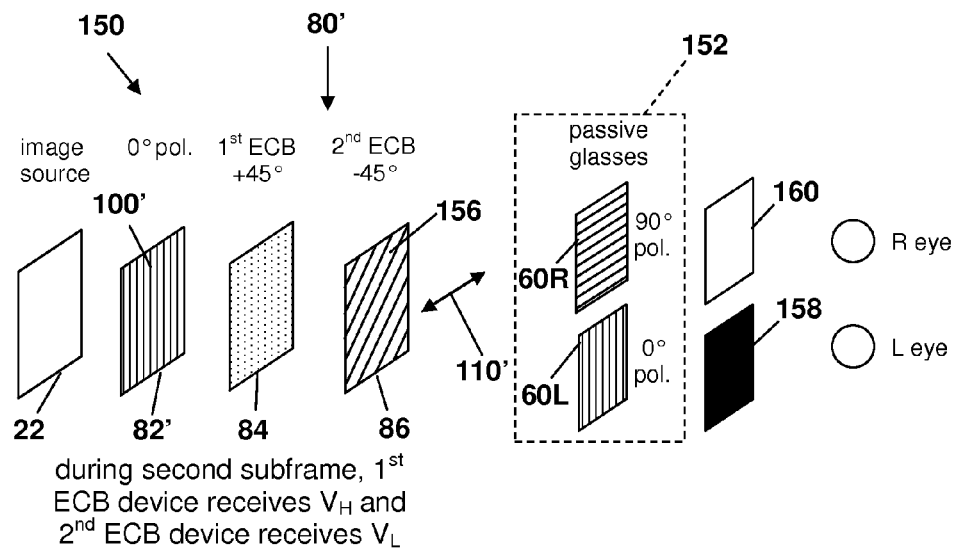

FIGS. 11A and 11B show an example in which a polarization modulator 80' with first ECB device 84 and second ECB device 86, as shown in FIGS. 7A, 7B, 7C, and 7D, is used in a stereoscopic 3D viewing system 150 using passive glasses 152. In this example, an input polarizer 82' is a linear polarizer with a vertical input polarization direction 100', and first and second ECB devices 84 and 86 in their nonactivated states are essentially half-wave optical retarders. First ECB device 84 has its slow axis 154 oriented at +45° relative to the vertical axis, and second ECB device 86 has its slow axis 156 oriented at −45° relative to the vertical axis. Output polarizers 60R and 60L reside in the respective right and left eyepiece lenses of passive glasses 152 worn by the viewer. In this example, polarizer 60R positioned in front of the right eye, R eye, is a linear polarizer with a horizontal polarization direction (90°), and polarizer 60L positioned in front of the left eye, L eye, is a linear polarizer with a vertical polarization direction (0°). System 150 can be used to view stereoscopic images in a direct view system in which image source 22 is a television screen with polarization modulator 80' placed over it. System 150 can also be used to view images in a stereoscopic projection system in which polarization modulator 80' is placed inside or in front of a projector-type image source 22 that projects polarization-modulated images onto a screen that is viewed by an observer wearing passive glasses 152.

The basic operation of the example of FIGS. 11A and 11B is described below with reference also to FIGS. 8A, 8B, and 8C. With reference to FIG. 11A, during the first subframe when ECB devices 84 and 86 receive the same voltages, output polarization direction 110' is polarized in the same 0° (vertical) direction as input polarization direction 100'. The images incident on the right eyepiece lens are blocked because the transmission axis of its associated polarizer 60R is oriented at 90°, while the images incident on the left eyepiece lens are transmitted because the transmission axis of its associated polarizer 60L is oriented at 0°. Thus, during the first subframe when image source 22 is showing the left eye view, it is transmitted (clear rectangle 158) to the left eye and blocked (dark rectangle 160) from the right eye.

With reference to FIG. 11B, during the second subframe, $V_H$ is applied to first ECB device 84 and $V_L$ is applied to second ECB device 86, resulting in a net half-wave retardation at the design wavelength. At the design wavelength, this combination of applied voltages has the effect of rotating by 90° the 0° input polarization 100' so that output polarization direction 110' is 90° (horizontal). Now the image is transmitted (clear rectangle 160) to the right eye with its associated 90° polarizer 60R and blocked (dark rectangle 158) to the left eye with its associated polarizer 60L oriented at 0°. Thus, during the second subframe when image source 22 is showing the right eye view, it is transmitted to the right eye and blocked from the left eye.

However, during the second subframe, the combination of first and second ECB devices 84 and 86 exhibits the properties of a half-wave retarder only at the design wavelength, which is usually 550 nm, where the eye is most sensitive. At wavelengths other than the design wavelength, output polarization state 110' is no longer linear input polarization state 100' rotated by 90° but rather an elliptically polarized state. This non-ideal behavior causes diminished light transmission through system 150 in the clear, transmissive state at the non-design wavelengths and, more importantly, light leakage through system 150 in the light blocking state at the non-design wavelengths. This light leakage causes objectionable ghosting that is observable by the viewer of the 3D image. This nonideality of the clear and light blocking states does not occur during the first subframe because ECB devices 84 and 86 compensate for all wavelengths, resulting in linear output polarization in a vertical direction for all wavelengths. For this case, the light leakage in the light blocking state can be very low because it is determined essentially only by the quality of the polarizers used.

Figure 12:
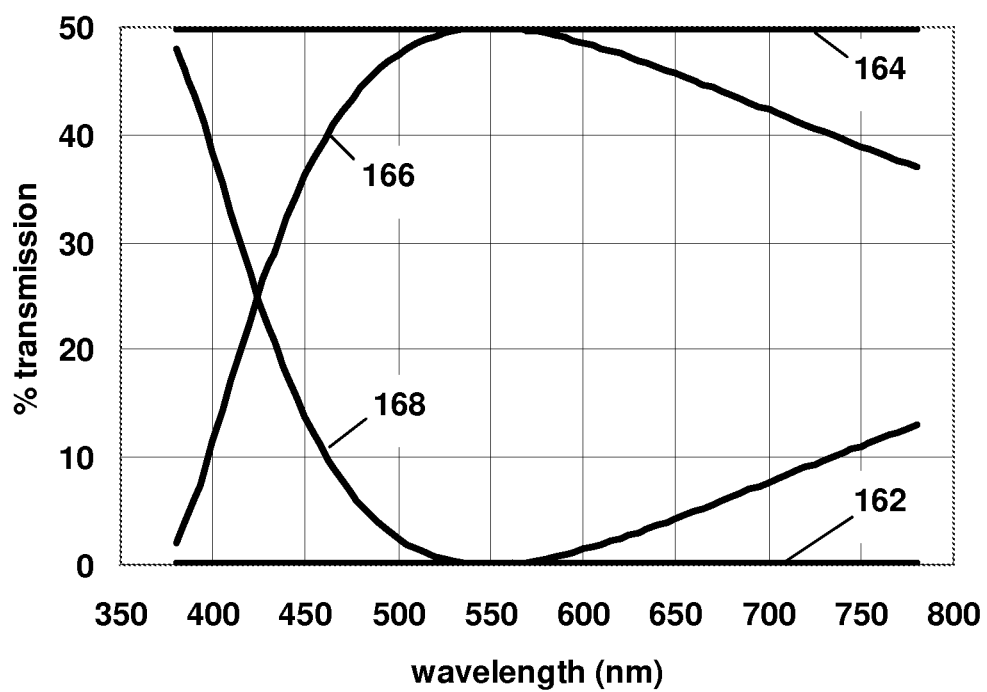
FIG. 12 shows simulated optical transmission spectra of clear and light blocking states produced during first and second subframes of the passive stereoscopic 3D viewing system of FIGS. 11A and 11B.

FIG. 12 shows simulated optical transmission spectra of the clear and light blocking states produced during the first and second subframes of system 150 shown in FIGS. 11A and 11B. For simplicity, ideal polarizers, which are defined to have 50% transmission in unpolarized light, were used in the simulation. The liquid crystal material used was MLC-7030, available from Merck GmbH, Darmstadt, Germany. During the first subframe, a right eye light transmission curve 162 indicates 0% transmission and a left eye light transmission curve 164 indicates 50% transmission over the entire visible spectrum. However, during the second subframe, a right eye light transmission curve 166 indicates 50% transmission and a left eye light transmission curve 168 indicates 0% transmission only at the design wavelength, which was 550 nm in this case. Light transmission curves 166 and 168 show that, at other wavelengths, light transmission in the clear, transmissive state is decreased and light transmission in the light blocking state is increased.

A disadvantage of system 150 is the amount of light leakage in the light blocking state of the left eye at wavelengths other than the design wavelength. This means that the right eye image leaks through and is seen by the left eye as objectionable ghost images. The simulated contrast ratio is only 38.1 for the left eye. Another disadvantage of system 150 is that additional ghosting effects occur whenever the viewer's head is tilted laterally because output polarization direction 110 of modulator 80' is no longer orthogonally aligned with the polarization axes of one of the polarizers in passive glasses 152, thereby allowing a component of the unwanted polarization to leak through in the light blocking state for each eye.

The foregoing example can be made insensitive to the tilt angle of the viewer's head, at least at the design wavelength, by introducing an external quarter-wave film with its slow axis oriented, relative to the vertical axis, at +45° to the output polarization direction, as described earlier in connection with the first preferred embodiment shown in FIGS. 3A, 3B, 3C, and 3D. The quarter-wave film enables the polarization modulator to switch between right- and left-handed circularly polarized light instead of orthogonal linearly polarized states. Quarter-wave films are also introduced at the light input side of the passive glasses to decode the right- and left-handed circular polarizations. For the right eye, the quarter-wave film is oriented with its slow axis at −45° relative to the vertical axis; and for the left eye, the quarter-wave film is oriented with its slow axis at +45° relative to the vertical axis. The quarter-wave film is followed by a linear polarizer with its polarization direction oriented at 90° for both eyes. An example using this scheme implemented in a stereoscopic 3D viewing system 150', which is a modified version of system 150, is shown in FIGS. 13A and 13B.

Figure 13A:
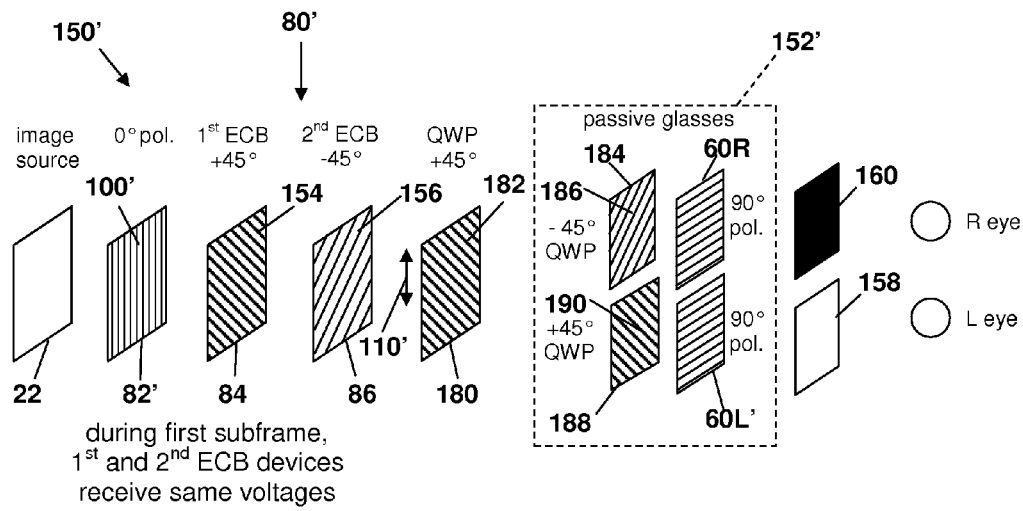
FIGS. 13A and 13B show the passive stereoscopic 3D viewing system of FIGS. 11A and 11B implemented so that the polarization modulator switches between right- and left-handed circularly polarized light.
Figure 13B:
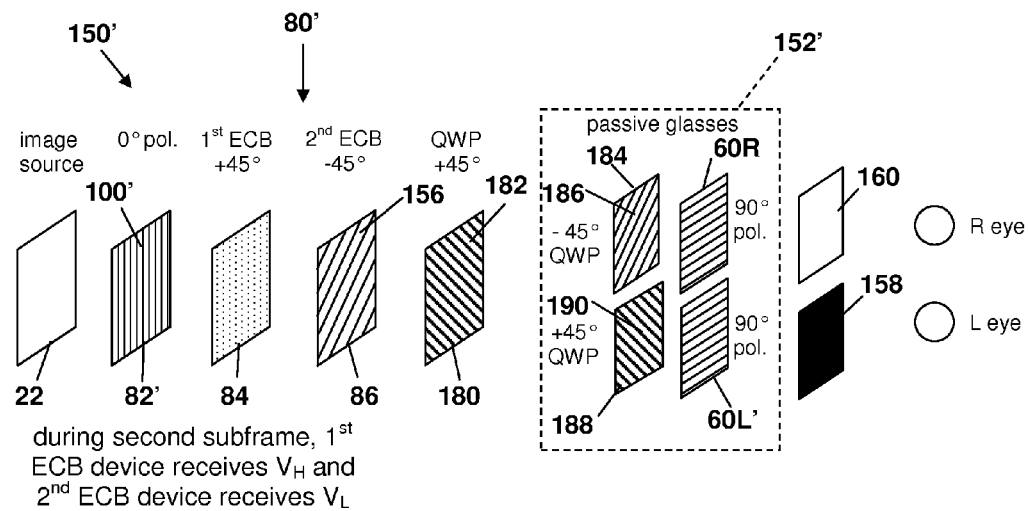

The basic operation of the example of FIGS. 13A and 13B is described below. With reference to FIG. 13A, during the first subframe, ECB devices 84 and 86 receive the same voltages and thus compensate with the result that output polarization direction 110' is polarized in the same 0° direction (vertical) as input polarization direction 100'. An external quarter-wave film 180 with its slow axis 182 oriented at +45° relative to the vertical axis compensates a quarter-wave film 184 with its slow axis 186 oriented at −45° relative to the vertical axis in the right eyepiece lens of passive glasses 152', so the light remains linearly polarized at 0°. This polarization direction is at right angles to the 90° transmission axis of right eyepiece lens polarizer 60R so that the image incident on the right eyepiece lens of passive glasses 152' is blocked from the right eye. For the left eyepiece lens of passive glasses 152', a quarter-wave film 188 has its slow axis 190 oriented at +45°, which is in the same direction as that of slow axis 182 of external quarter-wave film 180 at the output surface of ECB device 86, with the result that quarter-wave films 180 and 188 sum to a half-wave optical retarder. This half-wave retardation combination rotates linear input polarization direction 100' by 90°, making it parallel to the transmission direction of left eyepiece lens polarizer 60L', resulting in a clear, transmissive state.

With reference to FIG. 13B, during the second subframe, $V_H$ is applied to ECB device 84, and $V_L$ is applied to ECB device 86. The combination of ECB devices 84 and 86 acts, therefore, like a half-wave plate (HWP) with its slow axis oriented at −45° relative to the vertical axis. For the right eyepiece lens of passive glasses 152', quarter-wave films 180 and 184 compensate, resulting in an overall retardation of one-half wave in the total optical path, which rotates linear input polarization direction 100' by 90° making it parallel to the transmission direction of right eyepiece lens polarizer 60R, resulting in a clear, transmissive state. For the left eyepiece lens of passive glasses 152', the combination of quarter-wave film 188 and external quarter-wave film 180 is equivalent to a half-wave retarder with its slow axis oriented at +45° relative to the vertical axis. This combination compensates the half-wave retardation of the ECB device 84 and 86 combination with the result that the light exiting quarter-wave film 188 is linearly polarized at 0°, making it at right angles to the transmission direction of left eyepiece lens polarizer 60L', resulting in a blocked state for the left eye.

More detailed study of FIGS. 13A and 13B reveals that there is the potential for light leakage in the light blocking state for the left eye. During the first subframe, ECB devices 84 and 86 use the same liquid crystal mixtures and have the same cell gap, so they compensate for all wavelengths of image-carrying light. Similarly, if external quarter-wave film 180 and quarter-wave films 184 and 188 in passive glasses 152' are made of the same material, these films will also compensate in the right eyepiece lens for all wavelengths. The result is that image-carrying light incident on the right eyepiece is completely blocked from the right eye for all wavelengths.

However, during the second subframe, ECB devices 84 and 86 sum to a HWP at −45° relative to the vertical axis and external quarter-wave film 180 and quarter-wave film 188 in the left eyepiece lens sum to a HWP at +45° relative to the vertical axis. These two HWP combinations compensate to achieve a light blocking state without light leakage for the left eye under the following two additional conditions: (1) the design wavelength at which the combination of ECB devices 84 and 86 is a half-wave retarder is the same as the design wavelength of quarter-wave films 180, 184, and 188 in system 150'; and (2) the wavelength dispersion in the birefringence of the liquid crystal material used in ECB devices 84 and 86 is substantially the same as the wavelength dispersion in the birefringence of quarter-wave films 180, 184, and 188 in system 150'.

The nominal retardation of commercially available quarter-wave films is 140 nm, corresponding to a design wavelength of 560 nm. Since other values of retardance are unavailable, condition (1) can be met by selecting the liquid crystal mixture, choosing the cell gaps of ECB devices 84 and 86, and fine-tuning the voltages $V_H$ and $V_L$ applied to ECB devices 84 and 86 to meet the half-wave optical retardation condition at 560 nm.

Since there are a limited number of commercially available quarter-wave film types, the most practical approach to meeting condition (2) is selecting a liquid crystal mixture whose wavelength dispersion matches that of the one of the available quarter-wave films.

A measure of wavelength dispersion may be taken as the ratio D of the birefringence of the material at 450 nm to its birefringence at 650 nm, i.e., $D = \Delta n_{450}/\Delta n_{650}$. Nitto-Denko Corp., Tokyo, Japan, supplies both wideband, achromatic type quarter-wave films and chromatic type quarter-wave films. The Nitto-Denko wideband, achromatic film types have D=1.00 and are of a layered structure of two or more birefringent films. Nitto-Denko supplies two different types of chromatic quarter-wave films, which are the NAF type made from polyvinyl alcohol with D=1.02 and the NRF type made from polycarbonate with D=1.14. Since there is no known liquid crystal mixture with D=1.00 or even 1.02, satisfying condition (2) entails selecting a liquid crystal mixture that has the desired material properties, e.g., birefringence and viscosity, for an ECB device and has a dispersion value that matches the dispersion value of polycarbonate type quarter-wave films. The Merck liquid crystal MLC-7030 meets the ECB device requirements and has a dispersion D=1.15, which is substantially the same as the dispersion of polycarbonate with D=1.14.

Figure 14:
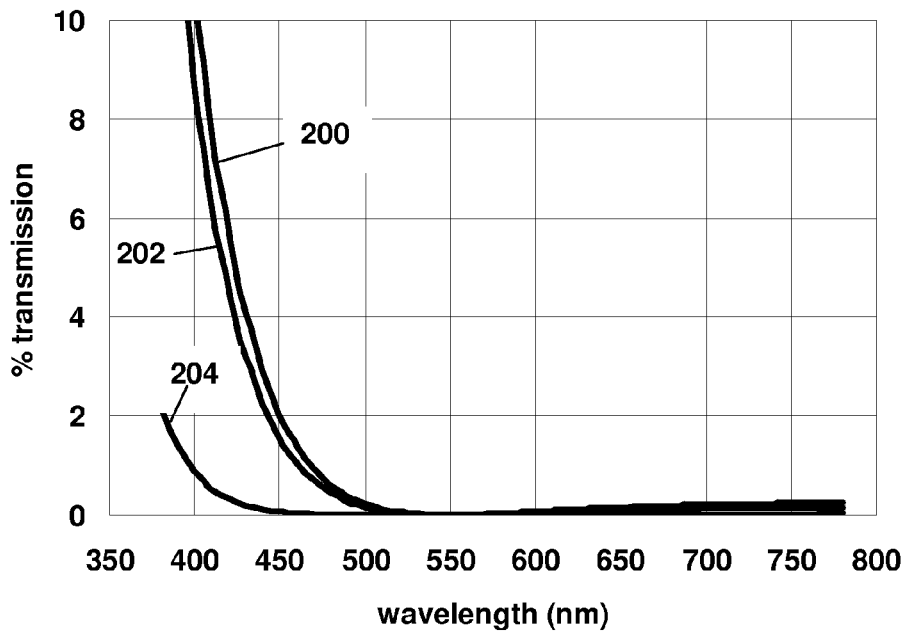
FIG. 14 shows simulated transmission spectra of the light blocking state for the left eye of the passive stereoscopic 3D viewing system of FIGS. 13A and 13B, constructed with three quarter-wave optical retarders exhibiting different wavelength dispersion characteristics.

Simulations were carried out to quantify the amount of leakage that would be obtained in the system 150' for the case in which MLC-7030 is used in ECB devices 84 and 86 and in which each of the three available of quarter-wave film types is considered for the rest of system 150'. FIG. 14 shows simulated transmission spectra of the light blocking state for the left eye, with curve 200 representing the multilayer achromatic quarter-wave film, curve 202 representing the chromatic polyvinyl alcohol quarter-wave film, and curve 204 representing the chromatic polycarbonate quarter-wave film. It is apparent from curves 200, 202, and 204 that use of the achromatic quarter-wave film results in the most light leakage, closely followed by use of the polyvinyl alcohol quarter-wave film. The dramatic decrease in light leakage with the polycarbonate quarter-wave film is a result of the close match of the wavelength dispersion between the polycarbonate and the liquid crystal, and resulting in a high contrast stereoscopic image that is substantially free from ghosting effects.

Figure 15:
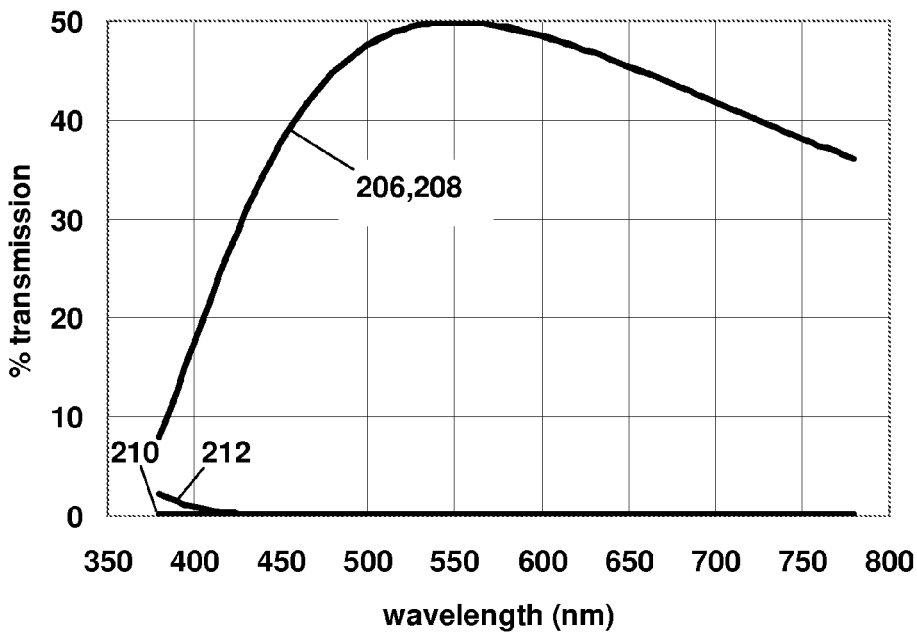
FIG. 15 shows results of simulations of the optical transmission of the passive stereoscopic 3D viewing system of FIGS. 13A and 13B, constructed with quarter-wave optical retarders composed of polycarbonate and with ECB devices.

FIG. 15 shows results of simulations of the optical transmission of stereoscopic system 150' for the optimal case in which MLC-7030 is used in ECB devices 84 and 86 and quarter-wave films 180, 184, and 188 are composed of polycarbonate. The spectra of the right eye and left eye light transmissive states (curves 206 and 208) are virtually identical, as are the right eye and left eye light blocking states (curves 210 and 212). This symmetrical behavior and the strong light blocking states for each eye are very desirable properties to have in a stereoscopic viewing scheme to avoid ghosting effects and color shifts. The comparison between FIG. 12 for linearly polarized system 150 and FIG. 15 for optimized circularly polarized system 150' is dramatic. In linearly polarized system 150, the light leakage in the blocking state for one eye introduces substantial ghosting effects, and the spectral differences in the clear, transmissive states for the right and left eyes introduces into the images for the two eyes color shifts that would be difficult to correct for.

Figure 16:
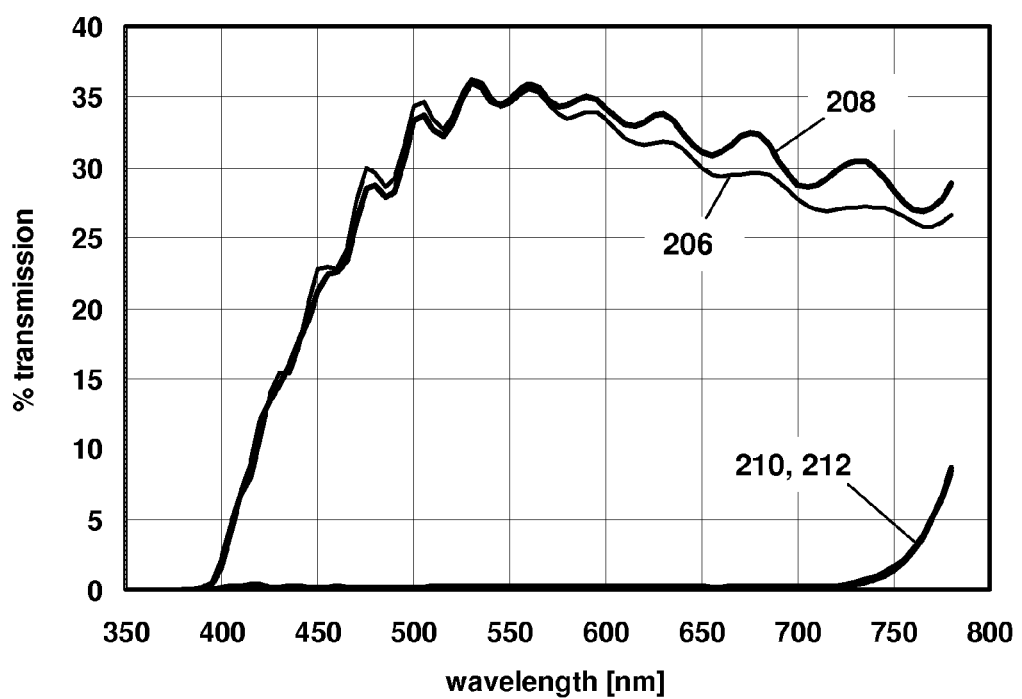
FIG. 16 shows actual measurements of the optical transmission of the passive stereoscopic 3D viewing system of FIGS. 13A and 13B, constructed as described with reference to FIG. 15.

FIG. 16 shows actual measurements of the optical transmission of stereoscopic system 150' using commercially available polarizers for the optimal case in which the dispersion of the liquid crystal mixture substantially matches that of the quarter-wave films, in this case MLC-7030 liquid crystal and polycarbonate quarter-wave films. The light leakage is virtually zero over most of the visible spectrum for the right eye (curve 206) and left eye (curve 208); and the clear, transmissive states for the right eye (curve 210) and left eye (curve 212) are essentially identical, verifying the simulations of FIG. 15. The oscillations apparent in curves 206 and 208 are caused by interference effects in ECB devices 84 and 86, which effects were not considered in the simulations producing the results shown in FIG. 15.

Figure 17:
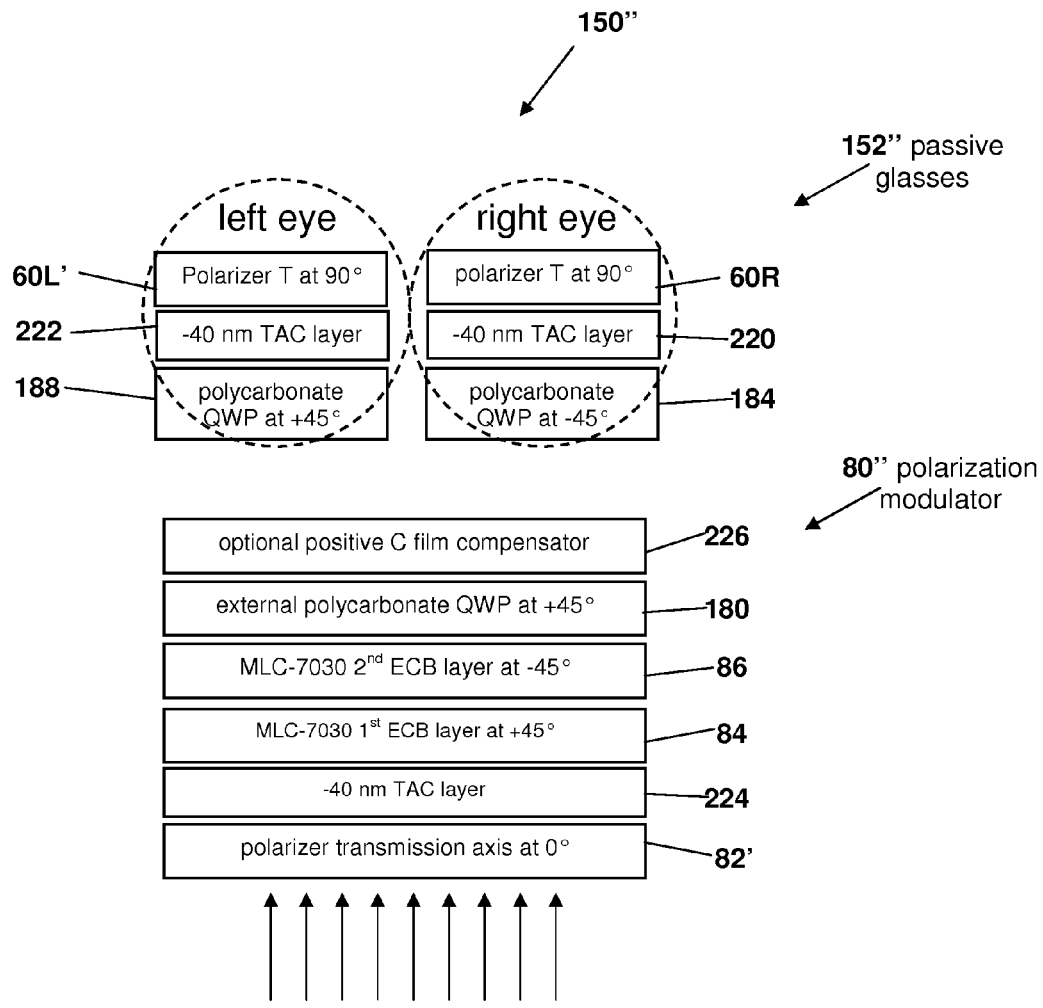
FIG. 17 shows the passive stereoscopic 3D viewing system of FIGS. 13A and 13B implemented with an optional C compensator to improve the viewing angles of perspective view images presented an observer's right and left eyes.

FIG. 17 shows a stereoscopic 3D viewing system 150" using passive glasses 152" that include protective triacetate cellulose (TAC) carrier layers 220, 222, and 224. TAC layers 220, 222, and 224 are also included in stereoscopic viewing systems 150 and 150' but, for purposes of clarity, are not shown in FIGS. 11A, 11B, 13A, and 13B because the descriptions of them were not directed to viewing angle considerations. TAC layers 220 and 222 are located on the inner sides of, respectively, polarizers 60R and 60L' in the eyepiece lenses; and TAC layer 22 is located on the inner side of polarizer 82' in polarization modulator 80". TAC layers that are present on the outer sides of polarizers 60R, 60L', and 82' have no effect on the angular viewing properties and are therefore not shown in FIG. 17. The TAC layers can be approximated by negative uniaxial birefringent films with an out-of-plane retardation of about −40 nm and optic axes perpendicular to the films. Because they are birefringent, ECB devices 84 and 86, quarter-wave films 180, 184, and 188, and TAC layers 220, 222, and 224 influence the contrast ratio for off-axis viewing. FIG. 17 shows system 150'' including also an optional positive C film compensator 226 located between polarization modulator 80'' and passive glasses 152''. A positive C film is a positive uniaxial birefringent film the slow axis of which is perpendicular to the film.

Computer simulations show that off-axis contrast ratios for the right and left eyes can be significantly improved by placing positive C film compensator 226 at the location shown in FIG. 17 and optimizing its out-of-plane retardation to 280 nm. Depending upon the application, positive C film compensator 226 could be laminated either onto the outside of external quarter-wave film 180 of modulator 80'' or in portions onto the outsides of quarter-wave films 184 and 188 of passive glasses 152''.

Figures 18A, 18B:
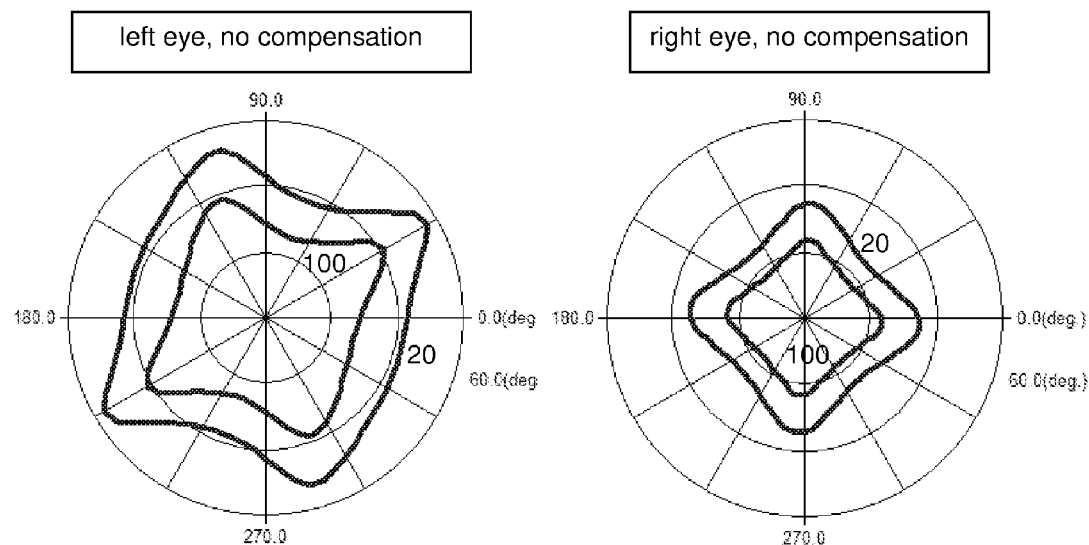
FIGS. 18A, 18B, 18C, and 18D show simulated iso-contrast diagrams for the passive stereoscopic 3D viewing system of FIG. 17, with FIGS. 18A and 18B presenting low contrast viewing angle performance for, respectively, the left and right eyes without use of the optional C compensator, and with FIGS. 18C and 18D presenting high contrast viewing angle performance for, respectively, the right and left eyes with use of the optional C compensator.
Figures 18C, 18D:
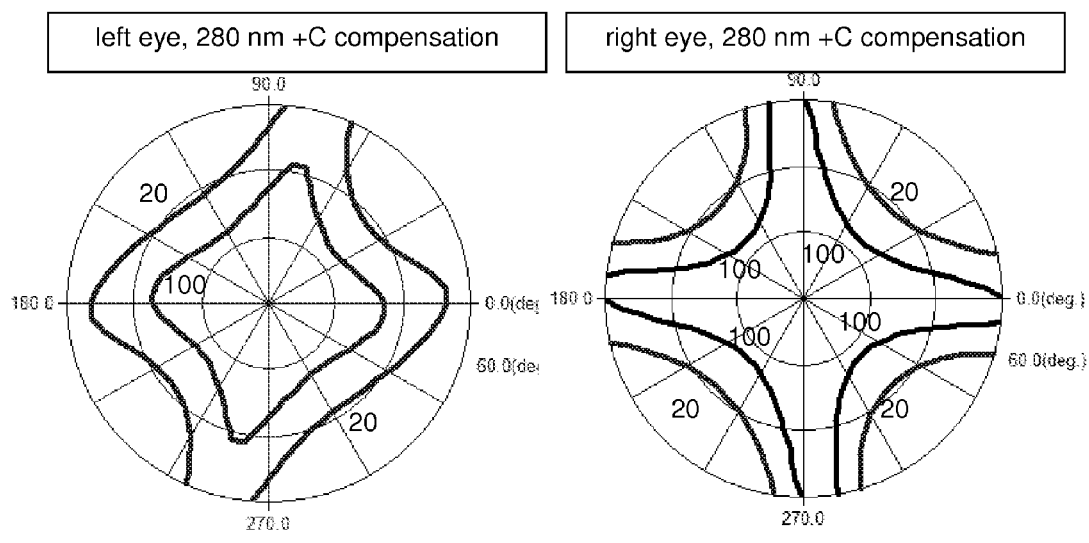

FIGS. 18A, 18B, 18C, and 18D show simulated iso-contrast viewing angle diagrams for system 150'', with FIGS. 18A and 18B presenting system characteristic viewing angle performance for, respectively, the left and right eyes without use of optional positive C film compensator 226, and with FIGS. 18C and 18D presenting a substantially wider than the system characteristic viewing angle performance for, respectively, the left and right eyes with use of optional positive C film compensator 226. These diagrams are contour plots of the contrast ratio observed at polar angles extending from 0° to 60° and azimuthal angles from 0° to 360°. These iso-contrast ratio diagrams provide a useful measure of the amount of ghosting present for off-axis viewing. Contrast ratio contours of 20 and 100 are indicated on the diagrams. FIGS. 18A and 18B show that, without positive C film compensator 226, the system characteristic range of high contrast viewing angles for the right eye is significantly narrower than that for the left eye. FIGS. 18C and 18D show that adding +280 nm positive C film compensator 226 can markedly widen the system characteristic range of viewing angles over which a high contrast can be observed by the right eye, thereby making the range of high contrast viewing directions for the right and left eyes roughly equivalent.

Positive C film compensator 226 could also be inserted at locations in the optical path other than the location shown in FIG. 17, such as between ECB device 86 and external quarter-wave film 180, between input polarizer TAC layer 224 and first ECB device 84, or between quarter-wave films 184 and 188 and their associated polarizer TAC layers 220 and 222. Simulations show that placement of positive C film compensator 226 in these alternative locations does not widen the viewing angles so much as that which is achievable by locating positive C film compensator 226 where shown in FIG. 17. In the passive glasses example of FIG. 17, a positive C film compensator 226 is placed on polarization modulator 80''.

The foregoing embodiment illustrated in FIG. 17 employs ECB devices having a positive dielectric anisotropy. The following describes an embodiment in which the liquid crystal devices employ liquid crystal material having a negative dielectric anisotropy, which is used in vertically aligned nematic (VAN) devices.

Figure 19A:
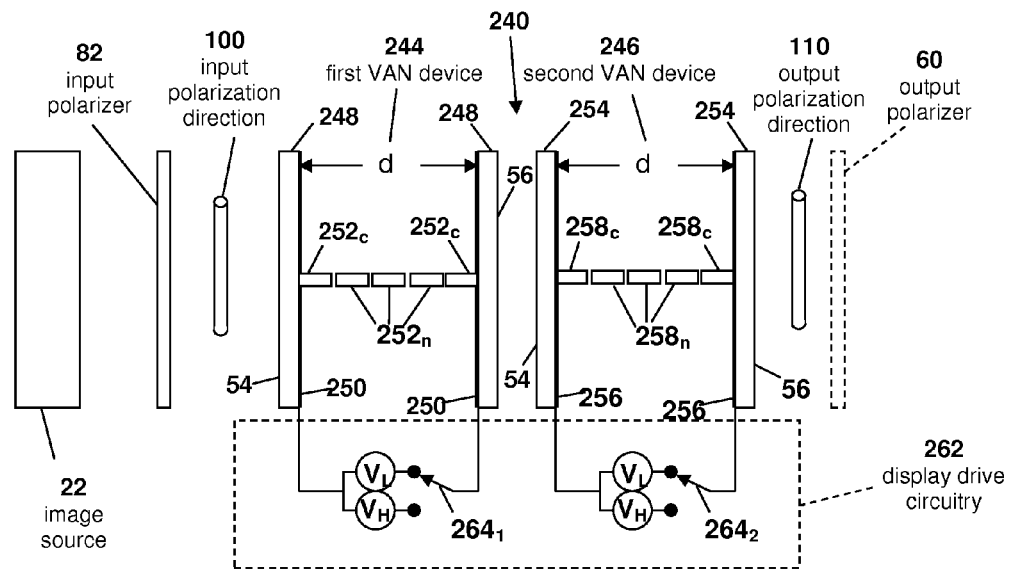
FIGS. 19A, 19B, 19C, and 19D show the effect on the output polarization imparted by various drive voltages applied to first and second liquid crystal VAN cells in a fourth preferred embodiment, which is a polarization modulator that can be incorporated in a stereoscopic 3D system using active or passive viewing glasses.

FIGS. 19A, 19B, 19C, and 19D show an example of a polarization modulator 240 using two VAN mode liquid crystal devices. FIG. 19A shows input polarizer 82 at the left, followed by a first VAN liquid crystal device 244 and a second VAN liquid crystal device 246 combined in optical series. First VAN device 244 is constructed with liquid crystal material contained between glass substrate plates 248 having inner surfaces on which optically transparent electrode layers 250 are formed. The liquid crystal material includes electrode surface-contacting directors $252_c$ and electrode surface-noncontacting directors $252_n$. Second VAN device 246 is constructed with liquid crystal material contained between glass substrate plates 254 having inner surfaces on which optically transparent electrode layers 256 are formed. The liquid crystal material includes electrode surface-contacting directors $258_c$ and electrode surface-noncontacting directors $258_n$. The two VAN liquid crystal devices 244 and 246 satisfy the conditions for compensation as discussed earlier. Light propagating from image source 22 exits polarizer 82 in an input polarization direction 100, which is shown by a tilted cylinder indicating that the direction of polarization makes a +45° angle with the plane of the figure.

FIG. 19A shows a drive signal low voltage magnitude level, $V_L$, applied to both VAN devices 244 and 246 from display drive circuitry 262. Drive signal level $V_L$ is below the VAN threshold voltage or even zero. At this voltage, directors $252_c$ and $252_n$ in first VAN device 244 are perpendicular to substrate plates 248, and directors $258_c$ and $258_n$ in second VAN device 246 are perpendicular to substrate plates 254. This is shown by cylinders $252_c$ and $252_n$ representing the local directors viewed side-on in first VAN device 244 and cylinders $258_c$ and $258_n$ viewed side-on in second VAN device 246. Small pretilt angles of surface-contacting directors $252_c$ and $258_c$ relative to normal direction of the respective substrate plates 248 and 254 are not shown. Within each VAN device 244 and 246, the local directors are parallel to one another. At the applied drive signal level $V_L$, both VAN devices 244 and 246 are characterized by a residual in-plane retardation $\lceil_R$, which is the same for each of them; but since the slow axes of $\lceil_R$ for VAN devices 244 and 246 are orthogonally aligned, they still compensate, and the state of polarization of the incident light remains unchanged after passing through the combination of them.

Figure 19B:
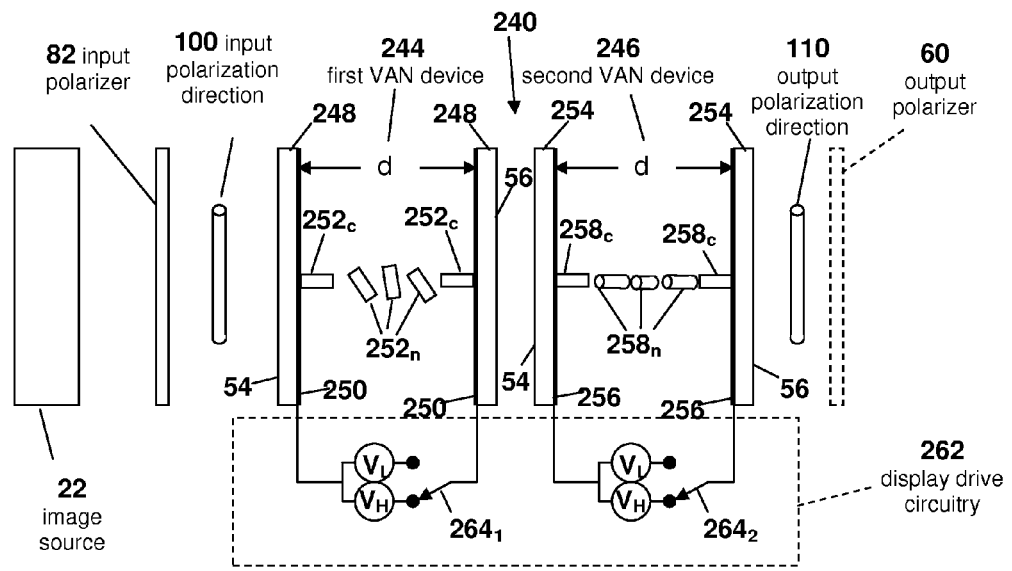

FIG. 19B shows the same drive signal high voltage magnitude level, $V_H$, applied to both first VAN device 244 and second VAN device 246 and thereby aligns directors $252_n$ and $258_n$ nearly parallel to the liquid crystal device boundaries defined by electrode layers 250 and 256, respectively.

Figure 19C:
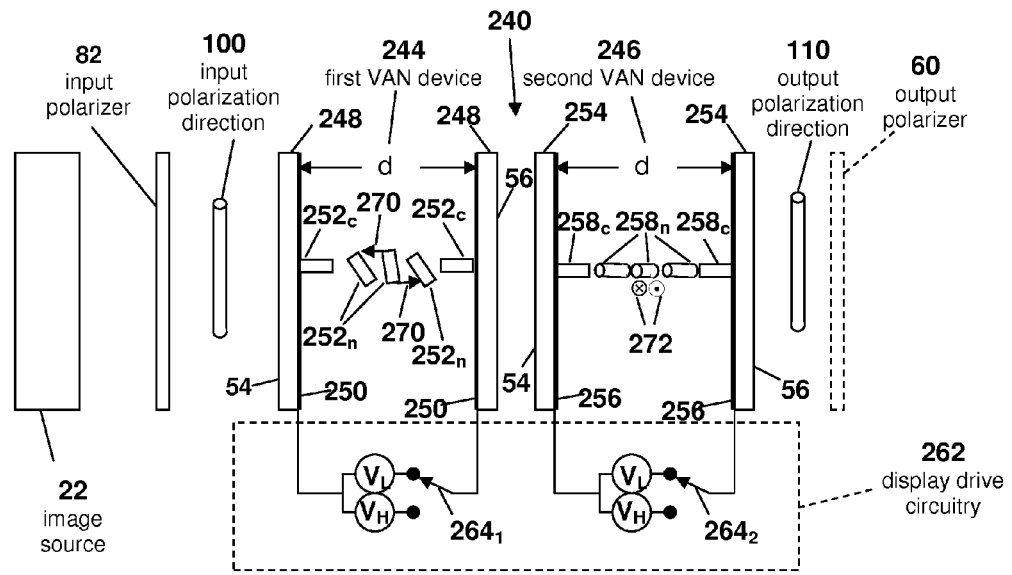

FIG. 19C shows a snapshot in time of the director orientation a short time after drive signal level $V_H$ is removed from VAN devices 244 and 246 and replaced by drive signal level $V_L$, schematically indicated by the switch positions of respective switches $264_1$ and $264_2$ in display drive circuitry 262. Small arrows 270 shown on the center director of surface-noncontacting directors $252_n$ in first VAN device 244 indicate that the center director is in the process of rotating back to the vertically aligned state indicated by FIG. 19A. The same rotation takes place in second VAN device 246 as indicated by arrows 272 pointing into and out of the plane of the figure symbolized by ⓧ and ⊙, respectively. Surface-noncontacting directors $252_n$ relax in first VAN device 244 by rotating in the plane of the figure, and surface-noncontacting directors $258_n$ relax in second VAN device 246 by rotating in a plane perpendicular to the figure and perpendicular to the substrate plates. Dynamic compensation takes place in this case.

Figure 19D:
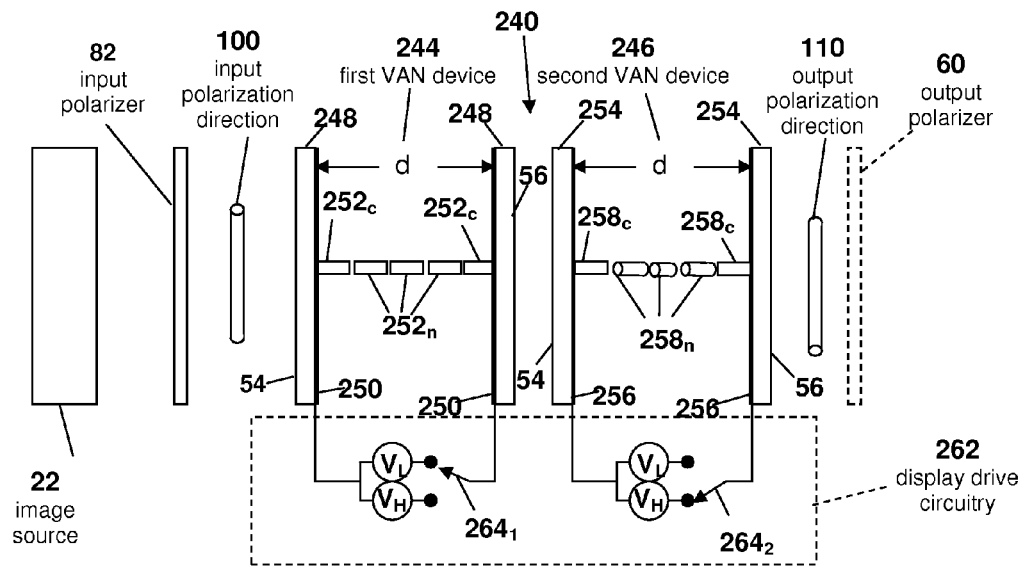

FIG. 19D shows the case in which first VAN device 244 remains at $V_L$ and second VAN device 246 is turned on with a drive signal high voltage magnitude level $V_H$. The combination of VAN devices 244 and 246 no longer compensates because the drive signals applied to VAN devices 244 and 246 are different. First VAN device 244 introduces a residual in-plane retardation of ⌈$_R$, and second VAN device 246 introduces an in-plane retardation of ⌈$_O$, thereby resulting in an overall retardation of ⌈$_O$-⌈$_R$ since the slow axes of the residual and in-plane retardations make a 90° angle with each other. A polarization rotation of 90° for polarization modulator 240 is obtained with ⌈$_O$-⌈$_R$=λ/2, where λ is the design wavelength of light as indicated by output polarization direction 110.

Figure 20:
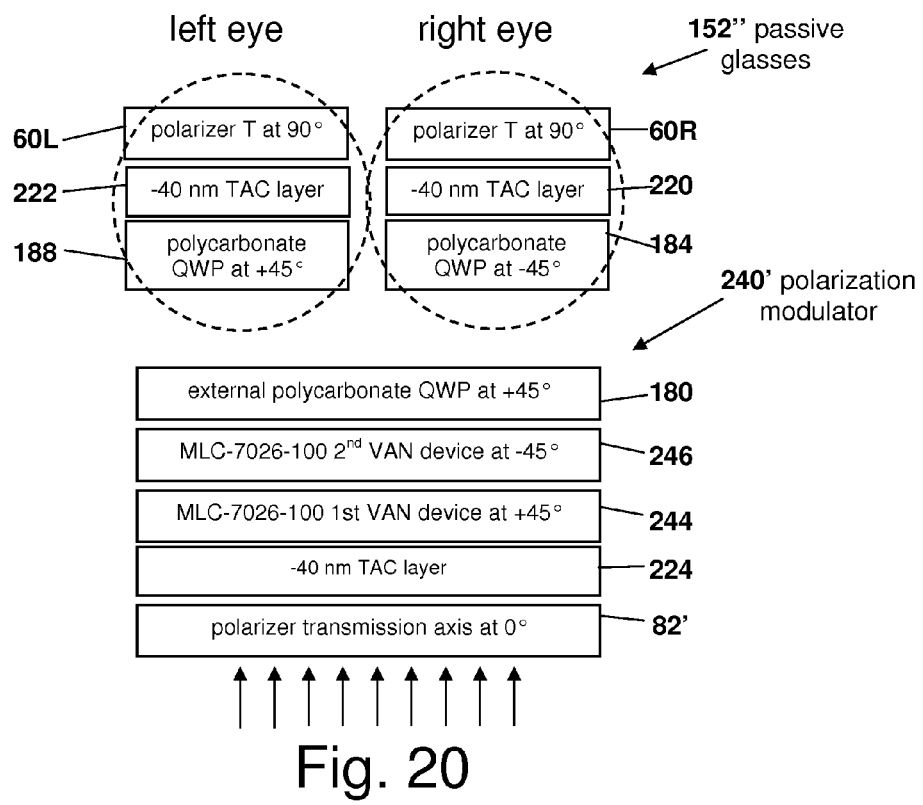
FIG. 20 shows the polarization modulator of FIGS. 19A, 19B, 19C, and 19D incorporated in a passive stereoscopic 3D viewing system constructed with quarter-wave optical retarders as shown in FIG. 17.
Figures 21A, 21B:
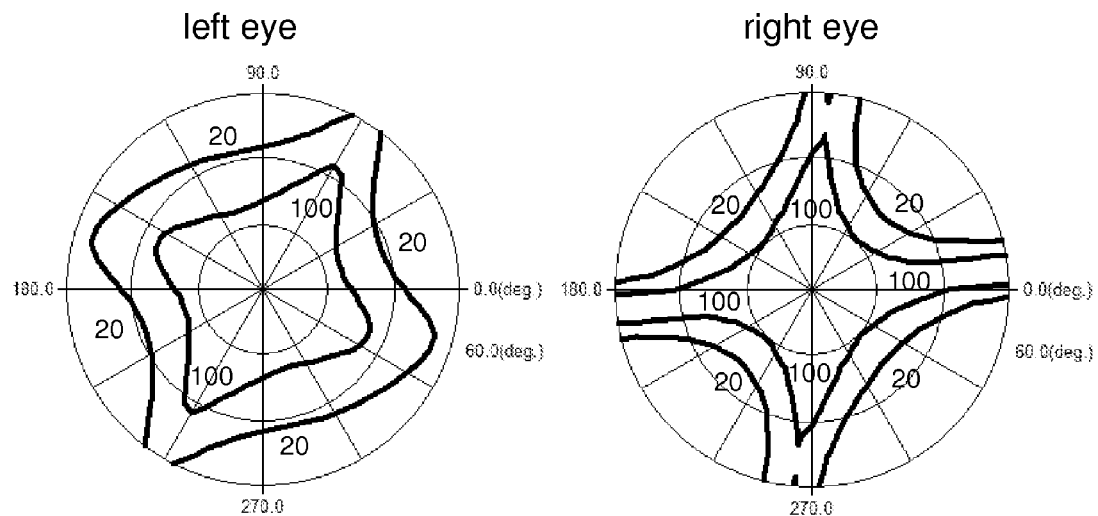
FIGS. 21A and 21B show for, respectively, the left and right eyepieces of the passive glasses of FIG. 20 simulated iso-contrast diagrams demonstrating by comparison the impact of viewing compensation on the widening of the range of high contrast viewing angles.

VAN devices can be used for stereoscopic viewing with passive glasses, as shown in FIG. 20. The simulated iso-contrast diagrams for the left and right eyes are shown in FIGS. 21A and 21B. Comparison of FIGS. 21A and 21B with FIGS. 18A and 18B shows that, in the absence of film compensation, the range of angles for high contrast viewing is wider for polarization modulators using VAN devices than it is for ECB devices.

FIGS. 18A, 18B, 18C, and 18D show for ECB devices and FIGS. 21A and 21B show for VAN devices that, when passive glasses are used with the disclosed polarization modulator, the angular viewing characteristics of the right and left eyes are quite different. To achieve an optimal range of high contrast viewing angles for each eye, the eyepieces are separately compensated.

Figure 22:
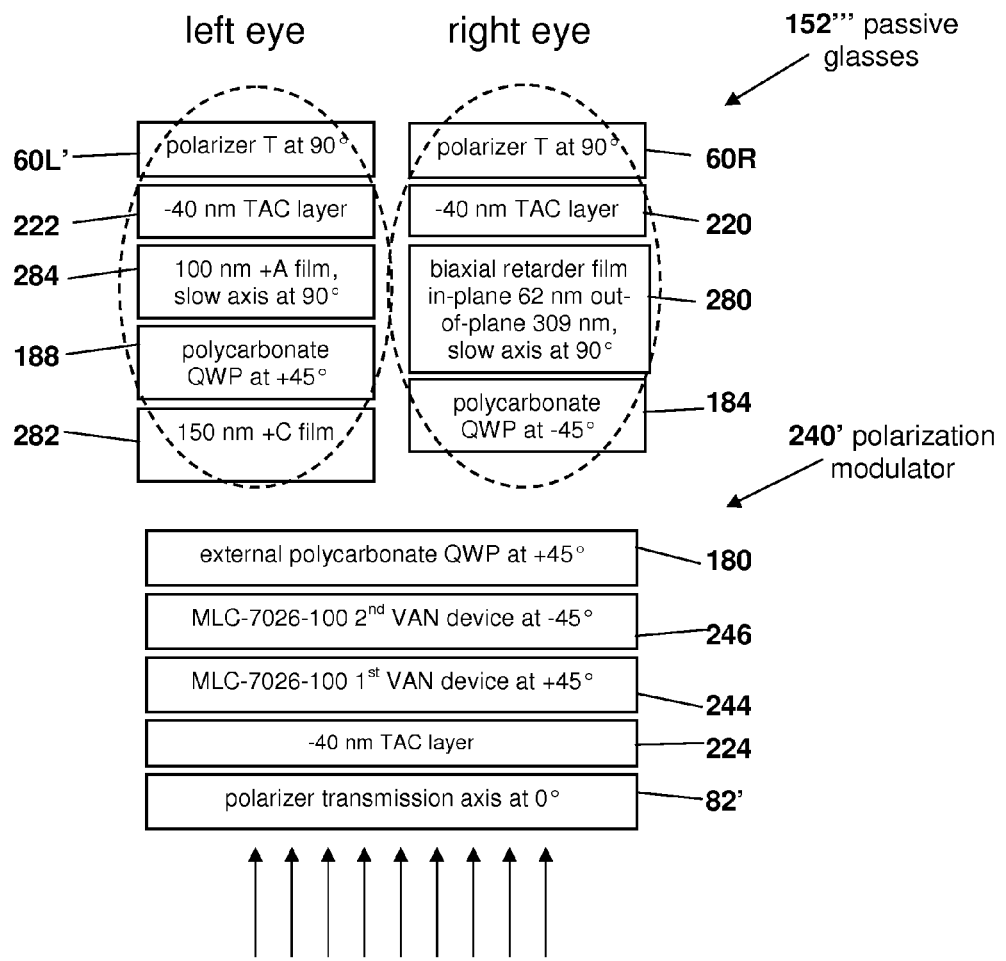
FIG. 22 shows a passive stereoscopic viewing system constructed with the polarization modulator of FIGS. 19A, 19B, 19C, and 19D and passive glasses in which different optical compensators are used in the left and right eyepieces.

FIG. 22 shows as an example a stereoscopic viewing system of a type using VAN devices as described in FIGS. 19A, 19B, 19C, and 19D and passive glasses 152''', in which different compensation films are used in the eyepieces for the right and left eyes. In the right eyepiece, a biaxial compensator 280 with 62 nm of in-plane retardation and 309 nm of out-of-plane retardation is positioned between TAC layer 220 and quarter-wave film 184. The slow axis of biaxial compensator 280 is oriented at 90°, which is parallel to the transmission axis of its adjacent polarizer 60R. In the left eyepiece, viewing angle compensation is achieved with a combination of a 150 nm positive C film 282 positioned in front of quarter-wave film 188 in the left eyepiece and a 100 nm positive A film 284 positioned between TAC layer 222 and quarter-wave film 188, with the slow axis of positive A film 284 oriented parallel to the transmission axis of adjacent polarizer 60L'. A positive A film is a positive uniaxial birefringent film the slow axis of which lies in the plane of the film.

Figure 23A:
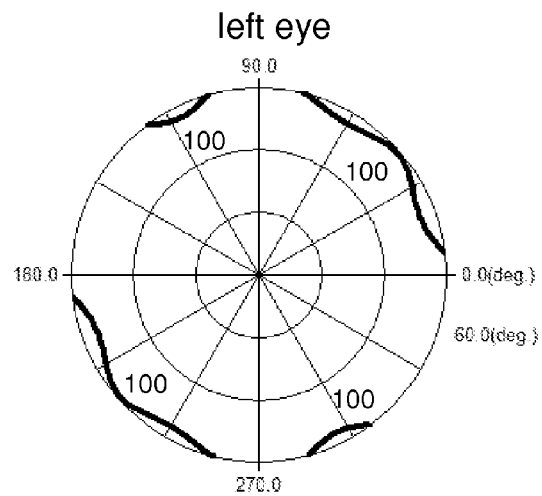
FIGS. 23A and 23B show simulated iso-contrast diagrams for, respectively, the separately compensated left and right eyepieces of the passive glasses of FIG. 22.
Figure 23B:
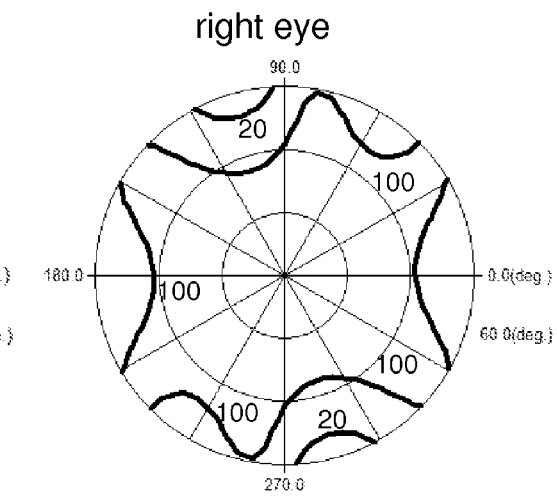

FIGS. 23A and 23B show the simulated iso-contrast diagrams for the left and right eyes resulting from the separately compensated eyepiece configurations illustrated in FIG. 22. A much wider range of high-contrast viewing angles is achieved in comparison with those of the uncompensated stereoscopic viewing system represented by FIGS. 21A and 21B.

Figure 24:
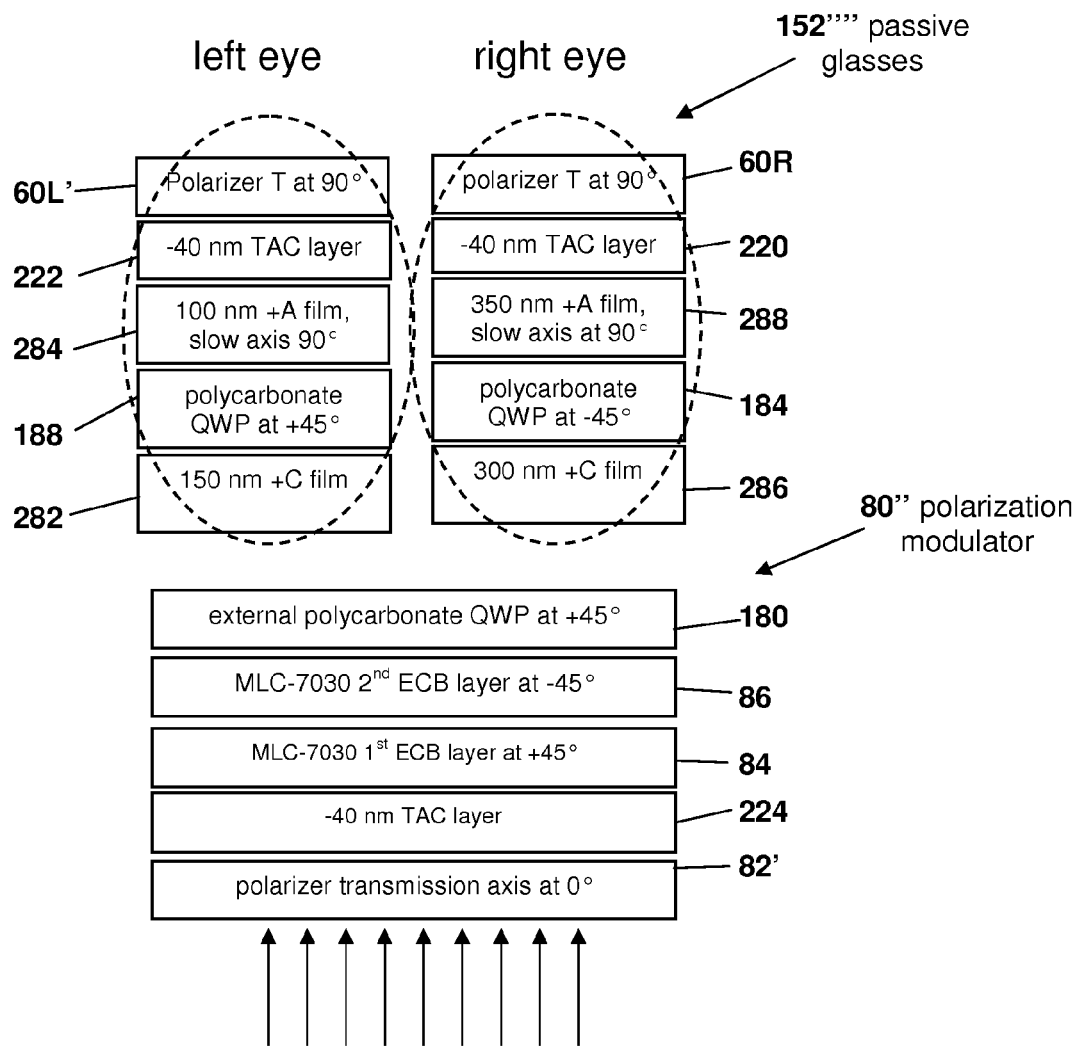
FIG. 24 shows a passive stereoscopic viewing system constructed with the polarization modulator of FIGS. 7A, 7B, 7C, and 7D and passive glasses in which different compensators are used in the left and right eyepieces.

FIG. 24 shows as an example a stereoscopic viewing system of a type using ECB devices as described in FIGS. 7A, 7B, 7C, and 7D and passive glasses 152'''', in which different compensation films are used in the eyepieces for the right and left eyes. In the right eyepiece, a 300 nm positive C film 286 is positioned in front of quarter-wave film 184 and a 350 nm positive A film 288 is positioned between polarizer TAC layer 220 and quarter-wave film 184, with the slow axis of positive A film 288 oriented parallel to the transmission axis of adjacent polarizer 60R. In the left eyepiece, viewing angle compensation is achieved with a combination of 150 nm positive C film 282 positioned in front of quarter-wave film 188 in the left eyepiece and 100 nm positive A film 284 positioned between polarizer TAC layer 222 and quarter-wave film 188, with the slow axis of positive A film 284 oriented parallel to the transmission axis of adjacent polarizer 60L'.

Figure 25A:
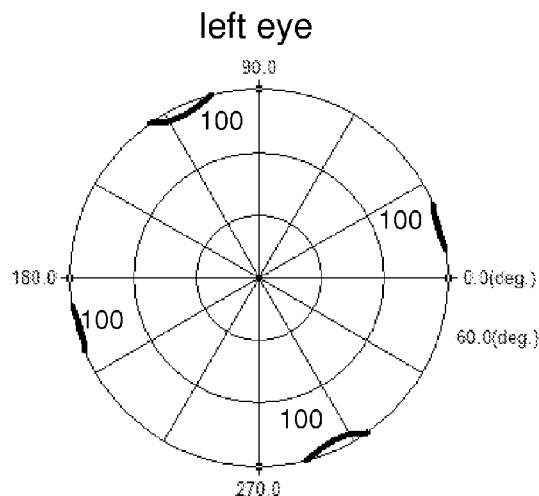
FIGS. 25A and 25B show simulated iso-contrast diagrams for, respectively, the separately compensated left and right eyepieces of the passive glasses of FIG. 24.
Figure 25B:
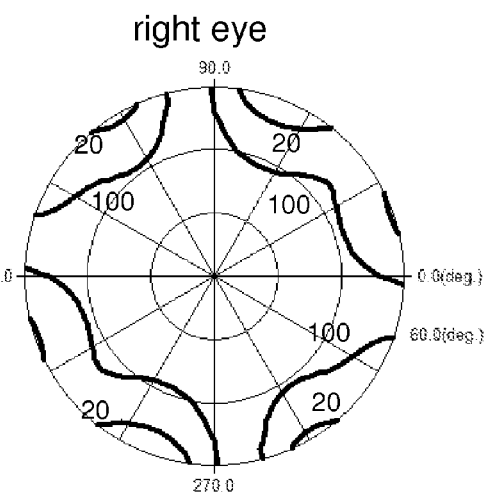

FIGS. 25A and 25B show the simulated iso-contrast diagrams for the left and right eyes resulting from the separately compensated eyepiece configurations illustrated in FIG. 24. A much wider range of high-contrast viewing angles is achieved in comparison with those of the uncompensated stereoscopic system represented by FIGS. 18A and 18B, or even the compensated system represented by FIGS. 18C and 18D, in which both eyes receive the same angular compensator.

In many applications of the disclosed polarization state modulator, the temperature may not remain constant and could vary over a wide range as would be the case, for example, of a modulator contained inside a projector during the warm-up period. Since the material properties of liquid crystals are known to be temperature dependent, especially for the birefringence, any change in temperature would shift the wavelength for the half-wave optical retardation state of the combined first and second liquid crystal devices away from the design wavelength. This shift would cause a loss of brightness and color shift in the bright state of stereoscopic viewing systems using either active or passive glasses. Furthermore, in such systems using passive glasses, any shift in the wavelength set for the half-wave state away from the design wavelength of the quarter-wave films, which are relatively insensitive to temperature, will lead to increased ghosting in the images sent to the viewer's left eye.

For a nematic liquid crystal, the temperature dependence of the birefringence Δn can be approximated by the formula:

$$\Delta n(T) = \Delta n_0 \cdot \left(1 - \frac{T}{T_{clp}}\right)^{0.25},$$

where T is the temperature in degrees Kelvin, $T_{clp}$ is the nematic-isotropic transition temperature in degrees Kelvin, and $\Delta n_0$ represents a fictitious birefringence of a perfectly ordered nematic liquid crystal having an order parameter of unity. The quantity $\Delta n_0$ can be factored out of this equation by normalizing the birefringence to a fixed temperature, for example, 20° C.

Figure 26:
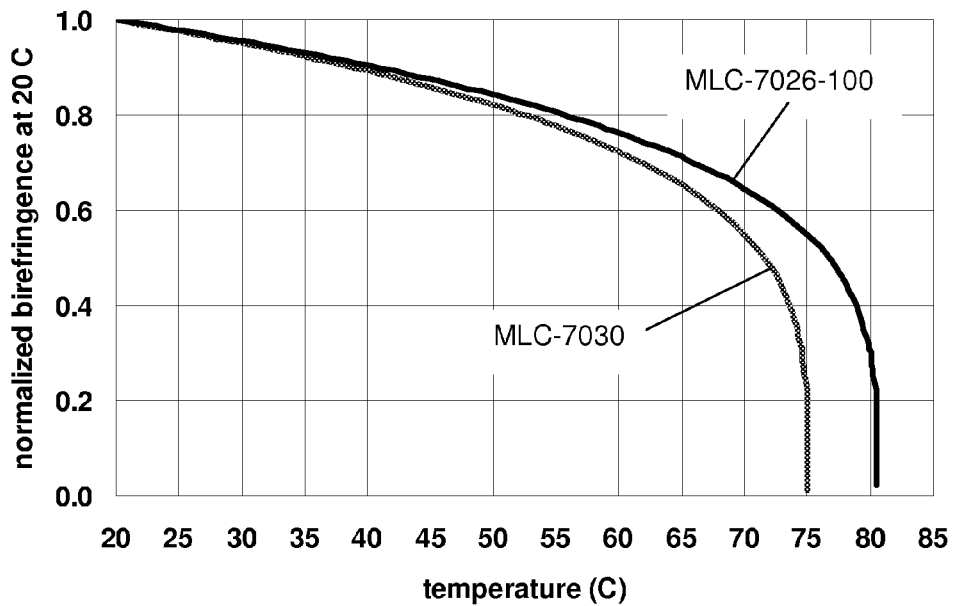
FIG. 26 shows the simulated temperature dependence of the normalized birefringence of an ECB liquid crystal mixture and the normalized birefringence of a VAN liquid crystal mixture.

FIG. 26 shows the simulated temperature dependence of the birefringence normalized by the birefringence at 20° C. of the ECB mixture MLC-7030, which has a birefringence of 0.1126 at 20° C. and $T_{clp}$ of 75° C., as well as the VAN mixture MLC-7026-100, which has a birefringence of 0.1091 at 20° C. and a $T_{clp}$ 80.5° C. The negative dielectric anisotropy material MLC-7026-100 is available from Merck GmbH, Darmstadt, Germany. The shapes of these curves may deviate somewhat from ones actually measured, but the trends would still be similar.

Figure 27:
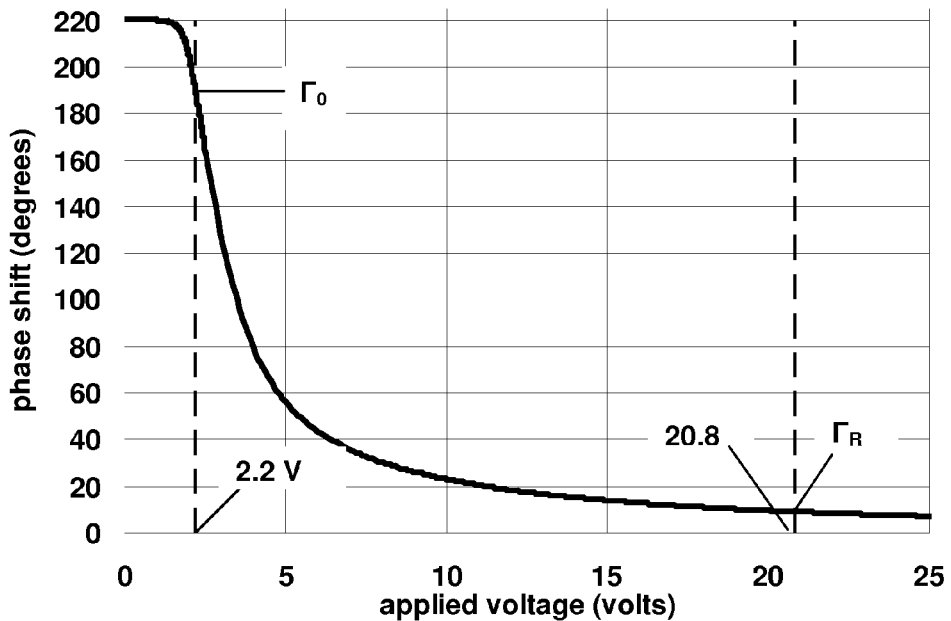
FIG. 27 is a graph showing, for 20° C., simulated voltage dependence of the phase shift imparted by an ECB device filled with the ECB liquid crystal mixture represented in FIG. 26.

FIG. 27 is a graph showing simulated voltage dependence of the phase shift, in degrees, at 20° C. of an ECB device filled with the ECB mixture MLC-7030 and having a 3.0 μm cell gap and a pretilt angle of 3°. As voltage is applied, the phase shift monotonically decreases from about 220° towards 0°. This curve applies to either of the first or second ECB devices. Because the slow axes of the two ECB devices are orthogonally aligned with each other, the phase shift of one of the ECB devices subtracts from the phase shift of the other. During the second subframe, a high voltage magnitude $V_H$ is applied the first ECB device resulting in a phase retardation ⌈$_R$ while a low voltage magnitude $V_L$, which could be zero, is applied to the second ECB device resulting in a retardation ⌈$_O$. To rotate the polarized light by 90° for optimum performance, ⌈$_O$-⌈$_R$=λ/2, which is a phase shift of 180° at the design wavelength λ. Voltages can be applied to either one or both of the ECB devices to achieve the 180° phase shift condition. In the example shown in FIG. 27, applying $V_H$=20.8 V to the first ECB device gives a phase shift of 9.1°, and applying $V_L$=2.2

V to the second ECB device gives a phase shift of 189.1°, resulting in the desired phase shift difference of 180° for the combination.

Figure 28:
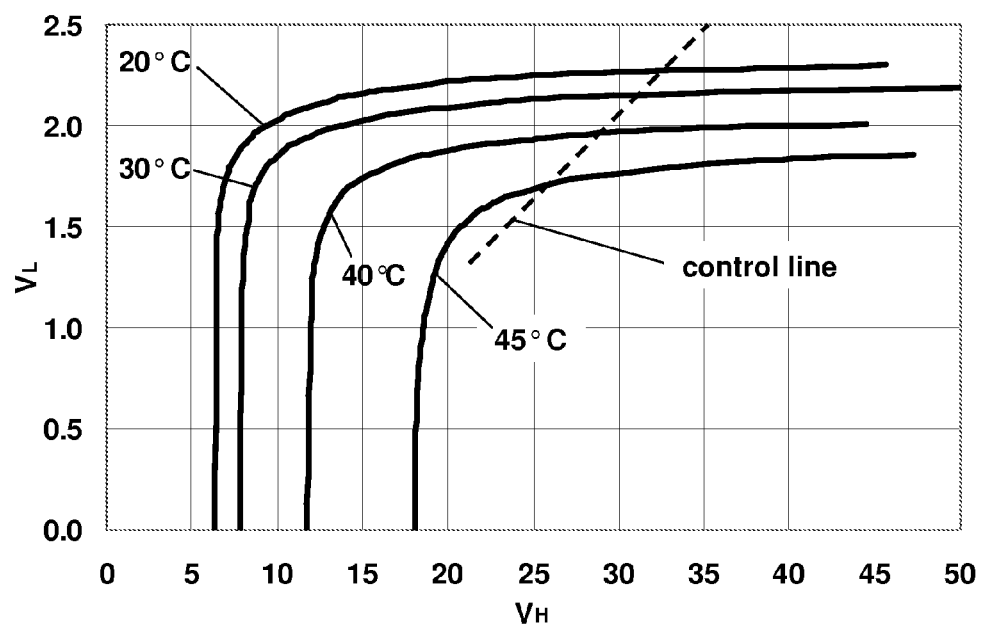
FIG. 28 shows four $V_H$ vs. $V_L$ curves of constant 180° phase shift for various operating temperatures of the ECB liquid crystal mixture represented in FIG. 26.

Inspection of FIG. 27 reveals that there are many possible voltage pairs ($V_H$, $V_L$) that will give an overall phase shift of 180°. FIG. 28 presents a plot of these voltage pairs as a family of curves of constant 180° phase shift, each curve corresponding to a temperature of 20° C., 30° C., 40° C., or 45° C., with the simulations taking into account the decrease in birefringence of MLC-7030 with increasing temperature, as shown in FIG. 26. FIG. 28 makes clear that $V_H$ and $V_L$ can be adjusted either individually or in combination according to the temperature in order to maintain the desired phase shift of 180°. It can be particularly advantageous to simultaneously adjust both $V_H$ and $V_L$ to maintain a constant phase shift of 180°. This is suggested by the control line shown in FIG. 28, in which both $V_H$ and $V_L$ are increased with decreasing temperature. Increasing $V_H$ with decreasing temperature ensures a fast turn on time at lower temperatures, where the viscosity of the liquid crystal is significantly higher.

Figure 29:
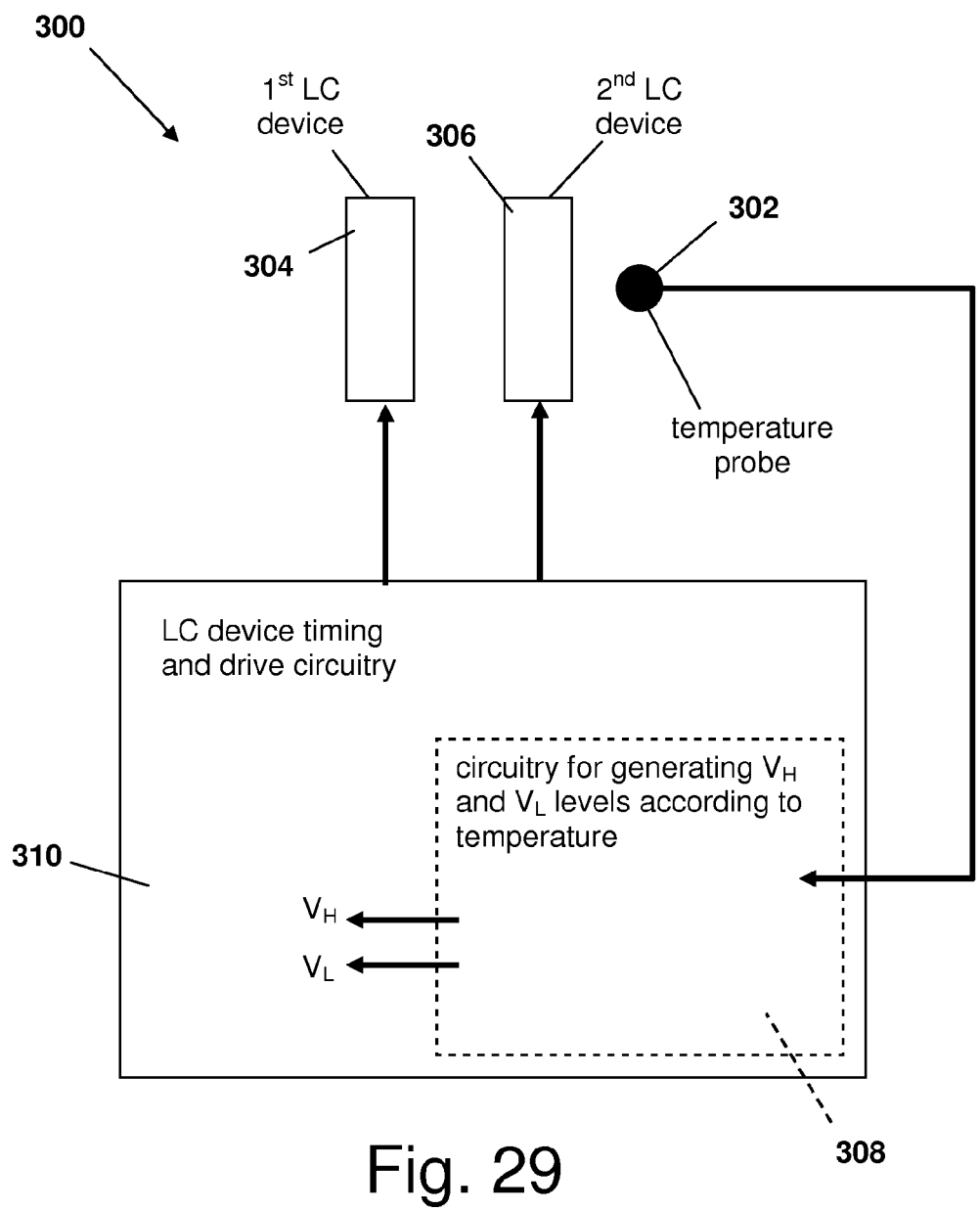
FIG. 29 is a simplified block diagram of an electrical circuit configured to adjust $V_H$ and $V_L$ levels to maintain over a wide range of temperatures a 180° phase shift imparted by the liquid crystal devices of the polarization state modulator.

FIG. 29 shows a simplified block diagram of a circuit 300 that could be used to adjust the $V_H$ and $V_L$ levels to maintain a constant phase shift of 180° over a wide range of temperatures. In circuit 300, a temperature sensor 302 measures the operating temperature at liquid crystal devices 304 and 306, and through processing circuitry 308 adjusts the $V_H$ and $V_L$ levels according to the stored phase shift response of liquid crystal devices 304 and 306. The $V_H$ and $V_L$ levels are then delivered to timing and drive circuitry 310, which applies the drive waveforms to liquid crystal devices 304 and 306. The control procedure performed to adjust the $V_H$ and $V_L$ levels according to the temperature measured by sensor 302 could be determined from curves similar to those of FIG. 28, where actual measured curves would be stored and used rather than simulated approximations.

Figure 30:
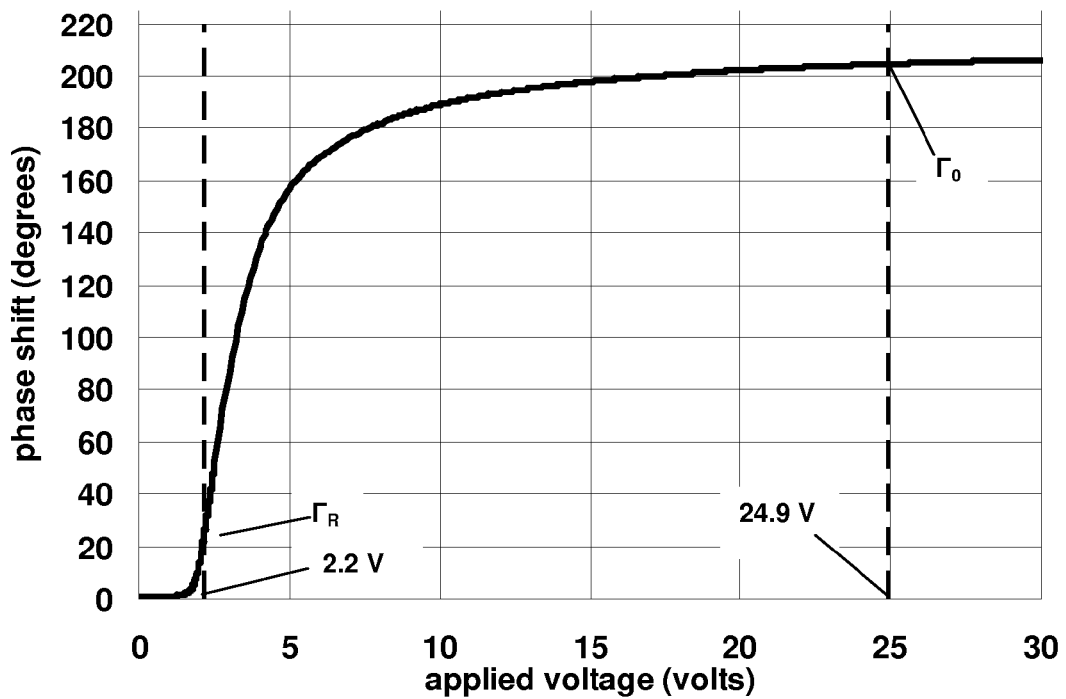
FIG. 30 is a graph showing, for 20° C., simulated voltage dependence of the phase shift imparted by a VAN device filled with the VAN liquid crystal mixture represented in FIG. 26.

FIG. 30 is a graph showing simulated voltage dependence of the phase shift, in degrees, at 20° C. of a VAN device filled with the VAN mixture MLC-7026-100 and having a 3.0 μm cell gap and a pretilt angle of 87°. As voltage is applied, the phase shift monotonically increases from near 0° to about 205°. This curve applies to either of the first or second VAN devices. Because the slow axes of the two VAN devices are orthogonally aligned with each other, the phase shift of one of the VAN devices subtracts from the phase shift of the other. During the second subframe, a high voltage magnitude $V_H$ is applied the second VAN device resulting in a phase retardation $\lceil_O$ while a low voltage magnitude $V_L$, which could be zero, is applied to the first VAN device resulting in a retardation $\lceil_R$. To rotate the polarized light by 90° for optimum performance $\lceil_O - \lceil_R = \lambda/2$, which is a phase shift of 180° at the design wavelength λ. Voltages are applied to either one or both of the VAN devices to achieve the 180° phase shift condition. In the example shown in FIG. 30, applying $V_H$=24.9 V to the second VAN device gives a phase shift of 204.7°, and applying $V_L$=2.2 V to the first VAN device gives a phase shift of 24.7°, resulting in the desired phase shift difference of 180° for the combination.

Figure 31:
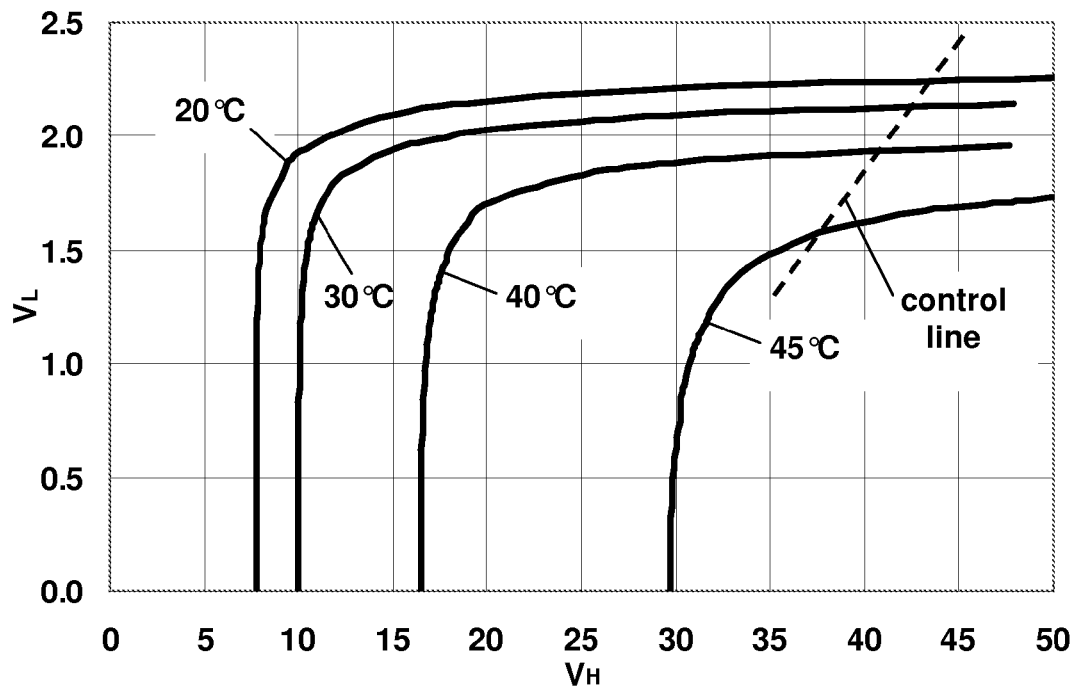
FIG. 31 shows four $V_H$ vs. $V_L$ curves of constant 180° phase shift for various operating temperatures of the VAN liquid crystal mixture represented in FIG. 26.

Inspection of FIG. 30 reveals that there are many possible voltage pairs ($V_H$, $V_L$) that will give an overall phase shift of 180°. FIG. 31 presents a plot of these voltage pairs as a family of curves of constant 180° phase shift, each curve corresponding to a temperature of 20° C., 30° C., 40° C., or 45° C., with the simulations taking into account the decrease in birefringence of MLC-7026-100 with increasing temperature, as shown in FIG. 26. FIG. 30 makes clear that $V_H$ and $V_L$ can be adjusted either individually or in combination according to the temperature in order to maintain the desired phase shift of 180°. It can be particularly advantageous to simultaneously adjust both $V_H$ and $V_L$ to maintain a constant phase shift of 180°. This is suggested by the control line shown in FIG. 31, in which both $V_H$ and $V_L$ are increased with decreasing temperature. Increasing $V_H$ with decreasing temperature ensures a fast turn on time at lower temperatures, where the viscosity of the liquid crystal is significantly higher.

Figure 32:
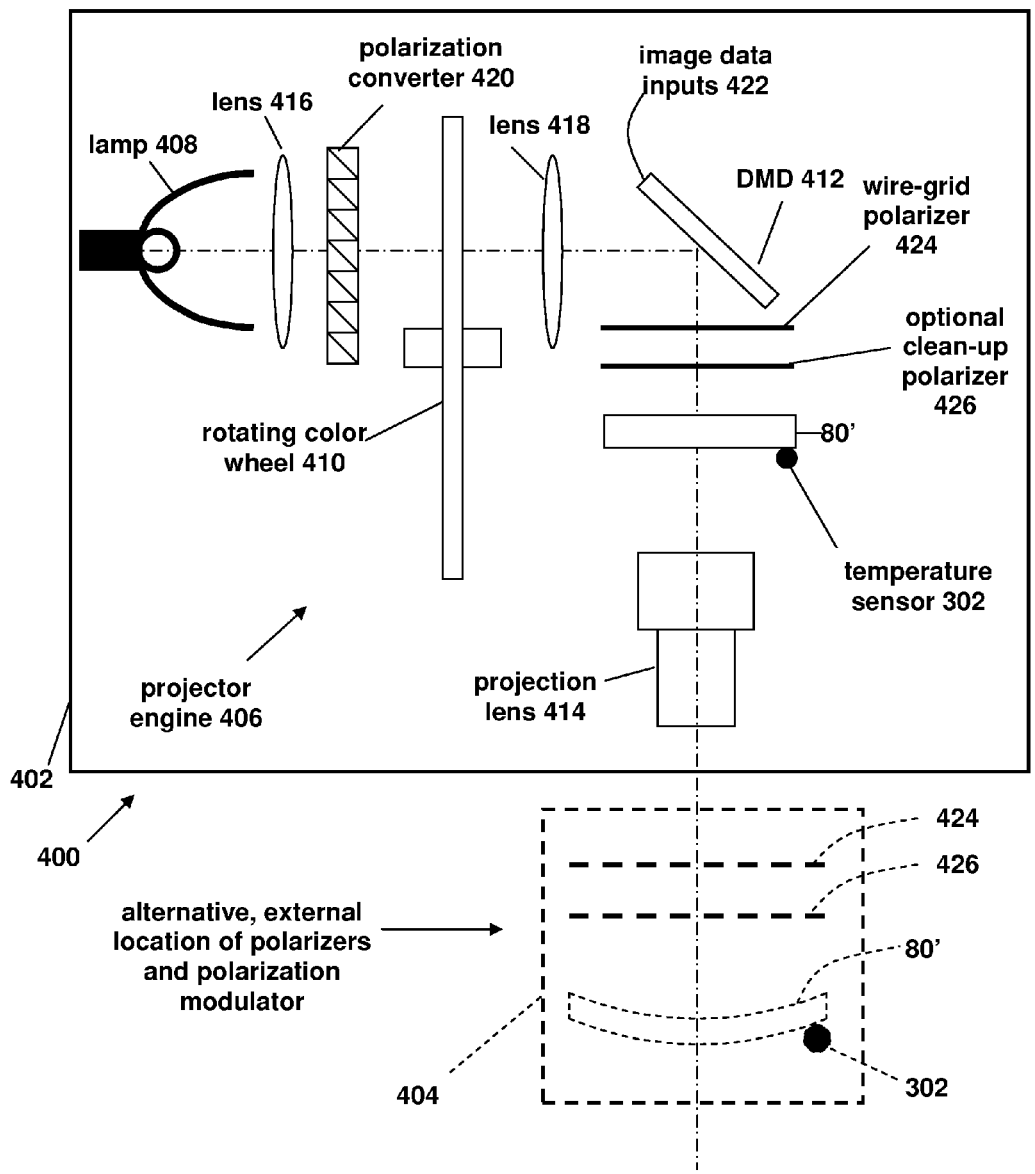
FIG. 32 shows, as a first preferred embodiment, an optical polarization state modulator assembly in which a polarization modulator is incorporated.

FIG. 32 shows, as a first preferred embodiment, an optical polarization state modulator assembly 400 in which a polarization modulator is incorporated. Modulator assembly 400 is an optical subsystem of stereoscopic 3D systems configured for operation in projection applications that use passive glasses. One such system identified as stereoscopic 3D viewing system 150' is schematically illustrated in FIGS. 13A and 13B. System 150' is composed of polarization modulator 80', which includes polarizer 82', first ECB cell 84, second ECB cell 86, and quarter-wave film 180 that are contained either inside a projector housing 402 or inside a modulator housing 404 placed as a separate add-on outside projector housing 402. For purposes of convenience, the following descriptions of modulator assembly 400 include references to polarization modulator 80', system 150', and their component parts.

With reference to FIG. 32, modulator assembly 400 is placed inside a conventional color field sequential projector engine 406 composed of a light source 408 emitting multiple wavelengths of light, a wavelength separation device 410 in the form of a spinning or rotating color wheel, a spatial light modulator 412 in the form of an ultra high-speed electrically addressed digital micromirror imaging device (DMD), and a multi-element projection lens 414, all of which are contained within projector housing 402. Light source 408 is preferably a metal-halide projection lamp that emits multiple wavelengths of light for incidence on rotating color wheel 410. Rotating color wheel 410 produces from the incident light multiple light wavelength (i.e., color) components that propagate toward and are sequentially incident on DMD 412. A condensing lens 416 and a shaping lens 418 positioned on, respectively, the light entrance side and light exit side of rotating color wheel 410 cooperate to collimate the light wavelength components incident on DMD 412. Skilled persons will appreciate that projector engine 406 could include additional components, depending on the specific system configuration.

DMD 412 is a semiconductor chip containing an array of millions of hinge-mounted microscopic mirrors, such as the DLP imaging device available from Texas Instruments Incorporated, Dallas, Tex. Because it is a digital device, the DLP imaging device codes gray scale through a series of digital pulses throughout the subframe period. The DLP imaging device is a very fast optical shutter that not only maintains a high overall transmission when the shutter is open but also prevents attenuation of essential gray level information present at the beginning or end of each subframe, which information would be attenuated with a slow responding shutter and degrade the image rendering. DMD 412 cooperates with a polarization converter system 420 that is optically associated with projector engine 406 to produce, in alternating sequence, light in an input polarization state and carrying first and second perspective view images of a scene in different ones of first and second subframes. Mirror control signals applied to image data inputs 422 of DMD 412 cause the micromirrors to selectively reflect the sequentially incident light wavelength components and thereby produce the light carrying the first and second perspective view images.

In this embodiment, to eliminate unwanted polarization components of light that would otherwise enter polarization modulator 80', a first polarizer 424, preferably of a wire-grid type, linearly polarizes the image reflecting from the DMD. Alternatively, this polarizer could be placed anywhere in the light path between polarization converter 420 and DMD 412. The wire-grid type of polarizer has the advantage of reflecting the unwanted polarized light component rather than absorbing it, which could damage a conventional plastic film type polarizer. An optional second, plastic film type polarizer 426 with its polarization axis oriented in the same direction as the polarization direction of the polarization axis of polarizer 424 can be placed after polarizer 424 to absorb or clean up any remaining traces of the unwanted polarized light component.

Polarization converter system 420 can be set in any practicable position between light source 408 and DMD 412 to impart an input polarization state to the image-carrying polarized light incident on polarization modulator 80'. In the embodiment shown in FIG. 32, polarization converter 420 is positioned between collimating lens 416 and rotating color wheel 410 to linearly polarize the multiple wavelengths of light emitted by light source 408 and incident on DMD 412. Polarization converter system 420 added to projection engine 406 is of the type commonly used in LCD projectors. Standard DMD projectors do not require polarized light, so a polarization converter system is not necessary in them. But since polarization modulator 80' receives linearly polarized light, the addition of polarization converter system 420 significantly improves the throughput and thereby leads to a brighter image on the display screen. Thus, light source 408, lenses 416 and 418, rotating color wheel 410, and DMD 412 collectively constitute image source 22 and polarization converter 420, together with wire-grid polarizer 424 and optional polarizer 426, constitutes input polarizer 82' of stereoscopic 3D viewing system 150' shown in FIGS. 13A and 13B.

Polarization modulator 80' receives the light that is in the input polarization state and carries the first and second perspective view images. Polarization modulator 80', in response to a first drive signal, imparts to the image-carrying polarized light a first output polarization state during the first subframe and, in response to a second drive signal, imparts to the image-carrying polarized light a second output polarization state during the second subframe. The first and second drive signals produced by display drive circuitry 102 (FIGS. 7A, 7B, 7C, and 7D) cooperate with the mirror control signals applied to image data inputs 422 of DMD 412 to produce in the first and second output polarization states the image-carrying polarized light that propagates through projection lens 414 for transmission to and viewing by an observer wearing passive glasses 152'.

Polarization modulator 80' includes ECB liquid crystal devices or cells 84 and 86, as described with reference to FIGS. 13A and 13B, followed by quarter-wave plastic film 180, which can be either laminated onto the output face of liquid crystal cell 86 or placed after it as a standalone element. Each of liquid crystal cells 84 and 86 can have planar substrates or substrates curved in one or two dimensions. Liquid crystal cells 84 and 86 having planar substrates are suitable for use inside projector housing 402 because collimated light propagates through polarization modulator 80' to projection lens 414. FIG. 32 shows an alternative embodiment in which liquid crystal cells 84 and 86 placed inside modulator housing 404 are curved in the horizontal dimension corresponding to the long axis of the letterbox format of the projector. Curving substrate plates 88 of liquid crystal cell 84 and substrate plates 94 of liquid crystal cell 86 in this way affords the advantage of decreasing off-axis image ghosting because the variation of the angle of incidence is less on a curved substrate than it would be on a flat substrate.

During the warm-up time of stereoscopic 3D viewing system 150', the temperature inside projector housing 402 can increase from ambient temperature to about 50° or more. In order for modulator 80' to optimally perform over this wide range of temperatures, it is advantageous to adjust the drive voltages applied to polarization modulator 80', as shown in FIG. 29. For this purpose, temperature sensor 302 is placed on or near polarization modulator 80' to communicate with LC device timing and drive circuitry 308, of which display drive circuitry 120 is a part.

When polarization modulator 80' is placed inside projector housing 402, steps are taken so that projection lens assembly 414 is free from birefringence. Otherwise, depolarization would occur and thereby result in loss of contrast and increased image ghosting. It is known that stress birefringence in optical lenses can be removed by a tempering process.

Figure 33A:
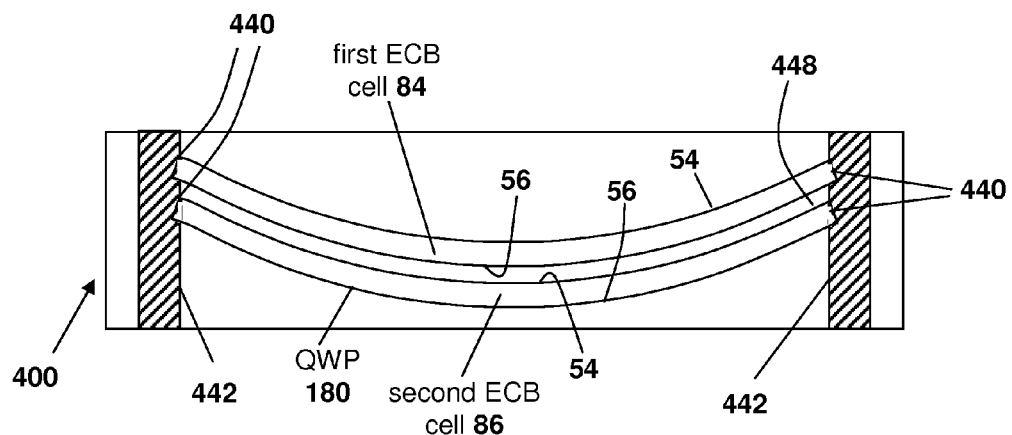
FIG. 33A is a top plan view of the polarization modulator contained in the modulator assembly of FIG. 32 and including two liquid crystal cells that have substrates curved in one dimension to improve viewing angle performance.
Figure 33B:
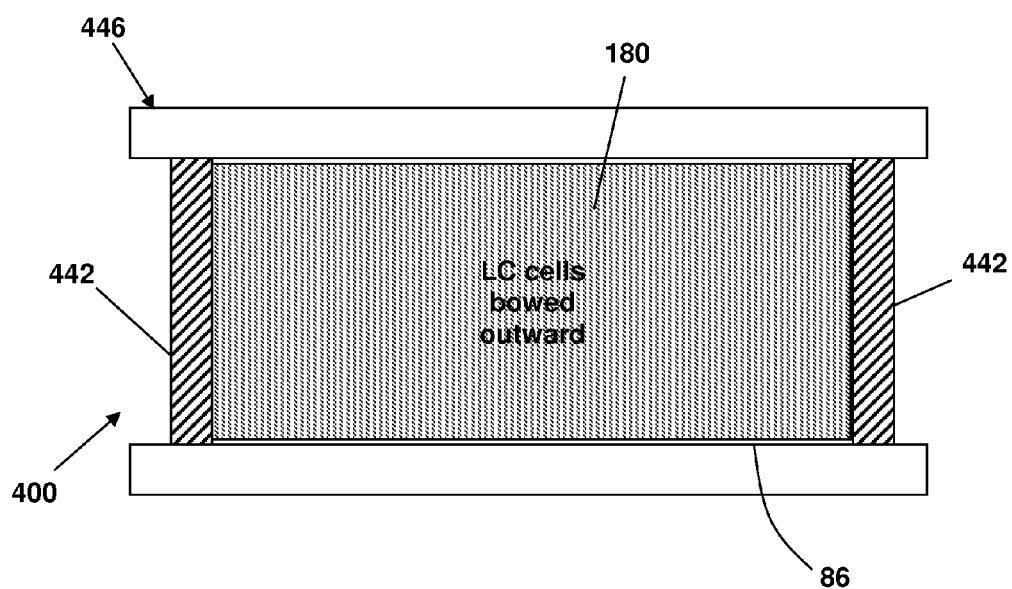
FIG. 33B is a front view of the polarization modulator of FIG. 33A mounted in a frame.

FIGS. 33A and 33B show an embodiment in which liquid crystal cells 84 and 86 are curved in one dimension to improve viewing angle performance. FIG. 33A is a top plan view showing how the ends of liquid crystal cells 84 and 86 of polarization modulator 80' fit into grooves 440 of grooved holders 442. The spacing between grooved holders 442 is made less than the lengths of liquid crystal cells 84 and 86 so that they naturally bow outward. The type and thickness of the material of which substrate plates 88 and 94 are made determine to what extent liquid crystal cells 84 and 86 can be bowed before they are damaged. Either plastic or thin glass material would work for substrate plates 88 and 94. FIG. 33B is a front view of polarization modulator 80', showing how grooved holders 442 can be mounted in a frame 446. In the embodiment of FIG. 33A, liquid crystal cells 84 and 86 are spaced apart with an air gap 448 that allows air to flow between them and thereby maintain temperature uniformity.

In this configuration, it would be advantageous to cover with an anti-reflective coating the inner adjacent surfaces 56 and 54 of the respective liquid crystal cells 84 and 86 to avoid reflection losses. As FIG. 33A shows, the quarter-wave film 180 is laminated onto exit or outer surface 56 of liquid crystal cell 86 using a suitable pressure sensitive adhesive. Reflection losses can be avoided by covering with an anti-reflective coating the outer surface of quarter-wave film 180, as well as outer surface 56 of liquid crystal cell 84.

Liquid crystal cells 84 and 86 could be laminated together, but the doubled thickness of the combination might make it difficult to achieve enough curvature to noticeably decrease off-axis image ghosting, unless flexible plastic substrate plates 88 and 94 are used. Alternatively, liquid crystal cells 84 and 86 could be fabricated as a single unit using three substrates, with a center substrate corresponding to a face-to-face combination of adjacent substrate plates 88 and 94 and having optically transparent electrode layers 90 and 96 coated on different ones of its surfaces.

In the alternative embodiment, the curved polarization modulator 80' and its associated polarizers 424 and 426 are placed outside projector housing 402, as shown in the dashed line-enclosed configuration of FIG. 32, with polarization modulator 80' located in external modulator housing 404. An external modulator offers an advantage of compatibility for use with off-the-shelf projectors, avoid the effects of birefringence in projection lens 414, and minimize temperature changes during warm-up. The disadvantages of this embodiment, in addition to being a bulky add-on, is that it requires polarizers 424 and 426, and liquid crystal cells 84 and 86 of larger areas because of the divergence of the light exiting projection lens 414.

The previous description has been presented with reference to front projection applications, but rear projection applications are also possible. As with front projection, for rear projection, polarization modulator 80' can be placed either before or after projection lens 414. Because of the 180° phase shift imparted by reflection from a polarization-preserving surface, right-hand circularly polarized light becomes left-hand circularly polarized light and vice versa. Thus, the phase relationship of the drive signals for left and right eyes is shifted by 180°, depending on whether front or rear projection applications are considered.

The example shown in FIG. 32 uses a single DMD chip 412 in a field sequential color mode to render full color images. It is also possible to use the disclosed polarization modulator 80' in a three-path DMD projector, which has three DMD chips 412 positioned in different ones of red, green, and blue light paths.

Figure 34:
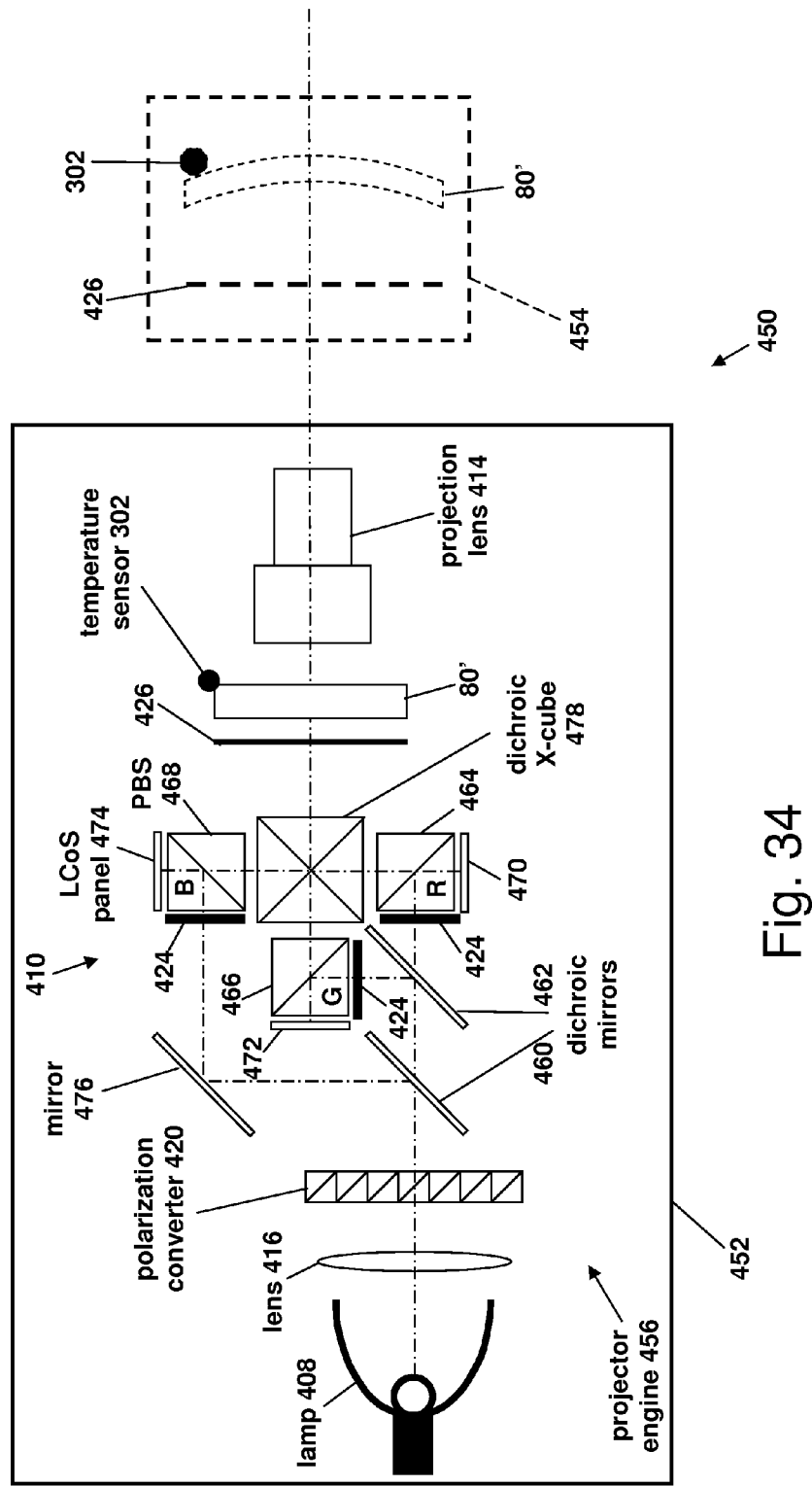
FIG. 34 shows, as a second preferred embodiment, an optical polarization state modulator assembly in which a polarization modulator is incorporated.

FIG. 34 shows, as a second preferred embodiment, an optical polarization state modulator assembly 450 in which a polarization modulator is incorporated. Modulator assembly 450 is an optical subsystem of stereoscopic 3D systems configured for operation in projection applications that use passive glasses. As in the case of modulator assembly 400 of FIG. 32, one such system identified as stereoscopic 3D viewing system 150' is schematically illustrated in FIGS. 13A and 13B. System 150' is composed of polarization modulator 80', which includes polarizer 82', first ECB cell 84, second ECB cell 86, and quarter-wave film 180 that are contained either inside a projector housing 452 or inside a modulator housing 454 placed as a separate add-on outside projector housing 452. For purposes of convenience, the following descriptions of modulator assembly 450 include references to polarization modulator 80', system 150', and their component parts.

With reference to FIG. 34, modulator assembly 450 is placed inside a three-path projector engine 456 composed of light source 408 emitting multiple wavelengths of light; a wavelength separation device 410 in the form of dichroic mirrors 460 and 462 receiving the multiple wavelengths of light and separating them into red, green, and blue light paths; three polarizing beam-splitting cubes (PBS) 464, 466, and 468 associated with respective spatial light modulators 470, 472, and 474 in the form of reflective liquid crystal on silicon (LCoS) panels in different ones of red, green, and blue light paths; a turning mirror 476 reflecting into PBS 468 blue light reflected by dichroic mirror 460; a color combining dichroic X-cube 478; and multi-element projection lens 414, all of which are contained within projector housing 452. Light source 408, which as described above is preferably a metal-halide projection lamp, emits multiple wavelengths of light for incidence on first dichroic mirror 460. Condensing lens 416 and other lenses (not shown for simplicity) cooperate to collimate the light wavelength components incident on LCoS panels 470, 472, and 474. Skilled persons will appreciate that projector engine 456 could include additional components, depending on the specific system configuration.

LCoS panels 470, 472, and 474 are miniature liquid crystal displays comprising a thin layer of liquid crystal material sandwiched between a silicon backplane containing an array of millions of separately addressable pixels and a coverglass with a single, transparent counter-electrode. LCoS panels 470, 472, and 474 cooperate with polarization converter system 420 that is optically associated with projector engine 456 to produce, in alternating sequence, light in an input polarization state and carrying first and second perspective view images of a scene in different ones of first and second sub-frames. Control signals applied to image data inputs (not shown) of LCoS panels 470, 472, and 474 cause the pixels to selectively change the state of polarization of the incident light wavelength components reflected from them and thereby produce the light carrying the first and second perspective view images.

In this embodiment, to eliminate unwanted polarization components of light that would otherwise enter polarization modulator 80', pre-polarizers 424 are placed on the input faces of different ones of polarizing beamsplitters 464, 466, and 468. At least pre-polarizer 424 positioned in the blue light path is preferably of the wire-grid type. The wire-grid type of polarizer has the advantage of reflecting the unwanted polarized light component rather than absorbing it, which could damage a conventional plastic film type polarizer, especially for higher energy light at the blue end of the spectrum. Optional second, plastic film type polarizer 426 can be placed after dichroic X-cube 478 to absorb any remaining traces of the unwanted polarized light component. The inner faces of X-cube 478 have multilayer dielectric coatings that are designed to combine the red, green, and blue image components coming from different ones of LCoS panels 470, 472, and 474 into a single, full color projected image. For the embodiment of FIG. 34, the coatings inside X-cube 478 are designed such that the polarization states of each of the three colors exiting X-cube 478 have the same direction of linear polarization. This is not the case in the usual three-path LCD projectors, in which the polarization direction of the green component is at right angles to the polarization direction of the red and blue components.

Polarization converter system 420 can be set in any practicable position between light source 408 and first dichroic mirror 460 to impart an input polarization state to the image-carrying polarized light incident on polarization modulator 80'. In the embodiment shown in FIG. 34, polarization converter 420 is positioned between condensing lens 416 and first dichroic mirror 460 to linearly polarize the multiple wavelengths of light emitted by light source 408 and incident on first dichroic mirror 460. Polarization converter system 420 is of the type commonly used in LCD projectors. Thus, light source 408; condensing lens 416; dichroic mirrors 460 and 462; turning mirror 476; polarizing beamsplitter cubes 464, 466, and 468; LCoS panels 470, 472, and 474; and dichroic X-cube 478 collectively constitute image source 22 and polarization converter 420, together with pre-polarizers 424 and optional polarizer 426, constitute input polarizer 82' of stereoscopic 3D viewing system 150' shown in FIGS. 13A and 13B.

The example using a DMD imager shown in FIG. 32 and the example using three LCoS imaging panels shown in FIG. 34 both use white light sources 408 such as a metal halide lamps, which require wavelength separation devices such as a rotating color wheel 410 or a series of dichroic mirrors 460 and 462 to separate the colors. Skilled persons will appreciate that such wavelength separation devices would not be required if colored light sources are used such as red, green, and blue lasers or red, green, and blue light-emitting diodes.

It will be obvious to those having skill in the art that many changes may be made to the details of the above-described embodiments without departing from the underlying principles of the invention. The LCD embodiment shown in FIG. 34, for example, could be changed by rearranging the mirrors and replacing the reflective LCoS panels and polarizing beam splitters with transmissive LCD panels. The scope of the present invention should, therefore, be determined only by the following claims.

The invention claimed is:

1. An optical polarization state modulator assembly for use in a time-multiplexed stereoscopic three-dimensional image projection system, comprising:

a color image projector engine including a spatial light modulator, a light source emitting multiple wavelength components of light for incidence on the spatial light modulator, and a projection lens;

a polarization converter system optically associated with the projection engine, the polarization converter system cooperating with the spatial light modulator to produce in alternating sequence light in an input polarization state and carrying first and second perspective view images of a scene in different ones of first and second subframes; and a polarization modulator receiving the light in an input polarization state and carrying first and second perspective view images, the polarization modulator comprising first and second liquid crystal devices combined in optical series so that polarized light propagating through them can undergo changes in polarization state in response to first and second drive signals;

the first and second liquid crystal devices having respective first and second sets of directors and constructed and oriented to cause, in response to removal of applied equal voltages, the directors in the first and second sets to cooperatively relax and thereby dynamically offset the polarization state changes so that multiple wavelengths of the light propagating through and exiting the combination of first and second liquid crystal devices are in the input polarization state;

the first and second drive signals including lower magnitude levels that establish lower magnitude director field states for the first and second liquid crystal devices, and the first and second drive signals including pulses having lower-to-higher magnitude level powered transitions that establish higher magnitude director field states for the first and second liquid crystal devices;

the first and second drive signals cooperating during one of the first and second subframes to cause, in the first and second liquid crystal devices, formation of the higher magnitude director field states from which the directors relax during the one subframe such that the directors in the first and second sets offset the polarization state changes and thereby impart, to the image-carrying polarized light propagating through the combination of first and second liquid crystal devices, a first output polarization state that is the input polarization state, and the image-carrying polarized light in the first output polarization state propagating through the projection lens for transmission to an observer; and the first and second drive signals cooperating during the other of the first and second subframes to cause, in different ones of the first and second liquid crystal devices, formation of the lower and higher magnitude director field states during the other subframe such that the directors in the first and second sets do not offset the polarization state changes and thereby impart, to the image-carrying polarized light propagating through the combination of first and second liquid crystal devices, a second output polarization state that is different from the first output polarization state, and the image-carrying polarized light in the second output polarization state propagating through the projection lens for transmission to the observer.

2. The optical polarization state modulator assembly of claim 1, in which the spatial light modulator includes an electrically addressed spatial light modulator.

3. The optical polarization state modulator assembly of claim 2, in which the electrically addressed spatial light modulator includes a reflective micromirror imaging device.

4. The optical polarization state modulator assembly of claim 1, further comprising a light wavelength separation device positioned in optical series with the spatial light modulator, and in which the light wavelength separation device receives multiple wavelengths of light from the light source and produces the multiple light wavelength components that propagate for incidence on the spatial light modulator.

5. The optical polarization state modulator assembly of claim 4, in which the light wavelength separation device includes a spinning color wheel.

6. The optical polarization state modulator assembly of claim 4, in which the spatial light modulator constitutes a first wavelength band-specific spatial light modulator and further comprises a second wavelength band-specific spatial light modulator, and further comprising a light wavelength separation device that receives multiple wavelengths of light from the light source and includes multiple beam-splitting devices that produce the multiple light wavelength components that propagate for incidence on different ones of the first and second wavelength band-specific spatial light modulators.

7. The optical polarization state modulator assembly of claim 6, in which the first and second wavelength band-specific spatial light modulators include light reflecting liquid crystal panels.

8. The optical polarization state modulator assembly of claim 6, in which the first and second wavelength band-specific spatial light modulators include light transmitting liquid crystal panels.

9. The optical polarization state modulator assembly of claim 1, in which the polarization converter system is positioned between the light source and the spatial light modulator.

10. The optical polarization state modulator assembly of claim 1, further comprising a wire-grid polarizer positioned between the spatial light modulator and the polarization modulator.

11. The optical polarization state modulator assembly of claim 1, further comprising a projector housing that contains the projection engine, the polarization converter system, and the polarization modulator.

12. The optical polarization state modulator assembly of claim 1, in which the first and second liquid crystal devices are formed with substrates having planar surfaces from which the image-carrying light in the first and second output polarization states propagates for incidence on the projection lens.

13. The optical polarization state modulator assembly of claim 1, further comprising:

a projector housing that contains the projection engine and the polarization converter system; and a modulator housing that contains the polarization modulator.

14. The optical polarization state modulator assembly of claim 13, in which the first and second liquid crystal devices are formed with substrates having curved surfaces from which the image-carrying light in the first and second output polarization states propagates for incidence on the projection lens.

15. The optical polarization state modulator of claim 1, in which the directors in one of the first and second sets of directors are configured as a 90° rotated mirror image of the directors in the other of the first and second sets of directors.

16. The optical polarization state modulator of claim 15, in which the first and second liquid crystal devices are of an electrically controlled birefringent type having alignment layer surface-contacting directors arranged so that the surface-contacting directors of one of the first and second liquid crystal devices are orthogonally related to the surface-contacting directors of the other of the first and second liquid crystal devices.

17. The optical polarization state modulator of claim 1, further comprising:
- a temperature sensor operatively associated with the first and second liquid crystal devices to measure device operating temperature information;
- memory stores containing temperature-dependent phase shift response data corresponding to the director field states of the first and second liquid crystal devices; and
- processing circuitry operatively associated with the drive circuitry to produce the first and second drive signals that establish a one-half wavelength polarization state change, the processing circuitry accessing the stored phase shift response data corresponding to the measured device operating temperature information and causing the drive circuitry to produce the first and second drive signals of higher and lower magnitude levels that maintain, over a wide temperature range, a substantially constant phase shift corresponding to the one-half wavelength polarization state change.

\* \* \* \* \*